Aug. 21, 1962     F. G. STEELE     3,050,251

INCREMENTAL COMPUTING APPARATUS

Filed Sept. 16, 1957     8 Sheets-Sheet 1

INVENTOR:
Floyd G. Steele

Seymour Schulnick
Attorney

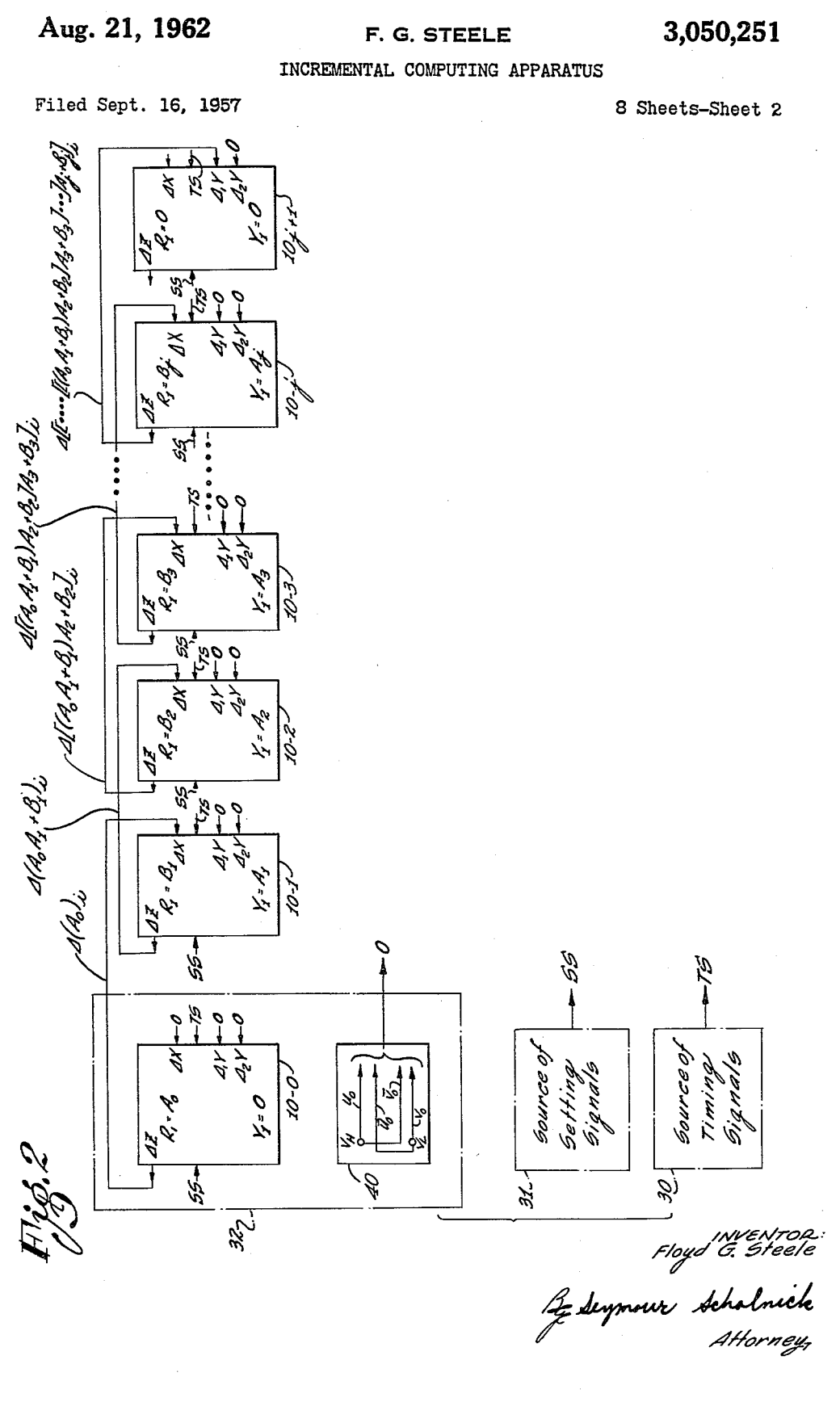

Aug. 21, 1962     F. G. STEELE     3,050,251
INCREMENTAL COMPUTING APPARATUS
Filed Sept. 16, 1957     8 Sheets-Sheet 2

INVENTOR:
Floyd G. Steele
By Seymour Schalnick
Attorney

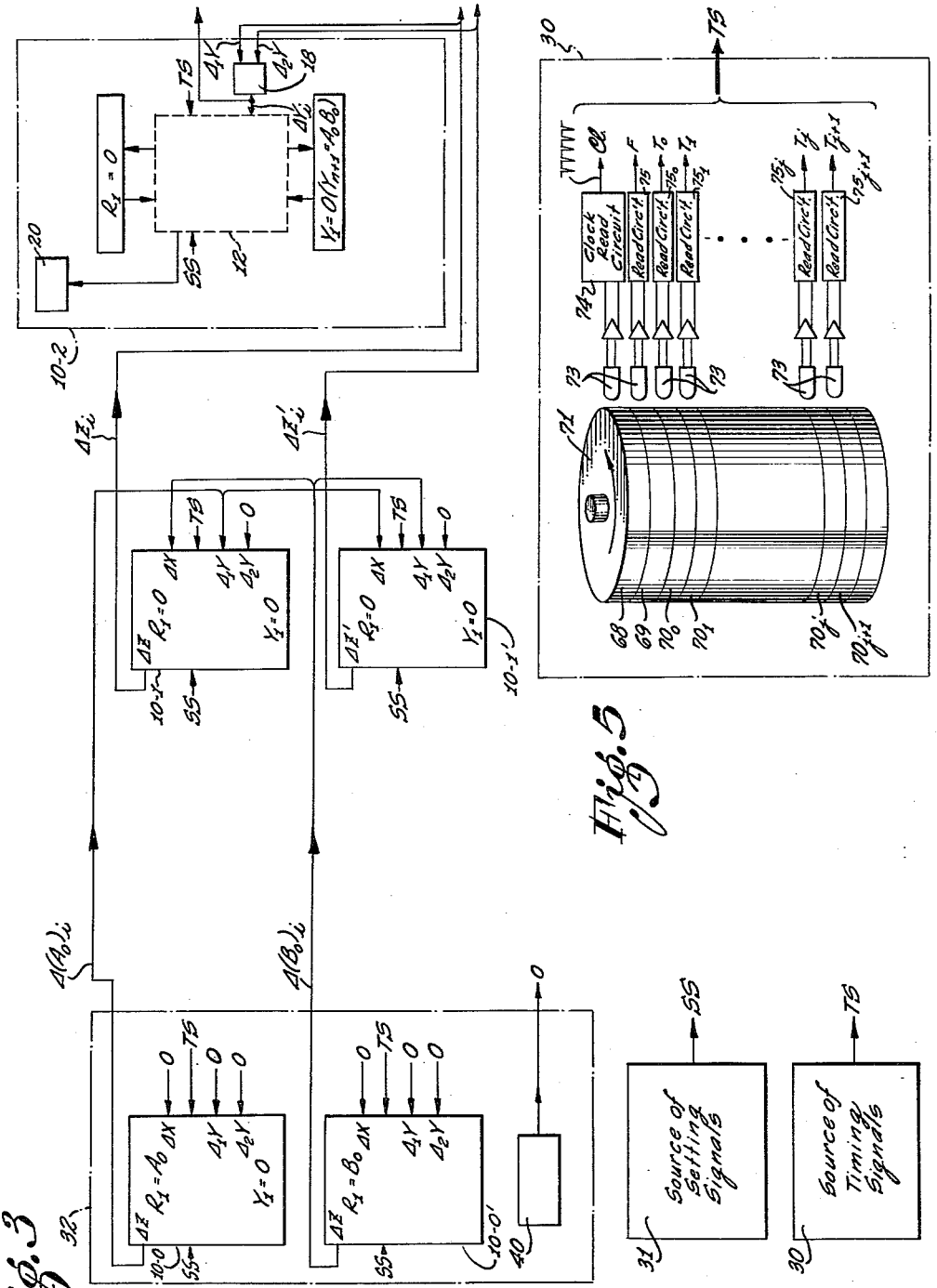

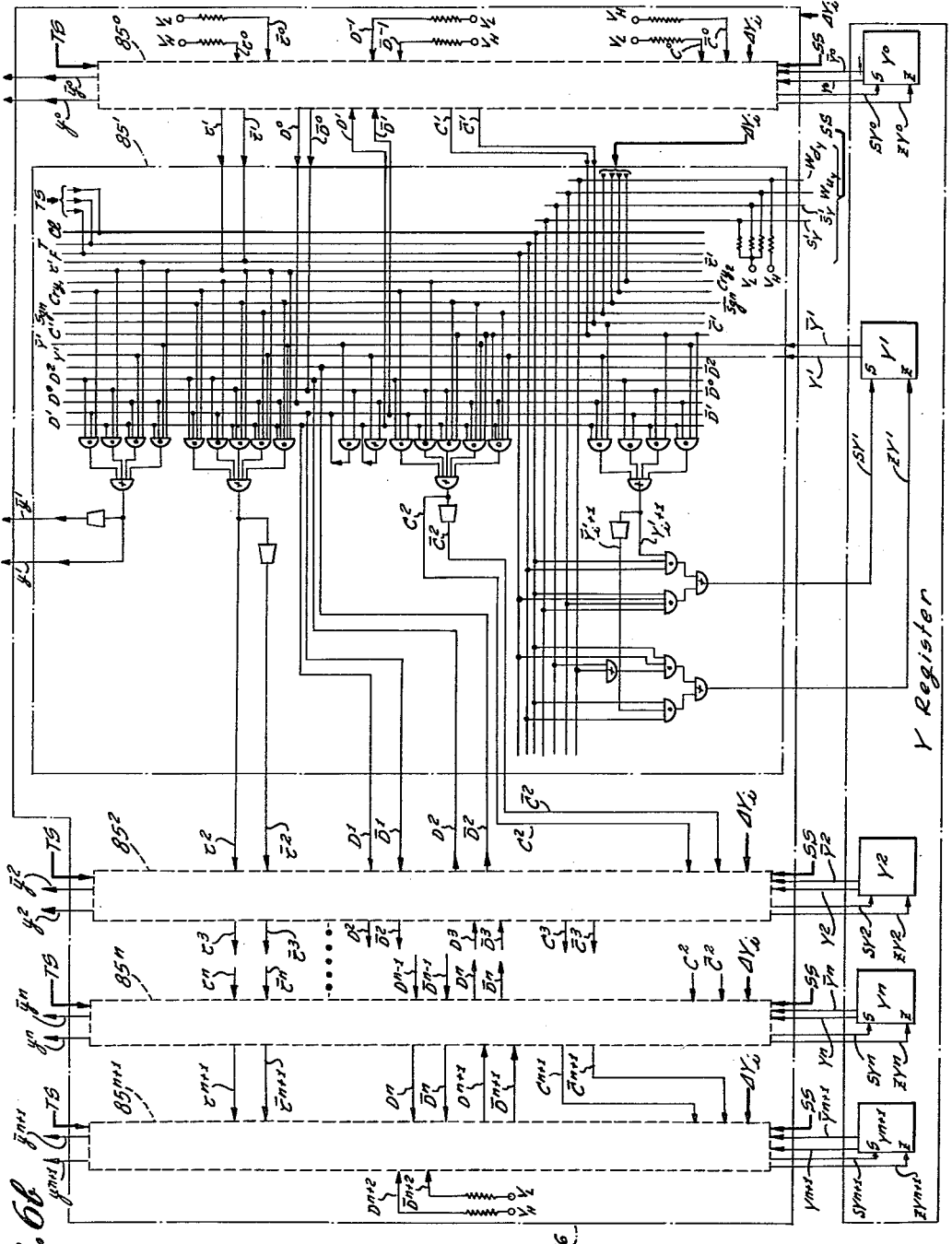

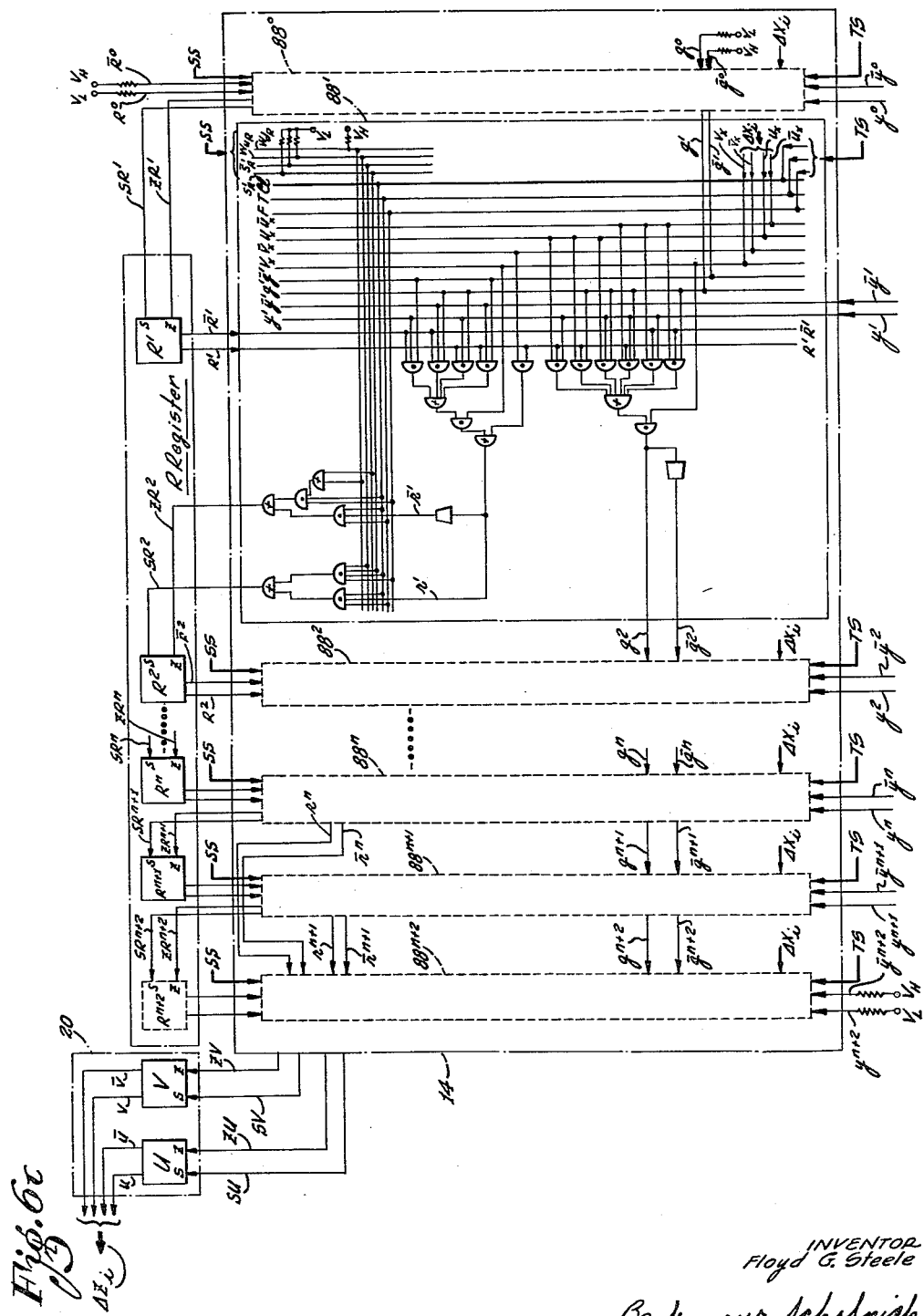

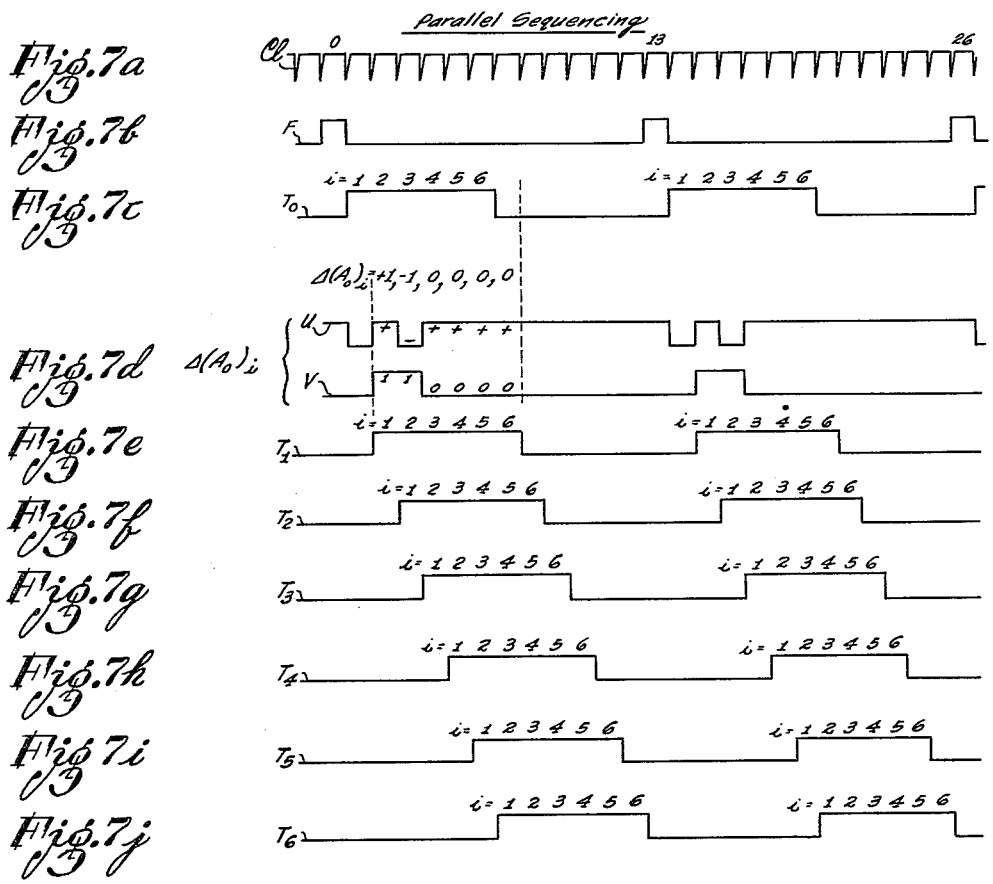
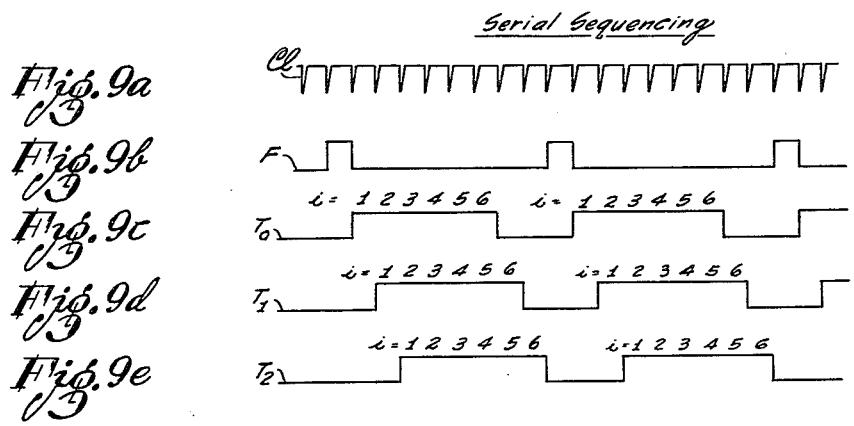

Aug. 21, 1962  F. G. STEELE  3,050,251
INCREMENTAL COMPUTING APPARATUS
Filed Sept. 16, 1957  8 Sheets-Sheet 8
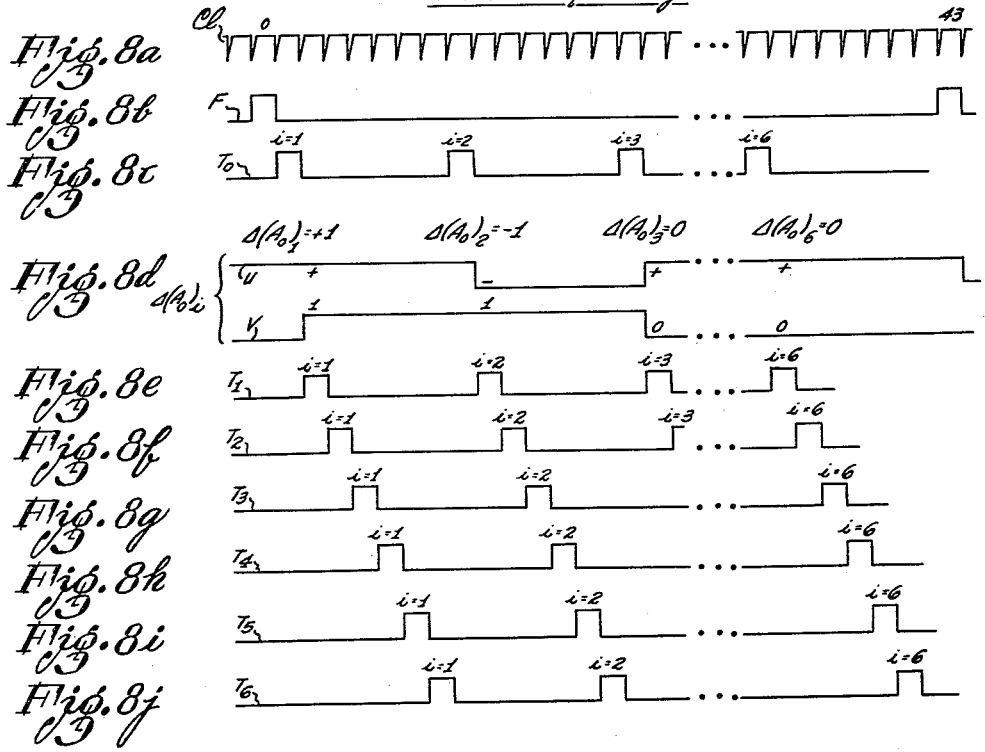

3,050,251
INCREMENTAL COMPUTING APPARATUS
Floyd G. Steele, La Jolla, Calif., assignor to Digital Control Systems, Inc., La Jolla, Calif.
Filed Sept. 16, 1957, Ser. No. 684,263
38 Claims. (Cl. 235—164)

The present invention relates to an electronic digital incremental computer, adapted for operating upon increments which regularly vary in scale or weight and, more particularly, relate to an incremental computer for performing arithmetic computations upon numbers by operating in an incremental manner upon successively scaled digits of such numbers.

In the prior art, two channels of development have produced, on the one hand, the modern general purpose (GP) computer and, on the other hand, the modern digital differential analyzer or DDA. The GP computer in its most basic aspects is a machine which operates upon whole numbers. In its structural organization a GP computer comprises a central arithmetic computing section which will perform required arithmetic operations upon two or more numbers entered therein, a large store of numbers, and very extensive programming facilities for searching out operand numbers in the memory and transferring them to the central computing section (and vice versa) in any desired sequence for operation upon the numbers in accordance with a predetermined program. Thus, extended computation is carried out by pre-programming the sequence in which numbers will be paired in the central computing section and the structure of the machine is generally such that any two numbers, whatever their memory location, may be randomly paired.

The DDA, on the other hand, is a machine which, in its most basic aspect, largely operates upon small increments or changes in numbers rather than upon whole numbers. Whole numbers are stored in a DDA, but are permanently grouped or paired in computing elements called digital integrators. Each digital integrator has two numbers (a Y number and an R number) stored therein in permanent association, and is responsive to applied $dx$ and $dy$ input increments for modifying the stored numbers and for producing corresponding $dz$ output increments.

While the stored whole numbers may have 10 or 20 or more digits, the input and output increments will each be expressed in general by one or two digits represented by one or two binary signals. Successive increments received by an integrator have a constant scale or weight and the output increments produced by the integrator are similarly unweighted. For example, successive $dy$ input increments received by a digital integrator may all have the sign and magnitude $+1$ or $-1$ and will all have the same scale, corresponding to the scale of the lowest order digit of the Y number. Thus, if the Y number is a 20 digit binary number, each $dy$ input increment will have the value $\pm 1 \cdot 2^{-20}$ output, and $dz$ increments produced by the integrator will similarly have a constant, albeit different, scale.

A digital differential analyzer is programmed for the accomplishment of any desired computation, merely by providing appropriate interconnection of integrators—by connecting the integrators so that the output increments of each integrator are applied to predetermined inputs of other integrators. Thus, in a DDA an extended computation is programmed merely by establishing predetermined fixed paths or connections for the communication of increments being paired numbers contained in corresponding integrators, rather than as in a GP computer by sequencing the communication of whole numbers between the central computing section and a general store of numbers in the memory.

Vigorous controversy between the proponents of GP and DDA computers have by now fairly well established the relative advantages and disadvantages of the two types of computers. DDA computers, throughout their development, have been consistently mechanized with a small fraction of the equipment that has been required by GP computers of similar capacity. This great reduction of equipment requirements is partially due to the virtual elimination, in the DDA, of a great superstructure of programming equipment required in most GP computers to accomplish their random pairing of numbers. In addition, equipment requirements are greatly reduced in a DDA computer because of the relative ease with which one or two digit increments can be communicated and manipulated as compared with the difficulties of communicating and operating upon many digit whole numbers.

In the matter of relative speed, comparison of the two types of computers is rather difficult. In the field of digital control, if repeated computations are to be carried out in which inputs vary continuously with time and each new set of answers differs only slightly from the previous set, a DDA will usually deliver these answers much more rapidly than a GP computer. However, if inputs are subject to very rapid changes, or actual large discontinuities, it becomes quite difficult to use a DDA at all, and it may then be preferable to use a GP computer even though it delivers answers less frequently. This peculiar type of speed limitation of the DDA is best understood by reference to a brief example.

Suppose that as part of each computation the product AB is to be formed to an accuracy of approximately one part in a thousand, where A and B are both input quantities.

In a DDA this computation would be performed by providing A and B as sequences of applied increments $dA$ and $dB$ (where $A=\Sigma dA$ and $B=\Sigma dB$) each increment having a weight of $\tfrac{1}{1000}$ of full scale, one new $dA$ increment and one new $dB$ increment being applied in each computation. The product AB would be developed in the form $$AB = \Sigma d(AB) = \Sigma(AdB + BdA)$$

Thus, if A was an input quantity which suddenly went from zero magnitude to full scale, one thousand iterations would be required to develop the new product AB by this relatively slow type of computation with increments of such small fixed scale. On the other hand, if A and B were continuously varying input quantities which changed no more than one part per 1000 in an iteration, each of the successive values developed of the summation $\Sigma(AdB+BdA)$ would be successive new correct values of the product AB. Thus, the inherently slow method of multiplication utilized in the DDA may actually be very fast (i.e. provide correct answers at a rapid rate) in an appropriate application.

A GP computer, on the other hand, doing the same computation would periodically sample the input quantities, probably at somewhat longer intervals, to bring in at each sampling whole numbers A and B representing the entire present values of the input quantities. The product AB would be formed anew at each computation through ordinary arithmetic operations upon these numbers in the central computing section of the GP computer. Obviously, in this type of whole number computation formation of correct products AB is assured independent of the rapidity of change of input quantities.

Another commonly compared feature of DDA and GP computer is their relative capability for doing a restoring type of computation in which any errors made, as caused for example by intermittent shorts or other momentary malfunctioning, are not perpetuated but are removed in continued computation. Restoring computation is rather easily accomplished in a GP by storing all constants in a permanent memory which cannot be changed and by using a programmed computation which does not utilize previously computed values of variables, but generates all variables anew at each computation, from the sampled values of the input quantities. Such full restoration is, in a DDA, very difficult to provide, since in the very nature of DDA computation numbers are not formed anew but are only modified slightly at each iteration in accordance with applied input increments.

Another commonly compared feature of DDA and GP computers is the relative ease with which a program code can be prepared by untrained personnel. In the use of a DDA, it is usually relatively easy to go directly from the mathematical formulation of the problem to a diagram which specifies the required interconnection of integrators. On the other hand, in coding a GP computer it is necessary to prepare a long list of detailed step by step instructions which are quite remote from the broad features of the mathematical formulation. Thus, the DDA appears to have a very real advantage in this respect.

The present invention provides a new type of incremental computer which embodies some of the best features of the DDA and GP computers. As in a DDA, numbers are permanently grouped together, stored in elemental computing blocks, which receive applied input increments and produce corresponding output increments. Computation is programmed through simple interconnection of computing blocks for the communication of increments between blocks. The equipment requirements of the incremental computer of the present invention are, therefore, about as low as those of a DDA computer. In addition, the ease of program preparation, common to DDA's, is retained and even enhanced in the incremental computer of the present invention.

However, in addition, some of the very best features of GP computation are retained in the incremental computer of the present invention. Although accomplished through purely incremental operations, all ordinary arithmetic operations upon numbers may be accomplished at speeds equal or superior to the speed of GP computation; and if desired, fully restoring computations may be programmed in which transient errors are inevitably corrected.

According to the underlying mathematical foundations of the present invention is is recognized that the digits of a number merely represent successively scaled increments whose summation equals the number. For example, in the decimal number .531, the digits $+5$, $+3$ and $+1$ represent the sign and magnitude of the successive scaled increment $5 \cdot 10^{-1}$, $3 \cdot 10^{-2}$, and $1 \cdot 10^{-3}$ whose sum equals $531/1000$. Similarly, in the binary number .110, the successive digits $+1$, $+1$, and $0$ represent the successively scaled increments $+1 \cdot 2^{-1}$, $+1 \cdot 2^{-2}$, and $+0 \cdot 2^{-3}$ whose sum equals $+6/8$.

According to the basic concept of the present invention, computing blocks are provided which are adapted for operating upon input increments which regularly vary in scale, to accordingly modify numbers stored within the computing blocks and to produce correspondingly scaled output increments. More particularly, the computing blocks of the present invention are adapted for operating in a regular fashion upon successively applied digits of numbers, the successive digits of each number being treated as successively scaled increments of the number. It is shown that through appropriate interconnection of elemental computing blocks, all arithmetic operations upon numbers may be carried out through purely incremental operations upon successively applied digits of the numbers.

A most unusual feature, found in a preferred embodiment of the incremental computer of the invention, is a one-to-one correspondence between application of successively scaled input digits of input numbers and the formation of correspondingly scaled output digits of output number answers. In the first of a sequence of operation intervals $i$ (where $i$ has the successive values 1, 2, 3 ... $n$) the highest order digit of each of the input numbers is applied and in response thereto the highest order digit of each of the output number answers is formed. In the second operation interval $i$, the second highest order digit of each of the input numbers is applied and the corresponding digit of each of the output number answers is formed. In continued operation, in response to each successively scaled digit of the input numbers, the correspondingly scaled output digits are formed. The fact that the highest order digits of answers are formed first and are not subject to change upon subsequent production of lower order digits appears to be unique to the present computational system and offers the very great advantage that a computation may be begun as soon as the first digits of the input numbers are entered and will be completed at the very time that entry of the last digits of the input numbers has been completed.

In a preferred embodiment of the invention, as will be explained hereinbelow, each computing block contains a Y number and an R number, and in each operation interval $i$ receives successively scaled input digits or increments $\Delta X_i$ and $\Delta Y_i$, modifies its Y and R numbers in accordance with these increments, and produces correspondingly scaled output increments $\Delta Z_i$. The successive increments have sign and magnitude $\pm 1$ or $0$ and have the successive scales $2^{-1}$, $2^{-2}$, $2^{-3}$, etc. (thus having the scale $2^{-i}$ in the $i$th operation interval). These increments thus represent, as will be fully explained, the successive digits of numbers expressed in a trinary number system. $\Delta Y_i$ input increments are added to the Y number, the predetermined scaling of the increment being accomplished by adding each successive increment to a successively lower order digit position of the Y number. The $\Delta X_i$ input increments are used as multipliers of a function $g(Y, \Delta Y)$, the multiplied function $g(Y, \Delta Y)\Delta X_i$ being added to the R number. The predetermined scaling of the $\Delta X$ input increments is accomplished by regularly doubling the R number. The output increments $\Delta Z_i$ are formed in such a manner that $$\sum_i \Delta Z_i = \left[\sum_i g(Y_i, Y_i) \Delta X_i\right] + R_1 - \frac{R_{i+1}}{2^i}$$

where $\Delta Z_i$, $\Delta X_i$, and $\Delta Y_i$ are increments that are successively halved in scale.

An example is provided hereinbelow of the interconnection of assemblages of such computing blocks for the performance of multiplication of two numbers $A_0$ and $B_0$, each supplied as a sequence of successively scaled digits or increments $\Delta(A_0)_i$ and $\Delta(B_0)_i$. The product $A_0B_0$ is incrementally formed in accordance with the relationship $$A_0B_0 = \Sigma\Delta(A_0B_0)_i = \Sigma(B_0)_i\Delta(A_0)_i + (A_0)_i\Delta(B_0)_i + \Delta(A_0)_i\Delta(B_0)_i$$

Another example is provided in which a number $A_0$ provided as a sequence of successively scaled digits is multiplied by a constant $A_1$ stored in the Y register of a computing block and has added thereto another constant $B_1$ stored in the R register of the block, the output digits formed by this operation being similarly operated upon by constants $A_2$, $B_2$, $A_3$, $B_3$, etc. stored in successive computing blocks. A final result of the form $$[ \ldots [[[A_0A_1+B_1]A_2+B_2]A_3+B_3] \ldots ]A_j+B_j$$

is formed. This is an especially useful type of computation, since it can be shown that almost all power series expansions can be advantageously refritten in a product expansion of the abovedescribed type. In addition, if all constants $B_1$, $B_2$, $B_3$, etc.$=0$, then the abovedescribed computation resolves to the simple cascaded multiplication $A_0A_1A_2A_3 \ldots A_j$.

It is an object of the present invention to provide incremental computing apparatus for operating upon successively applied input increments of varying scale to produce resultant output increments similarly varying in scale.

It is another object of the present invention to provide incremental computing apparatus for operating upon input signals representing the highest order digits of a plurality of input numbers to produce output signals representing the highest order digit of the result of a predetermined mathematical operation upon the input numbers.

It is another object of the present invention to provide computing apparatus of the abovedescribed type which is adapted for further operating upon signals representing the highest order digit of a result of a mathematical operation to produce output signals representing the highest order digit of a further result of a predetermined mathematical operation upon the first named result.

It is still another object of the present invention to provide incremental computing apparatus of the described type which is similarly responsive to sequentially applied input signals representing corresponding successively lower order digits of input numbers for sequentially producing output signals representing corresponding successively lower order digits of the result of a predetermined mathematical operation upon the input numbers.

It is still another object of the present invention to provide an incremental computing block responsive to sequentially applied successively scaled input increments $\Delta X_i$ and $\Delta Y_i$ for sequentially modifying stored Y and R numbers in accordance with the applied input increments and for sequentially producing corresponding successively scaled increments $\Delta Z_i$, whose summation represents a predetermined mathematical function of the input increments, applied successively halved-in-scale input increments $\Delta X_i$ It is another object of the present invention to provide an incremental computing block responsive to sequentially and $\Delta Y_i$, for adding each successive $\Delta Y$ increment to successively lower order digit position of the Y number and for sequentially producing corresponding successively halved-in-scale output increment $\Delta Z_i$ whose summation is proportional to the summation $$\Sigma_1^i g(Y_i \Delta Y) \Delta Y_i$$

It is still another object of the present invention to provide an incremental computing block having stored Y and R numbers and responsive to sequentially applied successively halved-in-scale input increments $\Delta X_i$ and $\Delta Y_i$ for sequentially modifying the stored numbers and producing correspondingly scaled $\Delta Z_i$ output increments, proper weight being given to each successive $\Delta X$ increment by successively doubling the R number and proper weight being given to each successive $\Delta Y_i$ increment by adding each successive $\Delta Y$ increment to successively lower order digit positions of the Y number.

It is yet another object of the present invention to provide apparatus for performing a predetermined mathematical operation upon input numbers and comprising a plurality of incremental computing blocks having their inputs and outputs interconnected in accordance with the predetermined mathematical operation.

It is still another object of the present invention to provide incremental computing apparatus for multiplying two numbers A and B represented respectively by a 1st sequence of successively scaled input increments $\Delta A_i$ and a second sequence of corresponding successively scaled input increments $\Delta B_i$ by combining each pair of corresponding input increments to produce a correspondingly scaled output increment $\Delta(AB)_i$.

It is yet another object of the present invention to provide incremental computing apparatus for multiplying two numbers A and B by producing a first sequence of successively scaled input increments $\Delta A_i$ representing successive digits of the number A, producing a second sequence of successively scaled input increments $\Delta B_i$ representing successive digits of the number B, and combining each pair of correspondingly scaled increments $\Delta A_i$ and $\Delta B_i$ to produce a resultant sequence of corresponding successively scaled output increments $\Delta(AB)_i$ representing successive digits of the product AB in accordance with the relationship $\Delta(AB)_i = \Delta A_i \Delta B_i + A_i \Delta B_i + B_i \Delta A_i$.

It is still another object of the present invention to provide cyclically operable incremental computing apparatus for multiplying a number $A_1$ stored in a register, by a number $A_0$ whose successively lower order digits are represented by sequentially applied successive decreasingly scaled input increments $\Delta(A_0)_i$, to produce in response to each input increment a correspondingly scaled output increment $\Delta Z_i$, the successive output increments $\Delta Z_i$ representing respectively the successive digits of the product $A_0 A_1$.

It is yet another object of the present invention to provide an interconnected assemblage of computing blocks for storing a plurality of constants $A_1, A_2 \ldots A_j$ and responsive to the highest order digit of an input number $A_0$ for forming the highest order digit of the product $A_0 A_1 A_2 \ldots A_j$.

It is an additional object of the present invention to provide an interconnected assemblage of computing blocks for storing a plurality of constants $A_1, B_1, A_2, B_2 \ldots$ etc., and responsive to the highest order digit of an input number $A_0$ for forming the highest order digit of the quantity $[\cdots[(A_0 A_1 + B_1)A_2 + B_2] \text{ etc.} \cdots]$.

The novel features which are believed to be characteristic of the invention both as to its organization and method of operation, together with further objects and advantages thereof will be better understood from the following description considered in connection with the accompanying drawings in which a specific embodiment of the invention is illustrated by way of example. It is to be expressly understood, however, that the drawings are provided for purposes of illustration and description only and are not intended as a definition of the limits of the invention.

FIG. 2 is a partly block-partly circuit diagram of an assemblage of computing blocks interconnected for the performance of a plurality of cascaded multiplications and/or additions.

FIG. 3 is a partly block-partly circuit diagram of another assemblage of computing blocks interconnected for the multiplication of two numbers respectively represented as two corresponding sequences of sequentially applied successively scaled increments.

FIG. 5 is a drawing of a suitable embodiment of a source of timing signals, utilized in the control of the assemblages of computing blocks shown in FIGS. 2 and 3.

FIG. 6b is a partly block-partly circuit diagram showing embodiments of a Y register and an associated Y gating matrix utilized in the computing block of FIG. 1.

FIG. 6c is a partly block-partly circuit diagram of embodiments of an R register, a $\Delta Z$ register, and an associated R gating matrix utilized in the computing block of FIG. 1.

FIGS. 7, 8, 9 and 10 consisting of FIGS. 7a through 7j, 8a through 8j, 9a through 9e and 10a through 10e, are waveform charts illustrating signals appearing in various modes of operation of the assemblages of computing blocks shown in FIGS. 2 and 3.

Figure 1:
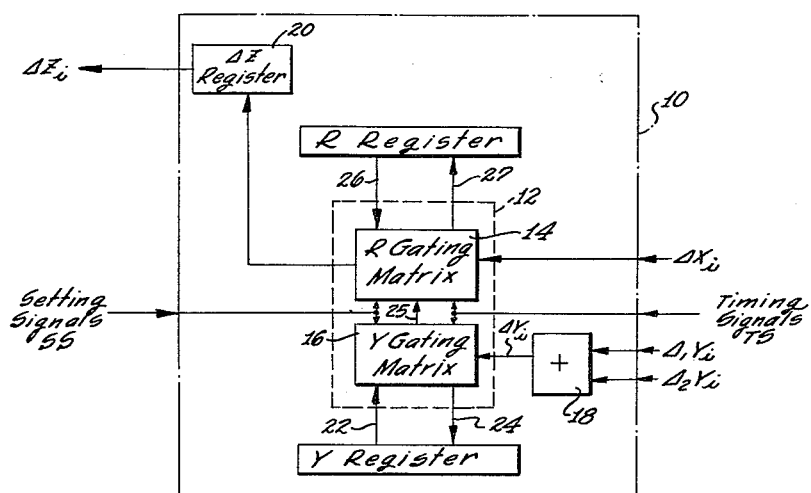
FIG. 1 is a block diagram of an embodiment of an elemental computing block in accordance with the present invention.

Referring now to the drawings, there is shown in FIG. 1 a block diagram of a computing block 10, according to the invention, which contains two registers, a Y register and an R register for storing respectively a first number designated the Y number and a second number designated the R number in permanent association with each other, and which is operable in response to incremental inputs designated ΔX and ΔY for modifying the Y and R numbers and for producing corresponding incremental outputs designated ΔZ which can be communicated to other similar computing blocks to serve there as ΔX and ΔY inputs. As will be hereinafter described, the computing block shown in FIG. 1 is adapted for operating upon a sequence of incremental inputs which regularly vary in scale, the computing block modifying the stored Y and R numbers in full conformity with the changing scale of the input increments, and producing ΔZ output increments which correspondingly change scale. As will be demonstrated hereinbelow, many computational operations and in particular all arithmetic operations can be accomplished through appropriate interconnection of elemental computing blocks.

As shown in FIG. 1, computing block 10 is adapted for receiving certain setting signals SS which may be utilized periodically, at the beginning of a sequence of computational operations, to set desired initial values of the Y and R numbers into the Y and R registers. Such setting signals may be applied from auxiliary storage registers or other suitable source of number representing signals. Computing block 10 is also adapted for receiving certain timing signals TS which are utilized to sequence successive operations of the computing block, as will be hereinafter described.

It will be understood hereafter that a single "computational operation" of a block 10 comprises the reception of a ΔX input and a ΔY input and the formation of a corresponding ΔZ output. In the operation of a computing block, initial values are periodically set into the computing block. After each setting of initial values, an iteration or "sequence" of $n$ (a predetermined integer) computational operations is performed. For purposes of convenient reference the successive "operations" performed during a "sequence" are designated as operations $i$ (where $i$ has the successive values 1, 2, 3, 4 . . . $n$). Similar nomenclature is used to designate the input and output increments. During any operation $i$, a corresponding ΔX input increment $\Delta X_i$ is received; one or more ΔY input increments $\Delta_1 Y_i$, $\Delta_2 Y_i$ . . . etc. may be received; and a corresponding ΔZ output increment $\Delta Z_i$ is formed. In accordance with this nomenclature, the Y and R numbers stored in a computing block at the beginning of an operation $i$ are designated as numbers $Y_i$ and $R_i$.

The embodiment of computing block 10 shown in FIG. 1 includes, in addition the Y and R registers, the following elements: a computing circuit 12 which is seen to include an R gating matrix 14 and a Y gating matrix 16, the computing circuit intercoupling the Y and R registers and being utilizable for operating upon the numbers in those registers in accordance with the applied ΔX and ΔY increments; a summation network 18 which is operable for summing the applied increments $\Delta_1 Y_i$, $\Delta_2 Y_i$, etc. to form a total increment $\Delta Y_i$ which is supplied to Y gating matrix 16; and a ΔZ register 20 which is adapted for receiving and storing each $\Delta Z_i$ increment as it is formed and for communicating these increments to other computing blocks 10. In any assemblage of computing blocks 10, the ΔZ registers 20 may be thought of as comprising a single common register for storage of ΔZ increments—a common register from which each computing block 10 may obtain desired ΔZ increments to serve as its ΔX and ΔY inputs.

As indicated in FIG. 1, the total increment $\Delta Y_i$ is applied to Y gating matrix 16, which also receives over an input bus 22, signals supplied by the Y register which represent the number $Y_i$ stored therein. In each operation $i$, in response to these inputs, Y gating matrix 16 forms signals representing a modified Y number, which are applied back to the Y register along an input bus 24 to store therein the next Y number, designated $Y_{i+1}$. The new number $Y_{i+1}$ is defined as a predetermined function $f(Y_i, \Delta Y_i)$ of the inputs to Y gating matrix 16. Matrix 16 also forms signals representing another predetermined function $g(Y_i, \Delta Y)$ which is applied to R gating matrix 14 over an input bus 25 thereof.

In similar manner R gating matrix 14 receives, during each operation $i$, the applied increment $\Delta X_i$, the signals representing $g(Y_i, \Delta Y_i)$, and (over an input bus 26) signals representing the number $R_i$ stored in the R register, and in response to these inputs applies signals back to the R register, over an input bus 27, to store therein a new modified R number $R_{i+1}$, and also applies signals to ΔZ register 20 to store therein a resultant ΔZ increment $\Delta Z_i$.

According to the preferred embodiment of the invention, during each successive operation $i$ of a computational sequence, the applied input increments $\Delta X_i$ and $\Delta_1 Y_i$, $\Delta_2 Y_i$, etc., have one half the scale that they had during the preceding operation, and the output increments $Z_i$ are similarly halved in scale at each successive timing interval. More particularly, in a preferred embodiment of the invention, which is described hereinbelow, all increments during the $i$th operation are restricted to the values $$\frac{+1}{2^i}, \frac{-1}{2^i} \text{ or } \frac{0}{2^i} \left(\text{abbreviated} \frac{\pm 1 \text{ or } 0}{2^i}\right)$$

where $i = 1, 2, \ldots n$. Thus, in a computational sequence, during the first operation, the ΔX increment (and other increments) may assume the values $\pm \frac{1}{2}$ or 0, and during the second operation may assume the values $\pm \frac{1}{4}$ or 0, and so forth. As will readily be appreciated, any number (scaled between $+1$ and $-1$) may be represented by such a sequence or stream of increments and, as will be shown, this makes possible the accomplishment of most ordinary arithmetic operations upon numbers, by purely incremental operations upon such sequences or streams of three valued increments.

The following notation will be used in connection with the designation of these increments. The scaled values $$\left(\frac{\pm 1 \text{ or } 0}{2^i}\right)$$

of these increments will be denoted by the use of the symbols $\Delta X_i$, $\Delta Y_i$, $\Delta Z_i$, etc., as was done hereinabove. The corresponding absolute or unscaled values ($\pm 1$ or 0) of these increments will be denoted by the underlining of these same symbols—as $$\underline{\Delta X_i}, \underline{\Delta Y_i}, \underline{\Delta Z_i}, \text{etc.}$$

Scaled three valued increments, as described hereinabove, will be designated as trinary represented increments, and sequences or streams of successively scaled trinary increments will be designated as a trinary sequence or stream. When such a sequence is used to represent a number, it will be said that the number is represented in trinary notation or that it is a trinary number. Thus, for example, the sequence of successively presented trinary increments of absolute value 0, 0, $+1$, $-1$ is a trinary representation of the number $+\frac{1}{16}$ (since $\frac{0}{2} + \frac{0}{4} + \frac{1}{8} - \frac{1}{16} = +\frac{1}{16}$). It is clear that the successive trinary increments can be considered to be digits, presented highest order digit first, of a trinary number representing $+\frac{1}{16}$.

To facilitate the formation of trinary increments and also to conserve storage space, in the preferred embodiment of the invention, numbers are normally maintained or stored in the Y and R registers of each computing block 10 in a modified dinary notation.

In true dinary representation each successive digit of a number is represented by a single bivalue signal having appropriately scaled values of ±1. For example, a true dinary representation of the number $+\frac{9}{16}$ is $+1$, $-1$, $-1$, $+1$ (since $+\frac{1}{2}-\frac{1}{4}-\frac{1}{8}+\frac{1}{16}=+\frac{9}{16}$). The true dinary representation designated $Y_d$ of any number $Y$ may be readily calculated from the normal binary representation $Y_b$ of the number by use of the following formula, Formula 1:

$$Y_d = \frac{1+Y_b}{2} \quad (1)$$

where in the calculated $Y_d$ number each 0 is considered to have or is replaced by the value $-1$. For example, to recalculate the dinary number representing $+\frac{9}{16}$ begin with the ordinary binary number $$Y_b = \frac{9}{16} = +.001100 \ldots \quad (2)$$

and then calculate $$Y_d = \frac{1+Y_b}{2} = \frac{1.001100}{2} \ldots = .1001/100 \ldots \quad (3)$$

In the calculated $Y_d$, if each 0 digit is considered to have an appropriately scaled value of $-1$, it is seen that the first four digits of $Y_d$ are the required dinary digits of the number $+\frac{9}{16}$ and that all digits beyond the fourth cancel each other and may be disregarded.

In the Y and R registers of the preferred embodiment of the invention, numbers are normally held in a modified dinary representation, the modification consisting merely of the fact that the displacement of the binal point necessitated by the abovementioned division by two is not followed, so that the effective definition of a number $Y_r$ held in a register is:

$$Y_r = 1 + Y_b \quad (4)$$

It is clear that in the preferred embodiment of the invention, each register may comprise merely a sequence of storage cells or storage stages, each cell or stage being capable of storing a single bivalued signal representing the corresponding digit of the $Y_i$ or $R_i$ number stored in the register. In each operation $i$, as discussed above, these stored signals are modified in accordance with the inputs to computing circuit 12 to represent the modified numbers $Y_{i+1}$ of $R_{i+1}$.

As hereinbefore stated, in the preferred embodiment of the invention to be described hereinbelow, the operations performed upon the Y and R numbers are similar in some respects to those utilized in an ordinary digital integrator. They include an integration or summation of applied $\Delta Y$ increments in the Y register (so that $f(Y, \Delta Y)$ simply equals $Y_i + \Delta Y_i$); a multiplication of the function $g(Y, \Delta Y)$ of the Y number by the $\Delta X$ increment and an addition of the resultant function to the R number; and the formation of a $\Delta Z$ overflow increment which is subtracted from the R register. However, each of these operations has been radically changed to mechanize the acceptance of input increments which regularly vary in scale and to mechanize the formation of $\Delta Z$ output increments which similarly vary in scale.

More particularly, in the integration or summation to the Y number of $\Delta Y$ increments, which are successively halved in scale, apparatus is provided for adding each successive $\Delta Y$ increment to the Y number at a different position in the Y register, corresponding to the changing scale of the $\Delta Y$ increments. Thus, in a computational sequence, the first $\Delta Y$ increment $\Delta Y_1$ is added to the Y register at a position corresponding to a scale of $\frac{1}{2}$, the second $\Delta Y$ increment $\Delta Y_2$ is added to the Y register at a position corresponding to a scale of $\frac{1}{4}$, and so on, until all of the scaled increments have been summed in this manner to the Y number. A brief numerical example will illustrate how this operation is carried out.

Assume that at the beginning of a computational sequence the number zero (represented in the machine notation as 1.000 . . .) is set into the Y register as the initial $Y_1$ number $Y_1$. Assume further that during successive operations 1, 2, 3, 4 . . ., the correspondingly successive $Y_i$ increments applied are $$\underline{\Delta Y_1} = 0, \ \underline{\Delta Y_2} = +1, \ \underline{\Delta Y_3} = -1, \ \underline{\Delta Y_4} = -1$$

where the scale of the successive increments is understood to be $\frac{1}{2}$, $\frac{1}{4}$, $\frac{1}{8}$, $\frac{1}{16}$ . . . etc. The following table, Table 1, summarizes the formation of successive values of $Y_i$ in response to these increments.

TABLE 1

| Operation | $Y_i$ | $\Delta Y_i$ |
|---|---|---|
| 1 | $Y_1 \rightarrow 1.0000\ldots$ ↑ | $\underline{\Delta Y_1} = 0$ |
| 2 | $Y_2 \rightarrow 1.0000\ldots$ ↑ | $\underline{\Delta Y_2} = +1$ |
| 3 | $Y_3 \rightarrow 1.0100\ldots$ ↑ | $\underline{\Delta Y_3} = -1$ |
| 4 | $Y_4 \rightarrow 1.0010\ldots$ ↑ | $\underline{\Delta Y_4} = -1$ |
| 5 | $Y_5 \ 1.0001\ldots$ | |

In Table 1, the vertical arrows indicate the varying points at which each successively scaled $\Delta Y_i$ increment is summed to the corresponding $Y_i$ number. It is seen that, in the dinary notation utilized and for increments successively halved in scale, the point of insertion of the increment is moved or shifted one digit to the right at each timing interval.

Although many methods may be utilized to thus shift the insertion point of successive increments, there is one very simple method, having obvious advantages in ease of the mechanization which is utilized in the preferred embodiment of the invention. According to this method, in order to mark the successive digit positions at which insertion is to take place, a 1 value marker signal is initially automatically set in at the $\frac{1}{2}$ scaled digit position of the Y number and is moved one digit to the right at each timing interval to thereby indicate the varying points of insertion. Thus, in the actual machine operation the successive $Y_i$ values shown in Table 1 above would actually appear as follows:

$$Y_1 \rightarrow 1.1000 \ldots$$
$$\uparrow$$
$$Y_2 \rightarrow 1.0100 \ldots$$
$$\uparrow$$
$$Y_3 \rightarrow 1.0110 \ldots$$
$$\uparrow$$
$$Y_4 \rightarrow 1.0011 \ldots$$
$$\uparrow$$
$$Y_5 \rightarrow 1.0001 \ldots$$

where in each case the insertion point for each increment is indicated by the 1 valued signal which is farthest to the right, and thus serves as the abovedescribed marker signal. The marker signal is, of course, not treated as an ordinary digit of the Y number and is, therefore, not allowed to otherwise affect arithmetic operations upon the Y number.

It is appropriate at this point to mention that in the specific embodiment of the invention, whose mechanization will be hereinbelow described, the form of summer 18 which is utilized is adapted for summing but two $\Delta Y$ input increments, $\Delta_1 Y_i$ and $\Delta_2 Y_i$, and operates to produce a total increment $\Delta Y_i$ which represents the true algebraic sum of the applied input increments. The following table, Table 2, summarizes the described relationship between the values of the input increments and the value of the resultant total increment $\Delta Y_i$.

TABLE 2

| $\Delta_1 Y_i$ | $\Delta_2 Y_i$ | $\Delta Y_i$ |
|---|---|---|
| +1 | 0 | +1 |
| −1 | 0 | −1 |
| 0 | 0 | 0 |
| +1 | +1 | +2 |
| −1 | +1 | 0 |
| 0 | +1 | +1 |
| +1 | −1 | 0 |
| 0 | −1 | −1 |

It is seen from Table 2 that in utilizing the described form of summer 18, the total $\Delta Y$ increment $\Delta Y_i$ can assume any of the values $+2, +1, 0, -1, -2$, scaled by the appropriate values of $2^i$. It will be clear, however, that many other forms of summer 18 may be utilized; as for example, forms which total a greater number of $\Delta Y$ increments and/or which scale down the total increment to be in consonance with the inputs.

Equations defining the abovedescribed operations performed in the preferred embodiment of the invention upon the Y number and upon the $\Delta Y$ increments are now provided in summarization of the above discussion of these operations.

$$\Delta_1 Y_i = \pm 1 \text{ or } 0 \qquad (5)$$

$$\Delta_1 Y_i = \frac{\pm 1 \text{ or } 0}{2^i} \qquad (5a)$$

$$\Delta_2 Y_i = \pm 1 \text{ or } 0 \qquad (6)$$

$$\Delta_2 Y_i = \frac{\pm 1 \text{ or } 0}{2^i} \qquad (6a)$$

$$\Delta Y_i = \Delta_1 Y_i + \Delta_2 Y_i \qquad (7)$$

$$Y_i = Y_1 + \sum_{i=1} \Delta Y_i \qquad (8)$$

Restating Equation 8 in iterative form:

$$Y_{i+1} = Y_i + \Delta Y_i \qquad (9)$$

Considering now the manner in which successively applied $\Delta X_i$ increments are made effective at their correspondingly scaled values, it will be remembered that, as stated hereinbefore, in each operation $i$, a function $g(Y, \Delta Y)$ is multiplied by the corresponding $\Delta X$ increment and the resultant function is added to the R number. In addition, a $\Delta Z$ increment is formed and is subtracted from the R number. This manipulation may be generally summarized by the following equation:

$$R_{i+1} = R_i + g(Y, \Delta Y) \Delta X_i - \Delta Z_i \qquad (10)$$

In the preferred embodiment of the invention, whose mechanization is hereindescribed, the function $g(Y, \Delta Y)$ is defined, for reasons which will later appear, as:

$$g(Y, \Delta Y) = Y_i + \frac{\Delta Y_i}{2} \qquad (11)$$

so that Equation 10 may be rewritten in the form:

$$R_{i+1} = R_i + \left[Y_i + \frac{\Delta Y_i}{2}\right]\Delta X_i - \Delta Z_i \qquad (12)$$

However, since $\Delta X_i$ and $\Delta Z_i$ are scaled quantities which are halved in each timing interval, a way must be devised to make this scaling effective. This, as will be shown, can be mechanized by halving the Y number at each timing interval or by doubling the $R_i$ number at each timing interval. Either process may be largely accomplished by a simple shift of the numbers in the Y and R registers relative to one another, that is by a right shift of the digits of the Y number relative to the R number or by a left shift of the R number digits relative to the Y number digits. In the specific embodiment of the invention hereindescribed, doubling of the R number is utilized. Thus in this embodiment the equation which is mechanized is:

$$R_{i+1} = 2R_i + \left[Y_i + \frac{\Delta Y_i}{2}\right]\underline{\Delta X_i} - \underline{\Delta Z_i} \qquad (13)$$

where it will be noted that the $\Delta X$ and $\Delta Y$ increments are written in their unscaled forms, since their predetermined scaling is made effective by the successive doubling of $R_i$. It will also be noted that since $\Delta X_i$ may have only the values $\pm 1$ or 0, addition of $$\left[Y_i + \frac{\Delta Y_i}{2}\right]\underline{\Delta X_i}$$

to the R number may be accomplished merely by adding or subtracting the quantity $$\left[Y_i + \frac{\Delta Y_i}{2}\right]$$

to the R number or by adding the number zero to the R number in accordance with the value $\Delta X_i$.

That such predetermined scaling is actually made effective is demonstrated by the following algebraic example in which the operation of a computing block 10, mechanized in accordance with Equation 13 above, is reviewed for three successive operations.

At the end of operations 1, 2 and 3, the successive values of $R_2$, $R_3$ and $R_4$ will be:

$$R_2 = 2R_1 + \left[Y_1 + \frac{\Delta Y_1}{2}\right]\underline{\Delta X_1} - \underline{\Delta Z_1} \qquad (14)$$

$$R_3 = 2R_2 + \left[Y_2 + \frac{\Delta Y_2}{2}\right]\underline{\Delta X_2} - \underline{\Delta Z_2} \qquad (15)$$

$$R_4 = 2R_3 + \left[Y_3 + \frac{\Delta Y_3}{2}\right]\underline{\Delta X_3} - \underline{\Delta Z_3} \qquad (16)$$

Solving these equations for $R_4$ there is obtained:

$$R_4 = \left(\left[Y_3 + \frac{\Delta Y_3}{2}\right]\underline{\Delta X_3} - \underline{\Delta Z_3}\right)$$
$$+ 2\left(\left[Y_2 + \frac{\Delta Y_2}{2}\right]\underline{\Delta X_2} - \underline{\Delta Z_2}\right)$$
$$+ 4\left(\left[Y_1 + \frac{\Delta Y_1}{2}\right]\underline{\Delta X_1} - \underline{\Delta Z_1}\right) + 8R_1 \qquad (17)$$

Now dividing both sides by 8 and rearranging terms there is obtained:

$$\frac{\Delta Z_1}{2} + \frac{\Delta Z_2}{4} + \frac{\Delta Z_3}{8} = \left[Y_1 + \frac{\Delta Y_1}{2}\right]\frac{\Delta X_1}{2}$$
$$+ \left[Y_2 + \frac{\Delta Y_2}{2}\right]\frac{\Delta X_2}{4}$$
$$+ \left[Y_3 + \frac{\Delta Y_3}{2}\right]\frac{\Delta X_3}{8}$$
$$+ \left(R_1 - \frac{R_4}{8}\right) \qquad (18)$$

or writing this in the compressed summation form:

$$\sum_{i=1}^{3} \frac{\Delta Z_i}{2^i} = \sum_{i=1}^{3}\left[Y_i + \frac{\Delta Y_i}{2}\right]\frac{\Delta X_i}{2^i} + R_1 - \frac{R_4}{2^3} \qquad (19)$$

or in the more general case, for any number $n$ of timing intervals in a computation sequence:

$$\sum_{i=1}^{n}\frac{\Delta Z_i}{2^i} = \sum_{i=1}^{n}\left[Y_i + \frac{\Delta Y_i}{2}\right]\frac{\Delta X_i}{2^i} + R_1 - \frac{R_{n+1}}{2^n} \qquad (20)$$

Many of the arithmetic operations and other computational activities which can be performed with the described embodiment of computing block 10 may be deduced from Equation 20 developed above.

In discussing these activities, for reasons which will become clear, it will be assumed that the register number $R_i$ is scaled and maintained so that it is bounded by the numbers $+\frac{1}{2}$ and $-\frac{1}{2}$, or in other words, so that:

$$-\frac{1}{2} \leq R_i \leq +\frac{1}{2} \qquad (21)$$

One set of scaling rules which will accomplish this bounding of the R number is described by the following scaling Equations 22 and 23 which express limitations on the magnitudes of the Y number and upon the summations of the input increments:

$$-\frac{1}{2} \leq Y_i = Y_1 + \Sigma \Delta Y_i \leq +\frac{1}{2} \qquad (22)$$

$$-\frac{1}{2} \leq \sum_{i=1}^{n} \Delta X_i \leq +\frac{1}{2} \qquad (23)$$

and by utilization of the following Rules 24, 25 and 26 which dictate how the overflow increment $\Delta Z_i$ is to be formed, so as to always maintain $R_i$ within its bounded values:

If $R_i + \left[Y_i + \frac{\Delta Y_i}{2}\right]\underline{\Delta X_i}$ equals or exceeds $+\frac{1}{2}$ $$\text{then } \underline{\Delta Z_i} = +1 \qquad (24)$$

If $R_i + \left[Y_i + \frac{\Delta Y_i}{2}\right]\underline{\Delta X_i}$ is between $\frac{1}{2}+$ and $-\frac{1}{2}$ $$\text{then } \underline{\Delta Z_i} = 0 \qquad (25)$$

If $R_i + \left[Y_i + \frac{\Delta Y_i}{2}\right]\underline{\Delta X_i}$ is less than $-\frac{1}{2}$ $$\text{then } \underline{\Delta Z_i} = -1 \qquad (26)$$

From inspection it will be seen that, in accordance with the foregoing scaling equations, the maximum values of $$R_i + \left[Y_i + \frac{\Delta Y_i}{2}\right]\underline{\Delta X_i}$$

will be bounded by $\pm 1$, and, therefore, that after subtraction of the $\Delta Z_i$ increment, each new value $R_{i+1}$ of the R number will be bounded, as required, by the values $\pm \frac{1}{2}$.

*Formation of $Y_1X + R_1$.*—Referring again to the computational techniques which can be deduced from Equations 8 and 20, there will first be described an operational sequence involving only a single computing block 10, in which the sequence $\Delta Z$ increments formed by the computing block represents the quantity $Y_1X + R_1$. In performing this computation the number X is represented by the applied sequence of increments $\Delta X_i$, or stated in equation form:

$$\sum_{i=1}^{n} \Delta X_i = X \qquad (27)$$

The increments $\Delta X_i$ may thus be viewed as the successive trinary digits of the number X.

At the beginning of the computation the numbers $Y_1$ and $R_1$ are initially set into the Y and R registers respectively. The increments $\Delta_1Y_i$ and $\Delta_2Y_i$ are connected as zero inputs so that $\Delta Y_i$ is zero, and, therefore (in Equation 8), $Y_i$ is a constant equal to $Y_1$. Thus, in this instance Equation 20 reduces to the form:

$$\sum_{i=1}^{n} \Delta Z_i = Y_1 \sum_{i=1}^{n} \Delta X_i + R_1 - \frac{R_{n+1}}{2^n} \qquad (28)$$

However, since the scaling assures that $R_{n+1}$ will not exceed $\pm\frac{1}{2}$, it is clear that the term $$\frac{R_{n+1}}{2^n}$$

will not exceed $$\pm\frac{1}{2^{n+1}}$$

and thus is smaller in magnitude than the lowest order digit of the result so that it may be ignored. Moreover, since $$\sum_{i=1}^{n} \Delta X_i = X$$

the quantity X may be substituted therefor. In this way Equation 28 reduces to the form:

$$\sum_{i=1}^{n} \Delta Z_i \cong Y_1 X + R_1 \qquad (29a)$$

thus demonstrating that in the described operational sequence, the stream of increments $\Delta Z_i$ will represent the successive digits of the quantity $Y_1X + R_1$.

*Formation of $Y_1X$.*—Note further that if the number $R_1$ set is zero, then Equation 29a further reduces to the form:

$$\sum_{i=1}^{n} Z_i = Y_1 X \qquad (29b)$$

thus demonstrating that in this case a simple multiplication is performed in which the multiplicand $Y_1$ is held constant in the Y register, the digits of the multiplier X are successively applied (highest order digit first) as the successive trinary increments $\Delta X_i$, and the corresponding successive trinary digits of the product $Y_1X$ are formed as the successive trinary increments $\Delta Z_i = \Delta(Y_1X)_i$. The number $Y_1X$ can be obtained in dinary form from the sequence of trinary increments $\Delta Z_i$, by summing these increments in accordance with their scale, in the Y register of another computing block.

The manner in which such a multiplication is accomplished is well illustrated by the simple numerical example provided in Table 3 below:

TABLE 3

$Y_1 = +\frac{1}{2} \to 1.1000\ldots$
$2R_1 = 0 \to 1.0000\ldots$
$X = +\frac{1}{2}$ represented as a stream of applied increments $\Delta X_i$ of values
$\quad +1, 0, 0, 0, 0\ldots$
$\Delta_1 Y_i = \Delta_2 Y_i = \Delta Y_i = 0$
$Z = Y_1 X = (+\frac{1}{2})(+\frac{1}{2}) = +\frac{1}{4}$

| Operation | $\underline{\Delta X_i}$ | Computation | $\underline{\Delta Z_i}$ | $\Delta Z_i$ | $\Sigma \Delta Z_i$ |
|---|---|---|---|---|---|
| 1 | +1 | $2R_1 = 0 \to 01.0000$ | | | |
| | | $Y_1\underline{\Delta X_1} = +\frac{1}{2} \to 1.1000$ | | | |
| | | $2R_1 + Y_1\underline{\Delta X_1} = +\frac{1}{2} \to 10.1000$ | +1 | $+\frac{1}{2}$ | $+\frac{1}{4}$ |
| | | $R_2 = -\frac{1}{2} \to 00.1000$ | | | |
| | | $2R_2 = -1 \to 00.0000$ | | | |
| 2 | 0 | $Y_1\underline{\Delta X_2} = 0 \to 1.0000$ | | | |
| | | $2R_2 + Y_1\underline{\Delta X_2} = -1 \to 01.0000$ | $-1$ | $-\frac{1}{4}$ | $+\frac{1}{4}$ |
| | | $2R_3 = 0 \to 01.0000$ | | | |
| 3 | 0 | $Y_1\underline{\Delta X_3} = 0 \to 1.0000$ | | | |
| | | $2R_3 + Y_1\underline{\Delta X_3} = 0 \to 10.0000$ | 0 | $\frac{1}{8}$ | $+\frac{1}{4}$ |
| | | $2R_4 = 0 \to 01.0000$ | | | |
| 4 | 0 | $Y_1\underline{\Delta X_4} = 0 \to 1.0000$ | | | |
| | | $2R_4 + Y_1\underline{\Delta X_4} = 0 \to 10.0000$ | 0 | $\frac{1}{16}$ | $+\frac{1}{4}$ |
| | | $2R_5 = 0 \to 01.0000$ | | | |

In Table 3 above there is provided an example of a multiplication of $Y_1 = +\frac{1}{2}$ and $X = +\frac{1}{2}$ (where $Y_1$ is a number initially set into the R register and X is represented as a sequence of applied input increments $\Delta X_i$) to form the product $Z = Y_1X = (+\frac{1}{2})(+\frac{1}{2}) = +\frac{1}{4}$ represented by the corresponding sequence of output increments $\Delta Z_i$.

As indicated in Table 3, the numbers initially set into the Y and R registers respectively are $2R_1 = 0$ (represented, as indicated by the arrow, in modified dinary as 01.0000)

and $Y_1=+\frac{1}{2}$ (represented as 1.1000). The quantity $X=+\frac{1}{2}$ is represented as a sequence of applied increments $\Delta X_1=+\frac{1}{2}$, $\Delta X_2=0$, $\Delta X_3=0$, etc.

During the first operation, operation 1, the quantity $$Y_1\underline{\Delta X_1}=+\frac{1}{2}$$

is added to the quantity $2R_1=0$ to form the quantity $$2R_1+Y_1\underline{\Delta X_1}=+\frac{1}{2}$$

Since $$Y_1\underline{\Delta X_1}$$

was represented in the form $1+\frac{1}{2}$, and $2R_1$ was in the form $1+0$, it is clear that $$2R_1+Y_1\underline{\Delta X_1}$$

is represented in the form $2+\frac{1}{2}$. In accordance with scaling rules (24), (25) and (26), since $$2R_1+Y_1\underline{\Delta X_1}$$

is equal to $+\frac{1}{2}$, the corresponding output increment $\Delta Z_1$ is $+1$ (representing $\Delta Z_1=+\frac{1}{2}$) and, therefore, in accordance with Equation 20, the next R number $$R_2=(2R_1+Y_1\underline{\Delta X_1})-\underline{\Delta Z_1}=(+\frac{1}{2})-(+1)=-\frac{1}{2}$$

represented in the form $1+(-\frac{1}{2})$ as 00.1000). In preparation for the next operation $R_2$ is doubled to form $2R_2=2(-\frac{1}{2})=-1$ (represented as $1+(-1)$ or 00.0000).

During operation 2, the same manipulations are again repeated. Since $$\underline{\Delta X_2}=0$$

the quantity $$Y_1\underline{\Delta X_2}=0$$

and is added (in the form 1.0000) to $2R_2$. Since $$2R_2+Y_1\underline{\Delta X_2}=-1$$

is less than $-\frac{1}{2}$, the corresponding value of $\underline{\Delta Z_2}$ is $-1$ (representing $\Delta Z_2=-\frac{1}{4}$). Subtracting $\underline{\Delta Z_2}$ and doubling, there is obtained $2R_3=0$.

Therefore, in the continuation of this process it is seen that during succeeding timing intervals only zero quantities are added to the R register, since $$\underline{\Delta X_3}=0, \Delta X_4=0, \text{etc.}$$

and also that all succeeding values of $\Delta X_i$ are zero. Thus it is clear that the product $Y_1X=+\frac{1}{4}$ is correctly formed as the stream of increments $\Delta Z_1=+\frac{1}{2}$, $\Delta Z_2=-\frac{1}{4}$, $\Delta Z_3=\frac{1}{8}$, $\Delta Z_4=\frac{1}{16}$, etc., since $$\Sigma\Delta Z_i=+\frac{1}{2}-\frac{1}{4}+\frac{1}{8}+\frac{1}{16}\ldots=+\frac{1}{4}$$

Such a summation to establish the number $Y_1X_1$ in a register may be accomplished, as hereinbefore stated, by applying the $\Delta Z$ output increments as $\Delta Y$ inputs to another computing block.

*Recognition formulas for formation of $\Delta Z_i$ and $2R_{i+1}$.*—Formation of each $\Delta Z$ increment and the corresponding values of $2R_{i+1}$, as shown in Table 3 for example, may be facilitated by operation in accordance with the following simple recognition formulas:

Let the digits which represent the number $$2R_i+\left[Y_i+\frac{\Delta Y_i}{2}\right]\underline{\Delta X_i}$$

be designated, starting from the lowest order digit, as $r^0$, $r^1, r^2, r^3 \ldots r^n, r^{n+1}, r^{n+2}$, where $r^n$ is the digit to the right of the binal point and $r^{n+1}$, $r^{n+2}$ are the digits to the left of the binal point. Thus, for example, referring back to Table 3, in the number representing:

$$2R_1+Y_1\underline{\Delta X_1}=+\frac{1}{2}\rightarrow 1\ \ 0\ \cdot\ 1\ \ 0\ \ 0\ \ 0$$
$$\phantom{xxxxxxxxxxxxxxxxx}\uparrow\ \ \uparrow\ \ \ \ \uparrow$$
$$\phantom{xxxxxxxxxxxxxxxx}r^{n+2}\ r^{n+1}\ \ r^n$$

(30)

the digits to the right and left of the binal points may be denoted as shown. Rules for formation of $2R_{i+1}$ and $\Delta Z_i$ can then be expressed by the following equations.

For the new digits of $2R_{i+1}$, which will be designated as the digits $R_{i+1}^1$, $R_{i+1}^2 \ldots R_{i+1}^n$, $R_{i+1}^{n+1}$, $R_{i+1}^{n+2}$:

$$R_{i+1}^{n+2}=0 \quad (31)$$

$$R_{i+1}^{n+1}=1-^n \quad (32)$$

$$R_{i+1}^n=r^{n-1} \quad (33^n)$$

$$R_{i+1}^{n-1}=r^{n-2} \quad (33^{n-1})$$

$$\bullet\ \ \ \ \bullet$$
$$\bullet\ \ \ \ \bullet$$
$$\bullet\ \ \ \ \bullet$$

$$R_{i+1}^1=r^0 \quad (33^0)$$

And for the formation of $\underline{\Delta Z_i}$, the value of each increment may be determined in accordance with the following Boolean equations:

$$\underline{\Delta Z_i}=-1 \text{ if } \overline{r}^{n+2}(r^{n+1}\overline{r}^n+\overline{r}^{n+1}r^n)=1 \quad (34)$$

$$\underline{\Delta Z_i}=0 \text{ if } r^{n+1}r^n+\overline{r}^{n+1}\overline{r}^n=1 \quad (35)$$

$$\underline{\Delta Z_i}=+1 \text{ if } r^{n+2}(r^{n+1}\overline{r}^n+\overline{r}^{n+1}r^n)=1 \quad (36)$$

It is seen from the above rules that the new digit $R_{i+1}^{n+2}$ of the number $2R_{i+1}$ is always 0, the digit $R_{i+1}^{n+1}$ is the opposite or complement of the digit $r^n$ and each of the remaining new digits $R_{i+1}^1 \ldots R^n$ is found as a result of a left shift of the corresponding digits $r^0 \ldots r^{n-1}$.

It is further seen that if $r^{n+1}$ and $r^n$ have different values, $\Delta Z_i$ will be $+1$ or $-1$ in accordance with the 1 or 0 value respectively of $r^{n+2}$, while if $r^{n+1}$ and $r^n$ have the same values, $\Delta Z_i$ will be 0.

The applicability of these formulas may be readily verified by reference to the example provided in Table 3. It is seen that, during each operation $i$, the values of $\Delta Z_i$ and of $2R_{i+1}$ may be obtained by applying these formulas to the digits of $2R_i+Y_i\Delta X_i$.

*Computing with assemblages of computing blocks.*—Referring now to FIG. 2, there is shown an assemblage of computing blocks 10-1, 10-2, 10-3 . . . 10-$j$ and 10-$j$+1 interconnected for the performance of a plurality of multiplications and/or additions of the types described hereinabove. As shown in FIG. 2, timing signals TS for the sequencing of these computations are supplied to each of the computing blocks by a source of timing signals 30, while setting signals SS for initially setting desired numbers into the Y and R registers of each of the computing blocks, are supplied to each of the computing blocks by a source of setting signals 31. As indicated in FIG. 2, through cooperative action of sources 30 and 31, at the beginning of a sequence of computational operations, signals representing predetermined numbers $A_1$, $A_2$ $A_3$ . . . $A_j$ are stored as $Y_1$ numbers of computing blocks 10-1 . . . through 10-$j$, respectively, and signals representing predetermined numbers $B_1$, $B_2$ $B_3$ . . . $B_j$ are stored as the $R_1$ numbers of these computing blocks. The number $Y_1=0$ is stored in computing block 10-$j$+1.

A source of stream signals 32 is operable during a computational sequence for providing signal streams representing predetermined sequences or streams of increments and, as shown in FIG. 2, provides a signal stream of increments $\Delta(A_0)_i$ representing successive digits of a predetermined number $A_0$, and also provides a stream of 0 valued increments, which are utilized as $\Delta_1Y$ and $\Delta_2Y$ inputs of various computing blocks. The time at which each increment of signal stream is produced by source 32 is determined by timing signals TS applied to source 32 by timing signal source 30, these timing signals serving to appropriately sequence the operation of source 32.

As illustrated in FIG. 2, the stream of increments $\Delta(A_0)_i$ formed by source 32 is applied to the $\Delta X$ input of computing block 10-1. The stream of 0 valued increments formed by source 32 is applied to the $\Delta_1 Y$ and $\Delta_2 Y$ inputs of each of the computing blocks 10–1 ... through 10–j. As further shown in FIG. 2, the $\Delta Z$ output of computing block 10–1 is coupled to the $\Delta X$ input of block 10–2, and in the same way the $\Delta Z$ output of 10–j in accordance with the preferred parallel mode of sequencing is illustrated in the following table, Table 4, wherein the increments formed by source 32 and block 10–1 through 10–5 are tabulated for eleven successive operation times.

TABLE 4
PARALLEL SEQUENCING

| Increment supplied by— | Operation times | | | | | | | | | | |
|---|---|---|---|---|---|---|---|---|---|---|---|
| | 1 | 2 | 3 | 4 | 5 | 6 | 7 | 8 | 9 | 10 | 11 |
| Source 32 | $\Delta(A_0)_1$ | $\Delta(A_0)_2$ | $\Delta(A_0)_3$ | $\Delta(A_0)_4$ | $\Delta(A_0)_5$ | $\Delta(A_0)_6$ | | | | | |
| Block 10–1 | | $\Delta(A_0A_1+B_1)_1$ | $\Delta(A_0A_1+B_1)_2$ | $\Delta(A_0A_1+B_1)_3$ | $\Delta(A_0A_1+B_1)_4$ | $\Delta(A_0A_1+B_1)_5$ | $\Delta(A_0A_1+B_1)_6$ | | | | |
| Block 10–2 | | | $\Delta[\ ]_1$ | $\Delta[\ ]_2$ | $\Delta[\ ]_3$ | $\Delta[\ ]_4$ | $\Delta[\ ]_5$ | $\Delta[\ ]_6$ | | | |
| Block 10–3 | | | | $\Delta[\ ]_1$ | $\Delta[\ ]_2$ | $\Delta[\ ]_3$ | $\Delta[\ ]_4$ | $\Delta[\ ]_5$ | $\Delta[\ ]_6$ | | |
| Block 10–4 | | | | | $\Delta[\ ]_1$ | $\Delta[\ ]_2$ | $\Delta[\ ]_3$ | $\Delta[\ ]_4$ | $\Delta[\ ]_5$ | $\Delta[\ ]_6$ | |
| Block 10–5 | | | | | | $\Delta[\ ]_1$ | $\Delta[\ ]_2$ | $\Delta[\ ]_3$ | $\Delta[\ ]_4$ | $\Delta[\ ]_5$ | $\Delta[\ ]_6$ |

Note.—For blocks 10–2, 10–3, 10–4, 10–5 the corresponding bracketed quantities are: $[(A_0A_1+B_1)]A_2+B_2]$, $[[(A_0A_1+B_1)]A_2+B_2]A_3+B_3$, $[[[(A_0A_1+B_1)]A_2+B_2]A_3+B_3]A_4+B_4$, $[[[[(A_0A_1+B_1)]A_2+B_2]A_3+B_3]A_4+B_4]A_5+B_5$.

each block 10–2 through 10–j—1 is coupled to the $\Delta X$ input of the succeeding block 10–3 ... through 10–j, respectively. The $\Delta Z$ output of block 10–j is connected to the $\Delta_1 Y$ input of block 10–j+1 and the 0 valued input stream is connected to the $\Delta_2 Y$ input of block 10–j+1.

There are at least two important ways in which the operations of source 32 and of computing blocks 10 may be sequenced under the control of timing signals provided by source 30.

In the first and preferred mode of sequencing, designated the parallel mode of sequencing, successive increments $\Delta(A_0)_i$ of the number $A_0$ are formed at a rapid rate (at a rate of one increment per operation time) by source 32 and are applied as successive $\Delta X$ inputs to computing block 10–1.

As hereinbefore explained, in response to the first applied increment $\Delta(A_0)_1$ and with only one operation time delay, computing block 10–1 forms the corresponding highest order digit $\Delta(A_0A_1+B_1)_1$ of the number $A_0A_1+B_1$, this increment being applied, as soon as it is formed, as the $\Delta X$ input to block 10–2, which in turn forms the highest order digit $\Delta[(A_0A_1+B_1)A_2+B_2]_1$ of the number $(A_0A_1+B_1)A_2+B_2$. In the continuation of this process, each successive computing block forms the highest order digit of the intermediate answer associated therewith and applies this digit to the succeeding computing block, so that after a delay of only j operation times from the application of the highest order digit of the number $A_0$, the highest order digit of the final answer is formed by computing block 10–j and is applied as a $\Delta Y$ input to block 10–j+1 for accumulation therein.

It is clear that in this operation, digits of the final answer are formed by block 10–j at the same rate at which digits of the input number $A_0$ are applied, each computing block contributing a delay of only one operation time between the application of an input digit and the formation of a correspondingly scaled output digit. This feature is common to both modes of sequencing.

In the preferred mode of sequencing, however, because of the rapid rate at which input digits $\Delta(A_0)_i$ are being applied, a type of parallel operation is obtained in which eventually all or nearly all of the computing blocks are sent into simultaneous operation so that earlier computing blocks are operating upon lower order digits at the same time that later computing blocks are forming higher order digits. This parallel type of sequencing is best illustrated by considering a specific example.

Assume hereafter that in FIG. 2, only five computing blocks are cascaded (j=5) and that computation is to be carried out to six significant digits. The way in which digits are formed by source 32 and blocks 10–1 ...

It will be noted, referring to Table 4, that in accordance with the described parallel mode of sequencing, many computing blocks may simultaneously be maintained in operation. For example, during the sixth operation time, all of the computing blocks 10–1 through 10–5 are simultaneously in operation, block 10–5 supplying the first or highest order digit of the final answer at the same time that blocks 10–4 through 10–1 are supplying the second, third, fourth and fifth order digits respectively of their intermediate answers.

It is evident that in this parallel mode of operation, extremely high computational speeds are obtained even for great numbers of successive multiplications and additions.

A good understanding of the speed of such operations, relative to that found in the prior art, may be obtained by considering that special case or situation in which each of computing blocks 10 performs only a multiplication (rather than a multiplication and an addition). This situation effectively exists when the $R_1$ numbers are all set in as 0 values—that is when $$B_1 = B_2 = B_3 \ldots = B_j = 0 \qquad (37)$$

In this situation computing block 10–1 forms $\Delta(A_0A_1+0)$ or $\Delta(A_0A_1)$ and in similar fashion computing blocks 10–2, 10–3 ... 10–j form, respectively, $\Delta(A_0A_1A_2)$, $\Delta(A_0A_1A_2A_3)$ ... $\Delta(A_0A_1A_2A_3 \ldots A_j)$. Thus, each computing block performs only a multiplication. The following table, Table 5, compares the time required to complete a plurality of multiplications, as performed by either corresponding plurality of cascaded computing blocks as shown in FIG. 2, or by a corresponding plurality of conventional multipliers. It is assumed that the multiplications are carried out to n significant digits.

TABLE 5

| Number j of multiplications performed | Number of operation times required for completion of multiplications | |
|---|---|---|
| | Cascaded computing blocks | Ordinary multipliers |
| j=1 | n | n |
| j=2 | n+1 | 2n |
| j=3 | n+2 | 3n |
| j=4 | n+4 | 4n |
| ⋮ | ⋮ | ⋮ |
| j=n | n+n | $n^2$ |

The great speed disadvantage of conventional multipliers arises from the fact that in each such multiplier an entire $n$ digit multiplication must be completed before the result can be utilized in a succeeding multiplier (since each digit is subject to change until the multiplication is completed), while in contrast with the cascaded computing blocks of the present invention, the digits formed are not subject to change and are immediately utilizable by succeeding computing blocks.

Referring now to the second principal mode of sequencing, the operations of source 32 and computing blocks 10-1 . . . through 10-6 (it being assumed as before that $j=5$), in this mode of sequencing input increments $\Delta(A_0)_1$ are supplied by source 32 at a slow enough rate so that there is no parallel operation of the computing blocks.

In this mode of sequencing, which is referred to hereinafter as a serial mode of sequencing, after the increment $\Delta(A_0)_1$, representing the highest order digit of the number $A_0$ is applied, formation and application of a second input digit is delayed until all operations upon the first digit have been completed and the resultant highest order digit of the final result is formed by block 10-5. In continuing operation, in the same way, each of the successive input digits is applied and each of the corresponding resultant digits is produced in response thereto. In the sequential mode of operation the computing blocks operate one after the other, rather than in any parallel or simultaneous operation. This is illustrated in the following table, Table 6, which presents, for the described serial mode of operation, the increments formed by source 32, and blocks 10-1 through 10-5, during thirteen successive operation times, it being assumed as before that $j=5$. It is also assumed that $B_1=B_2 \ldots =B_5=0$, so that only simple multiplications (rather than combined multiplications and additions) are being performed, and it is assumed that input increments $\Delta(A_0)_i$ are applied every seven operation times during an operational sequence so that sufficient time is allowed for the completion of operations upon one input digit before application of the next input digit.

source 30 will be provided at a later point in the specification. Detailed description of specific embodiments of computing blocks 10 and sources 30, 31 and 32 will be provided also.

However, it is useful at this time to generally point out one suitable form of source 32, which acts as a primary source of input increments. Although it will become clear that source 32 may have many forms well known to the art, in its preferred form source 32 principally comprises a plurality of computing blocks 10, so operated as to convert numbers periodically stored therein into required sequences of increments.

Thus, for example, as shown in FIG. 2, source 32 is seen to include a computing block 10-0 which is operable under the control of setting signals SS provided by source 31 and timing signals TS provided by source 32 to provide the sequence of increments $\Delta(A_0)_i$. As indicated in FIG. 2, only 0 valued increments are applied to the $\Delta X$ inputs of block 10-0. The value initially set into the R register of the block at the beginning of each computational sequence is $R_1=A_0$ (set in, in the form $2R_1=2A_0$). The initial values of $Y_1$ and the values of the $\Delta Y$ increments are not material in this application. However, as shown in FIG. 2, $\Delta_1 Y$ and $\Delta_2 Y$ have 0 values and $Y_1=0$.

Since for computing block 10-0, $R_1=A_0$ and $\Delta X_i=0$, by substituting these values in Equation 28 developed hereinabove, there is obtained the resultant equation:

$$\sum_{i=1}^{n} \Delta Z_i \cong R_1 \cong A_0 \qquad (38)$$

from which it can be inferred that:

$$\Delta Z_i = \Delta(A_0)_i \qquad (39)$$

thus demonstrating that block 10-0 in operation will produce the required sequence of increments $\Delta(A_0)_i$, representing the number $A_0$ initially set into the R register.

As further shown in FIG. 2, the stream of 0 valued increments supplied by source 32 is provided by a source unit 40. It will be appreciated that unit 40 may comprise

TABLE 6
SERIAL SEQUENCING

| Increments supplied by— | Operation times | | | | | | |
|---|---|---|---|---|---|---|---|
| | 1 | 2 | 3 | 4 | 5 | 6 | 7 |
| Source 32 | $\Delta(A_0)_1$ | | | | | | |
| Block 10-1 | | $\Delta(A_0 A_1)_1$ | | | | | |
| Block 10-2 | | | $\Delta(A_0 A_1 A_2)_1$ | | | | |
| Block 10-3 | | | | $\Delta(A_0 A_1 A_2 A_3)_1$ | | | |
| Block 10-4 | | | | | $\Delta(A_0 A_1 A_2 A_3 A_4)_1$ | | |
| Block 10-5 | | | | | | $\Delta(A_0 A_1 A_2 A_3 A_4 A_5)_1$ | |

| Increments supplied by— | Operation times | | | | | |
|---|---|---|---|---|---|---|
| | 8 | 9 | 10 | 11 | 12 | 13 |
| Source 32 | $\Delta(A_0)_2$ | | | | | |
| Block 10-1 | | $\Delta(A_0 A_1)_2$ | | | | |
| Block 10-2 | | | $\Delta(A_0 A_1 A_2)_2$ | | | |
| Block 10-3 | | | | $\Delta(A_0 A_1 A_2 A_3)_2$ | | |
| Block 10-4 | | | | | $\Delta(A_0 A_1 A_2 A_3 A_4)_2$ | |
| Block 10-5 | | | | | | $\Delta(A_0 A_1 A_2 A_3 A_4 A_5)_2$ |

Qualitative discussion of the described parallel and serial modes of sequencing of computing blocks 10-1 through 10-$j$, as shown in FIG. 2, is now completed. Detailed description of the manner in which such sequencing is obtained under control of timing signals supplied by a computing block 10 operated in the same manner as block 10-0, but with $R_1=0$ set in as an initial value. However, in the specific form of the invention described hereinbelow, constant valued increments are more easily generated. In the specific form of the invention to be described, any increment may be represented by two bilevel voltage signals U and V. Signal U at its high and low voltage levels (voltages $V_H$ and $V_L$) represents the plus (+) and minus (−) values of an increment while signal V at its high and low voltage levels represents the 1 and 0 values of the increment. Thus, as shown in FIG. 2, constant +0 valued increments are represented by signals $U_0$ and $V_0$ at their high and low levels, respectively, signal $U_0$ being formed on a conductor connected to a source (not shown) of high voltage $V_H$ and signal $V_0$ being formed on a conductor connected to a source (not shown) of low voltage $V_L$. Complementary signals $\overline{U}_0$ and $\overline{V}_0$ may be similarly formed.

Before beginning detailed description of specific embodiments of block 10 and sources 30, 31 and 32, one further important example of computation with assemblages of computing blocks will be described. In this example two streams of increments are effectively multiplied by one another to form a stream of increments representing their product. More particularly, a stream of increments, $\Delta(A_0)_i$, representing the digits of a number $B_0$, to form a resultant stream of increments $\Delta(A_0B_0)_i$ representing the digits of the product $A_0B_0$, these increments being accumulated to store the product $A_0B_0$ in a register.

Referring now to FIG. 3, there is shown an assemblage of computing blocks 10-1, 10-1', and 10-2 interconnected for performing the abovedescribed multiplication of streams $\Delta(A_0)_i$ and $\Delta(B_0)_i$ which, as shown in FIG. 3, are applied thereto by a pair of computing blocks 10-0 and 10-0', respectively, contained in source 32. All computing blocks are sequenced under the control of timing signals TS provided by source 30 while appropriate signals SS for utilization in the setting of initial conditions into the computing blocks are provided by source 31.

As shown in FIG. 3, blocks 10-0 and 10-0' are operated in the manner hereinbefore described to act as sources of the sequences of increment $\Delta(A_0)_i$ and $\Delta(B_0)_i$, respectively. To this end, initial values of $R_1 = A_0$ and $R_1 = B_0$ are set into the R registers of blocks 10-0 and 10-0', respectively, with 0 valued increments being applied as the $\Delta X$ inputs to these blocks.

Increments $\Delta(A_0)_i$ are applied to the $\Delta_1 Y$ input of block 10-1 and to the $\Delta X$ input of block 10-1'. Similarly increments $\Delta(B_0)_i$ are applied to the $\Delta_1 Y$ input of block 10-1' and to the $\Delta X$ input of block 10-1. Zero valued increments are applied to the $\Delta_2 Y$ inputs of blocks 10-1 and 10-1'. The $\Delta Z$ outputs of computing blocks 10-1 and 10-1' are connected to the $\Delta_1 Y$ and $\Delta_2 Y$ inputs, respectively, of computing block 10-2. As shown in FIG. 3, within block 10-2, the increments $\Delta Z_i$ and $\Delta Z'_i$ supplied by these outputs of blocks 10-1 and 10-1', respectively, are summed by summer 18 to produce corresponding total $\Delta Y_i$ increments which as hereinbefore explained, are accumulated in the Y register of block 10-2. As indicated in FIG. 3, the initial value set in of the Y number is $Y_1 = 0$, so that the value of the Y number after $n$ iterations is $$Y_{n+1} = Y_1 + \sum_{i=1}^{n} \Delta Y_i = \sum_{i=1}^{n} \Delta Y_i \qquad (40)$$

As shown in FIG. 3, zero valued increments are applied to the $\Delta X$ input of block 10-2 and the initial value set in of the R number is $R_1 = 0$.

It can now be demonstrated that the assemblage of computing blocks 10-1, 10-1' and 10-2, shown in FIG. 3, functions to multiply the numbers $A_0$ and $B_0$ represented by the two input streams of increments $\Delta(A_0)_i$ and $\Delta(B_0)_i$. More particularly, it will be shown that the stream of increments $\Delta Y_i$, produced by summer 18 in block 10-2, represent the digits of the products $A_0B_0$ and, therefore, the final number $Y_{n+1}$ accumulated in the Y register of block 10-2 at the end of an operational sequence will be the product $A_0B_0$.

Restating this in mathematical terms, it will be demonstrated that for block 10-2 the final value $Y_{n+1}$ of the Y number at the end of a sequence of operations is:

$$Y_{n+1} = \sum_{i=1}^{n} \Delta Y_i = A_0 B_0 \qquad (41)$$

From a consideration of FIG. 3, it is clear that for block 10-2

$$\Delta Y_i = \Delta Z_i + \Delta Z'_i \qquad (42)$$

where as indicated in FIG. 3, $\Delta Z_i$ is the designation of the output increments produced by block 10-1 and $\Delta Z'_i$ is the designation of the output increments produced by block 10-1'. Combining Equations 40 and 42 there is obtained:

$$Y_{n+1} = \sum_{i=1}^{n} \Delta Y_i = \sum_{i=1}^{n} (\Delta Z_i + \Delta Z'_i) \qquad (43)$$

$$Y_{n+1} = \sum_{i=1}^{n} \Delta Z_i + \sum_{i=1}^{n} \Delta Z'_i \qquad (44)$$

From a consideration of Equation 20 and the substitution of appropriate input quantities, it is seen that for block 10-1:

$$\sum_{i=1}^{n} \Delta Z_i = \sum_{i=1}^{n} \left[ (A_0)_i + \frac{\Delta(A_0)_i}{2} \right] \Delta(B_0)_i \qquad (45)$$

and similarly for block 10-1':

$$\sum_{i=1}^{n} \Delta Z'_i = \sum_{i=1}^{n} \left[ (B_0)_i + \frac{\Delta(B_0)_i}{2} \right] \Delta(A_0)_i \qquad (46)$$

Substituting these values of $\Sigma \Delta Z_i$ and $\Sigma \Delta Z'_i$ in Equation 44 and expanding, there is obtained:

$$Y_{n+1} = \sum_{i=1}^{n} \Delta Y_i = \sum_{i=1}^{n} (A_0)_i \Delta(B_0)_i + (B_0)_i \Delta(A_0)_i + \Delta(A_0)_i \Delta(B_0)_i \qquad (47)$$

The summation on the right side of Equation 47 may readily be evaluated. By rearranging terms there is obtained:

$$Y_{n+1} = \sum_{i=1}^{n} \Delta Y_i = \sum_{i=1}^{n} [(A_0)_i + \Delta(A_0)_i][(B_0)_i + \Delta(B_0)_i] - (A_0)_i (B_0)_i \qquad (48)$$

which, from a knowledge of finite differences is recognized to be equivalent to the form:

$$Y_{n+1} = \sum_{i=1}^{n} \Delta Y_i = \sum_{i=1}^{n} \Delta(A_0 B_0)_i \qquad (49)$$

where $\Delta(A_0 B_0)_i$ is the increment to the product $A_0 B_0$ at the $i$th interation. It is, therefore, clear that $$\sum_{i=1}^{n} \Delta(A_0 B_0)_i = A_0 B_0 \qquad (50)$$

and, therefore, by substitution in Equation 49 the required result is obtained, namely, that:

$$Y_{n+1} = \sum_{i=1}^{n} \Delta Y_i = A_0 B_0 \qquad (51)$$

Understanding of the manner in which such a multiplication of two streams of increments is carried out will be facilitated by consideration of the numerical example provided below in Table 7.

In connection with Table 7, it is assumed that the numbers $A_0$ and $B_0$, which are to be utilized, have the values $A_0 = +31/64$ and $B_0 = -7/16$, the quantities $2A_0 = 2(31/64)$, therefore, being initially set into the R register of block 10-0, and the quantity $2B_0 = 2(-7/16)$ being initially set into the R register block 10-0'. Table 7 shows quantities appearing in or associated with blocks 10-0, 10-0', 10-1, 10-1', and 10-2 (as shown in FIG. 3) for the first six computational operations of each of the blocks.

TABLE 7

INITIAL CONDITION

| Quantity | Block 10-0 | Block 10-0' | Block 10-1' | Block 10-1 | Block 10-2 |
|---|---|---|---|---|---|
| $2R_1$ | $2(^{31}/_{64}) \longrightarrow 01.111110$ | $2.-^{7}/_{16} \longrightarrow 00.001000$ | $0 \longrightarrow 01.000000$ | $2(0) \longrightarrow 01.000000$ | $0 \longrightarrow 01.000000$ |
| $Y_1$ | $0 \longrightarrow 1.000000$ | $0 \longrightarrow 1.000000$ | $0 \longrightarrow 1.000000$ | $0 \longrightarrow 1.000000$ | $0 \longrightarrow 1.000000$ |

FIRST OPERATION (SCALE OF ½)

| Quantity | Block 10-0 | Block 10-0' | Block 10-1' | Block 10-1 | Block 10-2 |
|---|---|---|---|---|---|
| $\underline{\Delta Y_1}$ | 0 | 0 | +1 | −1 | 0 |
| $\underline{\Delta X_1}$ | 0 | 0 | +1 | −1 | — |
| $\left(Y_1+\dfrac{\Delta Y_1}{2}\right)\underline{\Delta X_1}$ | $0 \longrightarrow 1.000000$ | $0 \longrightarrow 1.000000$ | $-¼ \longrightarrow 0.110000$ | $-¼ \longrightarrow 0.110000$ | — |
| $2R_1$ | $2(^{31}/_{64})=^{31}/_{32}\to 01.111110$ | $-⅞ \longrightarrow 00.001000$ | $0 \longrightarrow 01.000000$ | $0 \longrightarrow 01.000000$ | — |
| $2R_1+\left(Y_1+\dfrac{\Delta Y_1}{2}\right)\underline{\Delta X_1}$ | $^{31}/_{32} \longrightarrow 10.111110$ | $-⅞ \longrightarrow 01.001000$ | $-¼ \longrightarrow 01.110000$ | $-¼ \longrightarrow 01.110000$ | — |
| $\underline{\Delta Z_1}$ | +1 | −1 | 0 | 0 | — |
| $2R_2$ | $2(-^{1}/_{32})=-^{1}/_{16}\to 00.111100$ | $2(⅛)=¼ \to 01.010000$ | $2(-¼)=-½ \to 00.100000$ | $2(-¼)=-½\to 00.100000$ | — |
| $Y_2$ | $0 \longrightarrow 1.000000$ | $0 \longrightarrow 1.000000$ | $-½ \longrightarrow 0.100000$ | $+½ \longrightarrow 1.100000$ | $0 \longrightarrow 1.000000$ |

SECOND OPERATION (SCALE OF ¼)

| Quantity | Block 10-0 | Block 10-0' | Block 10-1' | Block 10-1 | Block 10-2 |
|---|---|---|---|---|---|
| $\underline{\Delta Y_2}$ | 0 | 0 | 0 | 0 | 0 |
| $\underline{\Delta X_2}$ | 0 | 0 | 0 | 0 | — |
| $\left(Y_2+\dfrac{\Delta Y_2}{2}\right)\underline{\Delta X_2}$ | $0 \longrightarrow 1.000000$ | $0 \longrightarrow 1.000000$ | $0 \longrightarrow 1.000000$ | $0 \longrightarrow 1.000000$ | — |
| $2R_2$ | $-^{1}/_{16} \longrightarrow 00.111100$ | $¼ \longrightarrow 01.010000$ | $-½ \longrightarrow 00.100000$ | $-½ \longrightarrow 00.100000$ | — |
| $2R_2+\left(Y_2+\dfrac{\Delta Y_2}{2}\right)\underline{\Delta X_2}$ | $-^{1}/_{16} \longrightarrow 01.111100$ | $¼ \longrightarrow 10.010000$ | $-½ \longrightarrow 01.100000$ | $-½ \longrightarrow 01.100000$ | — |
| $\underline{\Delta Z_2}$ | 0 | 0 | 0 | 0 | — |
| $2R_3$ | $2(-^{1}/_{16})=-⅛\to 00.111000$ | $2(¼)=½\to 01.100000$ | $2(-½)=-1\to 00.000000$ | $2(-½)=-1\to 00.000000$ | — |
| $Y_3$ | $0 \longrightarrow 1.000000$ | $0 \longrightarrow 1.000000$ | $-½ \longrightarrow 0.100000$ | $+½ \longrightarrow 1.100000$ | $0 \longrightarrow 1.000000$ |

THIRD OPERATION (SCALE OF ⅛)

| Quantity | Block 10-0 | Block 10-0' | Block 10-1' | Block 10-1 | Block 10-2 |
|---|---|---|---|---|---|
| $\underline{\Delta Y_3}$ | 0 | 0 | +1 | 0 | −1 |
| $\underline{\Delta X_3}$ | 0 | 0 | 0 | +1 | — |
| $\left(Y_3+\dfrac{\Delta Y_3}{2}\right)\underline{\Delta X_3}$ | $0 \longrightarrow 1.000000$ | $0 \longrightarrow 1.000000$ | $0 \longrightarrow 1.000000$ | $+½ \longrightarrow 1.100000$ | — |
| $2R_3$ | $-⅛ \longrightarrow 00.111000$ | $½ \longrightarrow 01.100000$ | $-1 \longrightarrow 00.000000$ | $-1 \longrightarrow 00.000000$ | — |
| $2R_3+\left(Y_3+\dfrac{\Delta Y_3}{2}\right)\underline{\Delta X_3}$ | $-⅛ \longrightarrow 01.111000$ | $½ \longrightarrow 10.100000$ | $-1 \longrightarrow 01.000000$ | $-½ \longrightarrow 01.100000$ | — |
| $\underline{\Delta Z_3}$ | 0 | +1 | −1 | 0 | — |
| $2R_4$ | $2(-⅛)=-¼\to 00.110000$ | $2(-½)=-1\to 00.000000$ | $2(0)=0\to 01.000000$ | $2(-½)=-1\to 00.000000$ | — |
| $Y_4$ | $0 \longrightarrow 1.000000$ | $0 \longrightarrow 1.000000$ | $-⅜ \longrightarrow 0.101000$ | $+½ \longrightarrow 1.100000$ | $-⅛ \longrightarrow 0.111000$ |

FOURTH OPERATION (SCALE OF ¹⁄₁₆)

| Quantity | Block 10-0 | Block 10-0' | Block 10-1' | Block 10-1 | Block 10-2 |
|---|---|---|---|---|---|
| $\underline{\Delta Y_4}$ | 0 | 0 | −1 | 0 | −1 |
| $\underline{\Delta X_4}$ | 0 | 0 | 0 | −1 | — |
| $\left(Y_4+\dfrac{\Delta Y_4}{2}\right)\underline{\Delta X_4}$ | $0 \longrightarrow 1.000000$ | $0 \longrightarrow 1.000000$ | $0 \longrightarrow 1.000000$ | $-½ \longrightarrow 0.100000$ | — |
| $2R_4$ | $-¼ \longrightarrow 00.110000$ | $-1 \longrightarrow 0.000000$ | $0 \longrightarrow 1.000000$ | $-1 \longrightarrow 0.000000$ | — |
| $2R_4+\left(Y_4+\dfrac{\Delta Y_4}{2}\right)\underline{\Delta X_4}$ | $-¼ \longrightarrow 01.110000$ | $-1 \longrightarrow 01.000000$ | $0 \longrightarrow 10.000000$ | $-1½ \longrightarrow 00.100000$ | — |
| $\underline{\Delta Z_4}$ | 0 | −1 | 0 | −1 | — |
| $2R_5$ | $2(-¼)=-½\to 0.100000$ | $2(0)=0\to 01.000000$ | $2(0)=0\to 01.000000$ | $2(-½)=-1\to 00.000000$ | — |
| $Y_5$ | $0 \longrightarrow 1.000000$ | $0 \longrightarrow 1.000000$ | $-^{7}/_{16} \longrightarrow 0.100100$ | $+½ \longrightarrow 1.100000$ | $-^{3}/_{16}\to 0.110100$ |

TABLE 7—Continued

FIFTH OPERATION (SCALE OF $\frac{1}{32}$)

| Quantity | Block 10-0 | Block 10-0' | Block 10-1' | Block 10-1 | Block 10-2 |
|---|---|---|---|---|---|
| $\underline{\Delta Y_5}$ | 0 | 0 | 0 | 0 | −1 |
| $\underline{\Delta X_5}$ | 0 | 0 | 0 | 0 | − |
| $\left(Y_5+\frac{\Delta Y_5}{2}\right)\underline{\Delta X_5}$ | 0 → 1.000000 | 0 → 1.000000 | 0 → 1.000000 | 0 → 1.000000 | − |
| $2R_5$ | −½ → 00.100000 | 0 → 01.000000 | 0 → 01.000000 | −1 → 00.000000 | − |
| $2R_5+\left(Y_5+\frac{\Delta Y_5}{2}\right)\underline{\Delta X_5}$ | −½ → 01.100000 | 0 → 10.000000 | 0 → 10.000000 | −1 → 01.000000 | − |
| $\underline{\Delta Z_5}$ | 0 | 0 | 0 | −1 | − |
| $2R_5$ | 2(−½) = −1 → 0.000000 | 2(0) = 0 → 01.000000 | 2(0) = 0 → 1.000000 | 0 → 1.000000 | − |
| $Y_6$ | 0 → 1.000000 | 0 → 1.000000 | −7/16 → 0.100100 | +½ → 1.100000 | −7/32 → 0.110010 |

SIXTH OPERATION (SCALE OF $\frac{1}{64}$)

| Quantity | Block 10-0 | Block 10-0' | Block 10-1' | Block 10-1 | Block 10-2 |
|---|---|---|---|---|---|
| $\underline{\Delta Y_6}$ | 0 | 0 | 0 | −1 | 0 |
| $\underline{\Delta X_6}$ | 0 | 0 | −1 | 0 | − |
| $\left(Y_6+\frac{\Delta Y_6}{2}\right)\underline{\Delta X_6}$ | 0 → 1.000000 | 0 → 1.000000 | +7/16 → 1.011100 | 0 → 1.000000 | − |
| $2R_6$ | −1 → 0.000000 | 0 → 01.000000 | 0 → 1.000000 | 0 → 01.000000 | − |
| $2R_6+\left(Y_6+\frac{\Delta Y_6}{2}\right)\underline{\Delta X_6}$ | −1 → 01.000000 | 0 → 10.000000 | +7/16 → 10.011100 | 0 → 10.000000 | − |
| $\underline{\Delta Z_6}$ | −1 | 0 | 0 | 0 | − |
| $2R_7$ | 2(0) = 0 → 01.000000 | 2(0) = 0 → 01.000000 | 2(+7/16) = 7/8 → 01.111000 | 2(0) = 0 → 01.000000 | − |
| $Y_7$ | 0 → 1.000000 | 0 → 1.000000 | −7/16 → 0.100100 | +31/64 → 1.011110 | −7/32 → 0.1100$_{10}$ |

As shown in Table 7, the sequence of increments $\Delta Z_1$ through $\Delta Z_6$ produced by block 10-0 represents in the trinary system the digits of the number $A_0 = 31/64$ (since $+\frac{1}{2}+0+0+0+0-\frac{1}{64} = +31/64$) while the sequence of increments $\Delta Z_1$ through $\Delta Z_6$ produced by block 10-0' represents the digits of the number $B_0 = -7/16$ (since $-\frac{1}{2}+0+\frac{1}{8}-\frac{1}{16}+0+0 = -7/16$). As further shown in Table 7, in response to these applied increments, blocks 10-1 and 10-1' produce corresponding sequences of $\Delta Z$ output increments, respectively, which are summed in block 10-2 to form the sequence of total $\Delta Y$ input increments $\Delta Y_1$ through $\Delta Y_6$. This sequence of $\Delta Y$ increments, formed in block 10-2, is seen to represent the six most significant digits of the required product $$(31/64)(-7/16) = -217/1024$$

Since only the six most significant digits of the product are shown as being formed, they cannot in this instance exactly represent the product $-217/1024$, but instead represent the number $-7/32$, $$(\text{since } 0+0-\frac{1}{8}-\frac{1}{16}-\frac{1}{32}+0 = -7/32)$$

which is the rounded-off value of $-217/1024$ when truncated to six significant digits.

This can be verified by noting that for block 10-2 the number $Y_7$, accumulated in the Y register thereof $$\left(\text{where } y_7 = \sum_{i=1}^{6} \Delta y_i\right)$$

at the completion of its sixth operation, is the number $-7/32$, expressed in modified dinary form as $$Y_7 = -7/32 \to 1.110010 \quad (52)$$

The exact product $-217/1024$, expressed in the same modified dinary notation, would have the form:

$$-217/1024 \to 0.1100100111 \quad (53)$$

Thus, it is seen that the number $Y_7$ accumulated in block 10-2 does actually comprise the six most significant digits of the exact product $-217/1024$.

It will be understood that if operation of the assemblage of computing blocks is continued for four additional operations, the remaining lower order digits of the act product will be developed.

It will be noted in this connection that, at the completion of the sixth operation, in addition to the truncated value, of the product held in the Y register of block 10-2, the residue of the exact product is contained in the R registers of blocks 10-1 and 10-1'. The numbers held in these register are $R_7 = 7/16$ and $R_7 = 0$ for blocks 10-1' and 10-1, respectively. When scaled appropriately by the factor 1/64, these values are $+7/1024$ and 0. The sum of these scaled values (7/1024) is the residue of the true product, as evidenced by the fact that $-7/32$ (the truncated value, plus 7/1024 (the residue), equals $-217/1024$ (the exact product).

Discussion of the interconnections and manner of operation of the assemblages of computing blocks shown in FIGS. 2 and 3 has now been completed. Detailed description of the structure and operation of specific embodiments of computing block 10 and sources 31 and 32, suitable for use in the arrangements shown in FIGS. 2 and 3, will now be provided.

Detailed Structure and Operation

Figure 4:
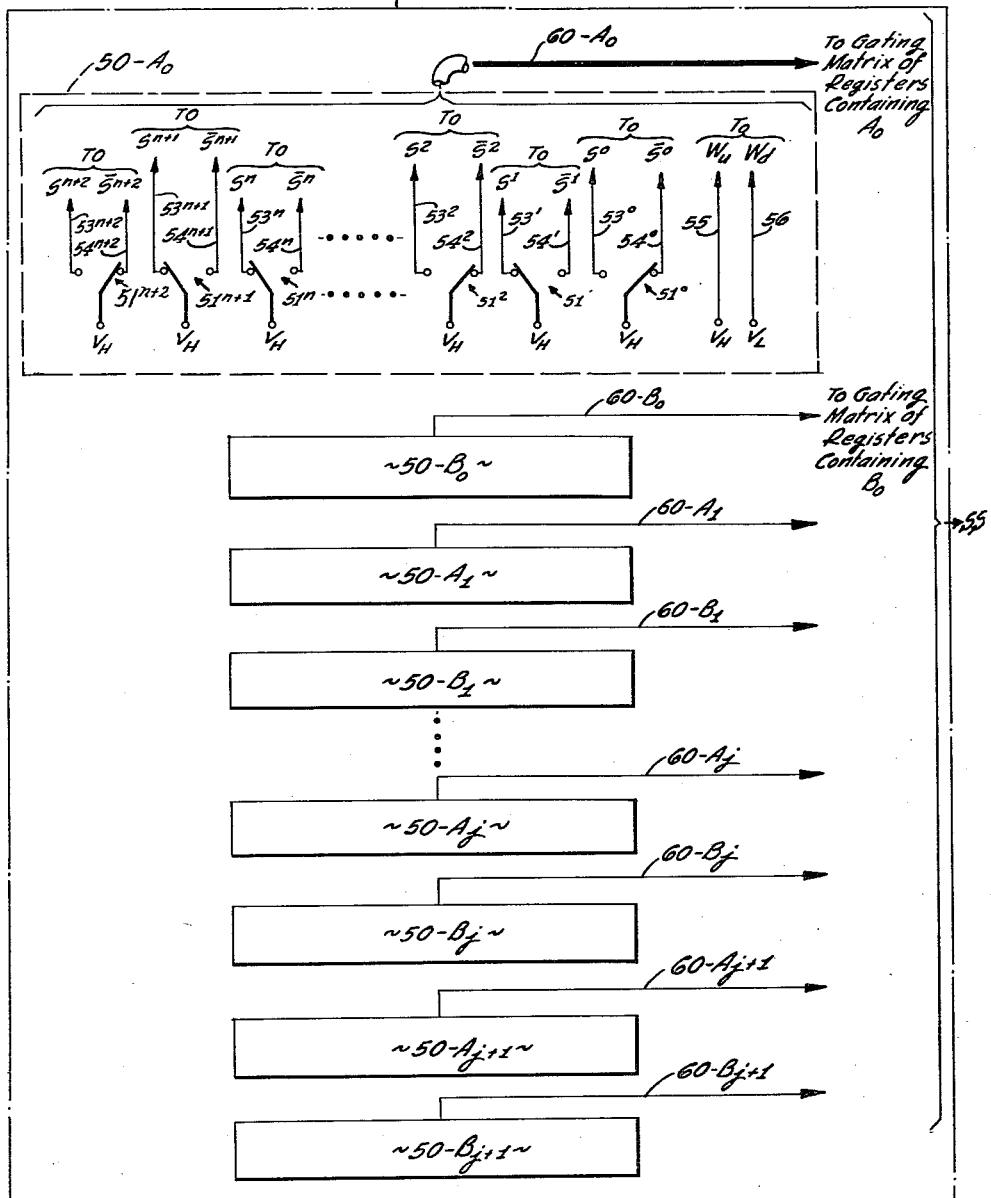
FIG. 4 is a schematic and circuit diagram of an embodiment of a source of setting signals, utilized in the control of the assemblages of computing blocks shown in FIGS. 2 and 3.

A partly block, partly circuit diagram of a specific embodiment of source 31 is shown in FIG. 4, and a representation of a specific embodiment of source 30 is shown in FIG. 5. Waveform charts illustrating timing signals produced by source 30, as they would appear in each of several modes of sequencing are shown in FIGS. 7a-7j, 8a-8j, 9a-9e and 10a-10e.

Figure 6A:
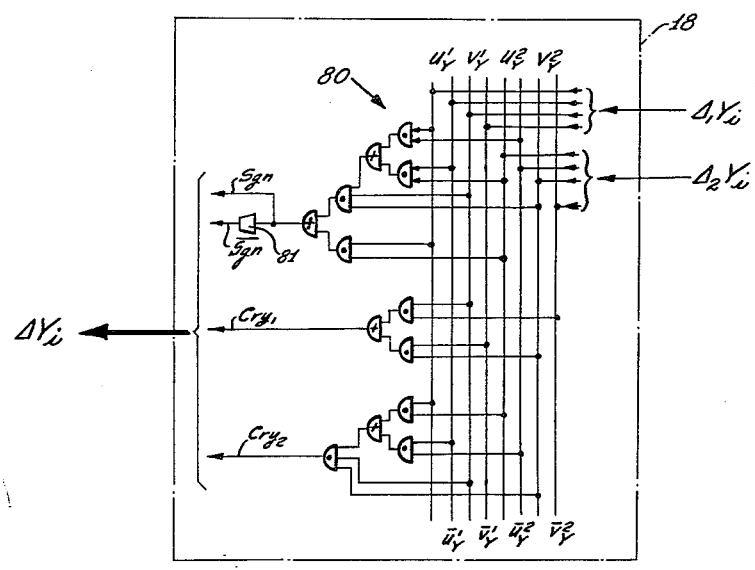
FIG. 6a is a circuit diagram of an embodiment of a summer circuit contained in the elemental computing block shown in FIG. 1.

Detailed illustration of the structure of specific embodiments of the several elements of computing block 10 is shown in FIGS. 6a, 6b and 6c. In FIG. 6a is shown a circuit diagram of a specific embodiment of summer 18. In FIG 6b there is shown a partly block, partly circuit diagram of specific embodiments of the Y register and of Y gating matrix 16, while in FIG 6c there is shown a corresponding diagram of specific embodiments of the R register, R rating matrix 14, and ΔZ register 20. As will be described hereinbelow, summer 18, Y gating matrix 16, and R gating matrix 14 are constructed as direct mechanizations of sets of logical (Boolean) equations which will be hereinafter developed from a consideration of the desired manner of operation of computing blocks 10.

From a preliminary consideration of FIGS. 6a, 6b and 6c, it is seen that in the specific embodiment of computing block 10 there shown, the Y register is provided as a plurality of storage flip-flops designated as flip-flops $Y^0$, $Y^1$, $Y^2$ ... $Y^n$, $Y^{n+1}$, while the R register is provided as a plurality of flip-flops $R^1$, $R^2$ ... $R^n$, $R^{n+1}$, $R^{n+2}$. The flip-flops $Y^1$ ... $Y^{n+1}$ are utilized for storing the correspondingly numbered digits, respectively, of the Y number, these digits being electrically stored as the "1" or "0" states of the corresponding flip-flops. Flip-flop $Y^0$ has a special function, to be later described, which is connected with the preservation of numbers initially set into the Y register. Flip-flops $R^1$ ... $R^{n+2}$ are similarly utilized for storing the digits of the R number.

As hereinbefore mentioned, setting signals SS which are utilized in Y gating matrix 16 and R gating matrix 14 for initally setting desired digits into the Y and R registers are provided by source 31, while timing signals TS to sequence the operations of these gating matrices are provided by source 30.

*Source 31.*—Referring now to FIG. 4, there is shown a suitable specific embodiment of source 31 which is seen to comprise a plurality of switch registers 50–$A_0$, 50–$B_0$, 50–$A_1$, 50–$B_1$ ... 50–$A_j$, 50–$B_j$ 50–$A_{j+1}$, 50–$B_{j+1}$ ... one switch register thus being provided for each different number (the numbers $A_0$, $B_0$, $A_1$, $B_1$ $A_2$ ... etc.) which is to be set into the Y and R registers of an assemblage of computing blocks 10. The switch registers may be essentially identical, each comprising, as shown for register 50–$A_0$ which is shown in detail, a plurality of single pole, double throw switches $51^0$, $51^1$ ... $51^{n+2}$, these switches having correspondingly respective pairs of output conductor $53^0$ and $54^0$, $53^1$ and $54^1$ ... etc. The pole of each switch is selectively positionable for connecting a source of high level voltage $V_H$ to either its output conductor 53 or its conductor 54. Each switch register also includes a pair of output conductors 55 and 56 which are connected respectively to a source of high level voltage $V_H$ and to a source of low level voltage $V_L$. All of these output conductors are gathered together in a cable 60–$A_0$ which, as indicated, is connected to the gating matrices associated with any Y or R registers which are to have the number $A_0$ initially set therein. Thus, for example, for the assemblage of computing blocks 10 shown in FIG. 3, cable 50–$A_0$ would be applied to the R gating matrix of computing block 10–0.

Similarly, the output conductors of switch 50–$B_0$ are collected in a cable 60–$B_0$ which is applied to the gating matrices associated with any registers in which the number $B_0$ is to be initially set. The output conductors of switch registers 50–$A_1$, 50–$B_1$ ... etc. are similarly applied to appropirate gating matrices.

Within the gating matrix to which any cable 60 is applied, output conductors $53^0$ and $54^0$, $53^1$ and $54^1$ ... etc. are connected, as will appear hereinbelow, to corresponding pairs of control conductors designated $S^0$ and $\overline{S}^0$, $S^1$ and $\overline{S}^1$, etc., respectively. Conductors 55 and 56 are connected to an additional pair of control conductors $W_u$ and $W_d$. These control conductors, as will be seen, normally have control signals of predetermined level established thereon in the absence of any connection to a switch register. Upon connection to a switch register, the levels of the control signal are completely determined by the levels maintained in the corresponding switch register output conductors.

The effect of connection of a switch register to a gating matrix, as will be shown, is that each flip-flop of the associated register initially has a 1 or 0 set therein in accordance with the "left" or "right" position of the pole of the correspondingly numbered switch. In this way digits of the number stored in the switches of a switch register are initially (at the beginning of each operational sequence) copied into the corresponding register flip-flops. On the other hand, if no connection is established between a gating matrix and any switch register, the effect obtained is that the digits of the number zero (expressed in the modified dinary form 01.0000 . . .) are automatically initially set into the flip-flops of the associated register. If a Y register is involved, the number actually set in will be 1.10000, where the lowest order "1" digit serves as a marker signal, as hereinbefore explained.

*Source 30.*—Referring now to FIG. 5, there is shown a suitable specific embodiment of source 30 of timing signals TS. As indicated in FIG. 5, the timing signals TS comprise a plurality of signals $Cl$, $F$, and $T_0$, $T_1$ ... $T_j$, $T_{j+1}$ which, as shown in FIG. 5, are recorded on separate tracks 68, 69, and $70_0$, $70_1$ ... $70_j$, $70_{j+1}$, respectively, of a rotatable magnetic drum 71. Upon rotation of drum 71, these signals are cyclically and repetitively reproduced by a corresponding plurality of associated read transducers 73, each transducer being coupled through an associated amplifier to an associated read circuit, which shapes and synchronizes the reproduced signal. A clock read circuit 74 is utilized in the formation of signal $Cl$, which, as indicated in FIG. 5, merely comprises a train of evenly spaced sharp negative timing pulses which demark time into successive equal timing intervals. The duration of each timing interval is equivalent to the time required for a single operation of a computing block, and thus corresponds to an operation time. A plurality of identical read circuits 75, $75_0$, $75_1$ ... $75_j$, $75_{j+1}$ are utilized in the formation of signals $F$, $T_0$, $T_1$ ... $T_j$, $T_{j+1}$, respectively. Signals $F$ and $T_0$ ... $T_{j+1}$ each have bilevel waveforms which are either at a high or low level during each timing interval defined by timing pulses $Cl$. The pattern of high and low levels for each signal is predetermined and is estabilshed in the recording of these signals on the tracks of drum 71.

Those skilled in the art will appreciate that any required predetermined signal pattern may be readily recorded on the tracks of drum 71. Suitable signal patterns will be presented hereinbelow in FIGS. 7, 8, 9 and 10 for various modes of sequencing of the assemblages of computing block 10 shown in FIGS. 2 and 3.

As will be more fully explained hereinbelow, signal $Cl$ and signal $F$ are applied to each of the computing blocks. Moreover, each of the computing blocks receives from source 30 a predetermined one of the signals $T_0$, $T_1$ ... $T_j$, $T_{j+1}$. (For the assemblage of computing blocks shown in FIG. 2, blocks 10–0, 10–1 ... 10–$j$, 10–$j$+1 receive signals $T_0$, $T_1$ ... $T_j$, $T_{j+1}$, respectively; while for the assemblage of computing blocks shown in FIG. 3, blocks 10–0, and 10–0' each receive signal $T_0$, computing blocks 10–1 and 10–1' each receive signals $T_1$ and computing block 10–2 receives signal $T_2$.). Thus, it is seen that each computing block 10 receives signal $Cl$, signal $F$ and a signal $T$.

Signal $F$ at its high level defines the initial time preceding each sequence of computational operations at which initial values are set into the Y and R registers of the computing blocks. When signal $F$ is at its high level, each computing block acts to set into its Y and R flip-flop registers the numbers contained in switch registers connected thereto; or, as hereinbefore stated, if switch registers are not connected, the computing block acts to set zero values into its Y and R registers.

For any computing block signal T at its high level defines those timing intervals (as demarked by signals C1) in which computational operations of the block will occur. In any timing interval in which signal T is at its high level, a single operation of the computing block will take place. Thus, there are to be six operations in a sequence of computational operations, then signal T will be at its high level for six sequential timing intervals, these timing intervals occurring either successively or intermittently as may be required by various modes of sequencing.

The manner in which any computing block 10, as illustrated in FIGS. 6a, 6b and 6c, utilizes the above-described setting signals SS and the timing signals TS, and the manner in which it is constructed for the performance of its computational operations, will now be fully explained.

*Representation of input and output increments.*—As noted before, referring to FIGS. 6b and 6c, the Y register of block 10 is mechanized as the plurality of flip-flops $Y^0$, $Y^1$ . . . $Y^n$, $Y^{n+1}$, while the R register is mechanized as the plurality of flip-flops $R^1$, $R^2$ . . . $R^{n+2}$. These flip-flops are utilized for storing the corresponding digits of the Y and R numbers.

The $\Delta Z$ register 20, as shown in FIG. 6c, is provided as two flip-flops U and V which are utilized to temporarily store each $\Delta Z$ increment formed by the computing block. As hereinbefore explained, each $\Delta Z$ increment has a value of $\pm 1$ or 0. The sign ($+$ or $-$) of each increment is stored in flip-flop U, as the 1 or 0 electrical state of the flip-flop, while the 1 or 0 magnitude of each $\Delta Z$ increment is similarly stored in flip-flop V.

As shown in FIG. 6c, flip-flop V produces a pair of complementary output signals, designated as signals V and $\overline{V}$, which indicate the electrical state of the flip-flop, signal V having a high or low level in accordance with the 1 or 0 state of the flip-flop and signal $\overline{V}$ having opposite levels. Flip-flop V also has a pair of inputs designated as the S (set) input and Z (zero) input and is responsive to application of a setting signal SV to the S input and to application of a zeroing signal ZV to the Z input for being set to its 1 or 0 electrical state, respectively. Each of the other flip-flops is responsive in the same way to similarly designated input signals and produces correspondingly designated output signals.

It is clear that, as indicated in FIG. 6c, $\Delta Z_1$ may be considered to be represented by signals U and V (and also complementary signals $\overline{U}$ and $\overline{V}$). This manner of representation is summarized in the following table:

TABLE 8

| Value of $\Delta Z$ | States of— | | Signals having high levels |
|---|---|---|---|
| | U | V | |
| +1 | 1 | 1 | UV |
| +0 | 1 | 0 | U$\overline{V}$ |
| −1 | 0 | 1 | $\overline{U}$V |

It will be clear that the $\Delta Z$ output of block 10 is connected to the $\Delta X$ input or $\Delta_1 Y$ or $\Delta_2 Y$ input of any other computing block, by applying the output signals U and V (and $\overline{U}$, $\overline{V}$) to these inputs.

For example, as indicated in FIG. 6c, input increments $\Delta X$ are represented by signals $U_X$ and $V_X$ (and complementary signals $\overline{U}_X$ and $\overline{V}_X$) the subscript X being used to denote that these signals are U, V signals which are being received at a $\Delta X$ input. Similarly, as shown in FIG. 6a, $\Delta_1 Y$ input increments are represented by signals $U_Y^1$ and $V_Y^1$ (and $\overline{U}_Y^1$, $\overline{V}_Y^1$) while $\Delta_2 Y$ increments are represented by signals $U_Y^2$ and $V_Y^2$ (and $\overline{U}_Y^2$, $\overline{V}_Y^2$).

The representation, as shown in FIG. 6a of the total $\Delta Y$ input increment $\Delta Y_i$ is somewhat different. It will be recalled that the total $\Delta Y$ increment may have the values $\pm 1$ or $\pm 2$ or $+0$. The sign $\pm$ ($+$ or $-$) of the increment is represented by a signal designated Sgn which has high or low levels in accordance with the $+$ or $-$ sign of the increment. A complementary signal $\overline{Sgn}$ is also formed. A 1 magnitude of the increment is represented by a signal $Cry_1$ at its high level, while a 2 magnitude of the increment is represented by a signal $Cry_2$ at its high level. A 0 magnitude is represented by signals $Cry_1$ and $Cry_2$ both at their low levels.

This representation of the total $\Delta Y$ increment is summarized in the following table, Table 9:

TABLE 9

| Value of total increment $\Delta Y$ | Representation | |
|---|---|---|
| +1 | Sgn | $Cry_1$ |
| −1 | $\overline{Sgn}$ | $Cry_1$ |
| +2 | Sgn | $Cry_2$ |
| −2 | $\overline{Sgn}$ | $Cry_2$ |
| 0 | Sgn | $\overline{Cry_1}$ $\overline{Cry_2}$ |

*Summer 18.*—Referring now, in detail, to the structure of summer 18, as shown in FIG. 6a, it is seen that summer 18 comprises a network generally designated 80 of "and" and "or" gates which combine the input signals $U_Y^1$, $\overline{U}_Y^1$, $V_Y^1$, $\overline{V}_Y^1$, $U_Y^2$, $\overline{U}_Y^2$, $V_Y^2$, $\overline{V}_Y^2$ to form the output signals Sgn, $Cry_1$ and $Cry_2$. Signal $\overline{Sgn}$ is formed by passing signal Sgn through an inverting amplifier 81.

In network 80 each "and" gate is represented by a semicircle with a dot ($\cdot$) therein, while each "or" gate is shown as a semicircle with a plus ($+$) therein. Network 80 is constructed as a direct mechanization of a set of Boolean logical equations which define the various output signals. These logical equations will now be developed from a consideration of the required operation of summer 18, as summarized in the following truth table, Table 10:

TABLE 10

| $\Delta_1 Y_i$ $U_Y^1 V_Y^1$ | $\Delta_2 Y_i$ $U_Y^2 V_Y^2$ | $Y_i$ | Sgn | $Cry_1$ | $Cry_2$ |
|---|---|---|---|---|---|
| +1 | +1 | +2 | + | 0 | 1 |
| +0 | +0 | +0 | + | 0 | 0 |
| −1 | −1 | −2 | − | 0 | 1 |
| +1 | +0 | +1 | + | 1 | 0 |
| +0 | −1 | −1 | − | 1 | 0 |
| −1 | +1 | +0 | + | 0 | 0 |
| +1 | −1 | +0 | + | 0 | 0 |
| +0 | +1 | +1 | + | 1 | 0 |
| −1 | +0 | −1 | − | 1 | 0 |

All possible combinations of the input signals $U_Y^1$, $V_Y^1$, $U_Y^2$, $V_Y^2$ and the corresponding values of the output signals Sgn, $Cry_1$ and $Cry_2$ are shown in Table 10. From inspection of Table 10 it is seen that signal Sgn represents a $+$ value (and is therefore at a high level) only if signals $U_Y^1$ and $U_Y^2$ are both high—or if signals $V_Y^1$ and $V_Y^2$ are both high and $U_Y^1$ is high and $U_Y^2$ is low, or $U_Y^1$ is low and $U_Y^2$ is high. This result may be summarized by the following logical equation which defines signal Sgn.

$$Sgn = U_Y^1 U_Y^2 + V_Y^1 V_Y^2 (U_Y^1 \overline{U}_Y^2 + \overline{U}_Y^1 U_Y^2) \quad (54)$$

Since signal $\overline{Sgn}$ is the complement of signal Sgn, it may be formed by merely inverting signal Sgn as expressed by the following logical equation:

$$\overline{Sgn} = [Sgn] \quad (55)$$

In the same manner, by inspection of Table 10, logical equations defining signals $Cry_1$ and $Cry_2$ may be immediately written, as follows:

$$Cry_1 = V_Y^1 \overline{V}_Y^2 + \overline{V}_Y^1 V_Y^2 \quad (56)$$

$$Cry_2 = V_Y^1 V_Y^2 (U_Y^1 U_Y^2 + \overline{U}_Y^1 \overline{U}_Y^2) \tag{57}$$

It is clear, referring to FIG. 6a, that network 80 there shown is constructed in exact accordance with the precedingly developed logical Equations 54, 55, 56 and 57.

*Gating matrices 16 and 14.*—Detailed consideration will now be given to the structure of Y gating matrix 16 and R gating matrix 14, as shown in FIGS. 6b and 6c, respectively. Referring initially to FIG. 6b, it is seen that Y gating matrix 16 comprises a plurality of logical gating networks designated $85^0$, $85^1$, $85^2$ ... $85^n$, $85^{n+1}$, respectively, each gating network being associated with the correspondingly numbered flip-flop $Y^0$, $Y^1$ ... $Y^n$, $Y^{n+1}$, respectively.

The gating networks $85^0$ ... $85^{n+1}$ are similar in most respects and are constructed as direct mechanizations of a set of Boolean equations which will be developed hereinbelow. Referring to network $85^1$, which is shown in detail in FIG. 6b, it is seen that this network receives a plurality of input signals designated $D^0$, $\overline{D}^0$, $D^2$, $\overline{D}^2$, $Y^1$, $\overline{Y}^1$, $Sgn$, $\overline{Sgn}$, $Cry_1$, $Cry_2$, $c^1$, $\overline{c}^1$, $C^1$, $\overline{C}^1$, $F$, $T$, and $Cl$. It also has a plurality of internally formed control signals $S_Y^1$, $\overline{S}_Y^1$ and $Wu_Y$, $Wd_Y$, each established on corresponding conductors, these conductors being connectable, as hereinbefore explained, to the corresponding output leads ($53^1$, $54^1$, 55, 56) of any associated switch register in source 31 of setting signals SS. The input signals F, T, and Cl are, of course, received from source 30 of timing signals TS, while the signals $Sgn$, $\overline{Sgn}$, $Cry_1$, $Cry_2$, as hereinbefore explained, are received from summer 18 and represent the total increment $\Delta Y_i$. Signals $c^1$, $\overline{c}^1$, $D^0$, $\overline{D}^0$, and $C^1$, $\overline{C}^1$ are applied thereto by the preceding network $85^0$, while signals $D^2$, $\overline{D}^2$ are applied by the succeeding network $85^2$. Signals $Y^1$ and $\overline{Y}^1$ are received from flip-flop $Y^1$.

In response to these signals, in each timing interval (as defined by timing pulses $Cl$) network $85^1$ combines these signals to form resultant output signals $y^1$, $\overline{y}^1$, $D^1$, $\overline{D}^1$, $c^2$, $\overline{c}^2$, $C^2$, $\overline{C}^2$ and $SY^1$, $ZY^1$. Signals $y^1$, $\overline{y}^1$ are applied to R gating matrix 14, as will be later explained; signals $D^1$, $\overline{D}^1$ are applied to both the preceding and succeeding gating networks; signals $c^2$, $\overline{c}^2$, $C^2$ and $\overline{C}^2$ are applied to the succeeding gating network; and signals $SY^1$ and $ZY^1$ are applied as setting and zeroing signals to flip-flop $Y^1$.

Each of the other gating networks receives corresponding input signals and forms corresponding output signals. Thus, it can be said that any gating network $85^k$ (where k is one of the digits 0, 1, 2 ... n, n+1) is responsive to signals $D^{k-1}$, $\overline{D}^{k-1}$, $D^{k+1}$, $\overline{D}^{k+1}$, $Y^k$, $\overline{Y}^k$, $Sgn$, $\overline{Sgn}$, $Cry_1$, $Cry_2$, $c^k$, $\overline{c}^k$, $C^k$, $\overline{C}^k$, F, T and Cl to form resultant output signals $y^k$, $\overline{y}^k$, $D^k$, $\overline{D}^k$, $c^{k+1}$, $\overline{c}^{k+1}$, $C^{k+1}$, $\overline{C}^{k+1}$ and $SY^k$, $ZY^k$.

Where a preceding or succeeding network is not available to provide required input signals, these signals are supplied by fixed voltage sources. Thus, for network $85^0$ three pairs of signals $c^0$ and $\overline{c}^0$, $D^{-1}$ and $\overline{D}^{-1}$, $C^0$ and $\overline{C}^0$ are each provided at their low and high levels, respectively. Similarly, for network $85^{n+1}$, signals $D^{n+2}$ and $\overline{D}^{n+2}$ are provided at their high and low levels, respectively.

Referring now in detail to the structure of R gating matrix 14, as shown in FIG. 6c, it is seen that matrix 14 comprises a plurality of gating networks $88^0$ ... $88^{n+1}$ and an additional gating network $88^{n+2}$. Referring to network $88^1$, which is shown in detail, it is seen that network $88^1$ receives the following input signals: the signals $R^1$ and $\overline{R}^1$ formed by flip-flop $R^1$; the signals $y^1$ and $\overline{y}^1$ (which are supplied by network $85^1$); the signals $U_X$, $\overline{U}_X$, $V_X$, $\overline{V}_X$ which represent the applied $\Delta X$ increment; the timing signals F, T and Cl which are supplied by source 30 of timing signals TS; and a pair of signals $g^1$ and $\overline{g}^1$ which are supplied by the preceding network $88^0$. Network $88^1$ also has internally formed control signals $S_R^1$, $\overline{S}_R^1$ and $Wu_R$, $Wd_R$, which are established on corresponding control conductors which are connectable to the corresponding output conductors ($53^1$ and $54^1$, 55 and 56) of any associated switch register in source 31 of setting signals SS. Signals $S_R^1$, $\overline{S}_R^1$ and $Wu_R$ are normally maintained at a low level by coupling through resistors to a source of voltage $V_L$, while signal $Wd_R$ is normally maintained at a high level by coupling through a resistor to a source of voltage $V_H$. It will be understood, however, that upon connection to a switch register, signals $Wu_R$ and $Wd_R$ will have reversed (high and low) levels and the levels of signals $S_R^1$ and $\overline{S}_R^1$ will be determined by the position of the corresponding switch $51^1$.

In response to the abovementioned input signals network $88^1$ forms the following resultant output signals: signals $SR^2$ and $ZR^2$ which are applied to flip-flop $R^2$; and signals $g^2$ and $\overline{g}^2$ which are applied to the succeeding network $88^2$. A pair of signals $r^1$ and $\overline{r}^1$ are also formed by network $88^1$ and utilized in the formation of signals $SR^2$ and $ZR^2$. Each of the gating networks $88^0$ ... $88^{n+1}$ is similarly responsive to corresponding input signals for forming corresponding resultant signals. Network $88^{n+2}$ is singular in that it receives as additional inputs the signals $r^{n+1}$, $\overline{r}^{n+1}$ which are formed by network $88^{n+1}$ and the signals $r^n$, $\overline{r}^n$ formed by network $88^n$ and operates to produce as outputs the signals SU, ZU, and SV, ZV. Moreover, for network $88^{n+2}$, signals $y^{n+2}$, $\overline{y}^{n+2}$ are supplied at fixed low and high voltage levels by connection through resistors to sources of voltage $V_L$ and $V_H$, respectively. Signals $g^0$ and $\overline{g}^0$ are similarly applied to their low and high levels to network $88^0$.

As hereinbefore explained, each of the gating networks $85^k$ and $88^k$ (where k has any of the values 0, 1, 2 ... n+1, n+2) in respectivly Y gating matrix 16 and R gating matrix 14 are constructed as direct mechanizations of a set of Boolean logical gating equations which will now be developed. As a preliminary to this development, the significance of the principal signals utilized in the gating network wil be set forth in the following table, Table 11:

TABLE 11

| Signal | Significance |
|---|---|
| $Y^k$ | Signifies value (1 or 0) of the kth digit of the number $Y_i$. |
| $Y_{i+1}^k$ | Signifies value (1 or 0) of the kth digit of the number $Y_{i+1}$ (where $Y_{i+1} = Y_i + \Delta Y_i$). |
| $SY^k$, $ZY^k$ | Setting and zeroing signals which store the digit $Y_{i+1}^k$ in flip-flop $Y^k$. |
| $C^k$ | Signifies value (1 or 0) of carry digit to be utilized in forming the digit $Y_{i+1}^k$. Those carry digits result from the addition of $\Delta Y_i$ to $Y_i$ to form $Y_{i+1}$. |
| $y^k$ | Signifies value (1 or 0) of the kth digit of the number $Y_i + \dfrac{\Delta Y_i}{2}$ |
| $c^k$ | Signifies value (1 or 0) of carry digit to be utilized in forming the digit $y^k$. These carry digits result from addition of $\dfrac{\Delta Y_i}{2}$ to the number $Y_i$. |
| $D^k$ | The signal $D^k$ indicates whether the marker signal is stored in any of the flip-flops $Y^0$ ... $Y^k$. $D^k = 1$ if marker signal is in flip-flop $Y^k$ |

TABLE 11—Continued

| Signal | Significance |
|---|---|
| | or below and equals $0(\overline{D}^k)$ if marker is stored in any flip-flop above flip-flop $Y^k$. Note that $D^{-1}$ has a permanent 0 value and $D^{n+2}$ has permanent 1 value. |
| $Sgn$, $Cry_1$, $Cry_2$ | Signify respectively sign and magnitudes of 1 and 2 of the total increment $\Delta Y_i$, as hereinbefore explained. |
| $F$, $T$ | Timing signals, as hereinbefore explained, defining respectively timing intervals in which initial setting is performed and timing intervals in which operations are performed. |
| $Cl$ | Master clock signal defining successive timing intervals. |
| $S_Y{}^k$, $\overline{S}_Y{}^k$ | Define value to be initially set in flip-flop $Y^k$ provided switch register is connected. |
| $Wu_Y$, $Wd_Y$ | Indicate whether switch register is coupled to the Y register. $Wu_Y=0$, $Wd_Y=1$ if switch register is not connected, and have reverse values if switch register is connected. |
| $R^k$ | Signifies value of $k$th digit of the number $2R_i$. |
| $r^k$ | Signifies value of $k$th digit of the number $$2R_i + \left[Y_i + \frac{\Delta Y_i}{2}\right] \Delta X_i$$ |
| $g^k$ | Signifies value of carry digit to be utilized in forming the digit $r^k$. The digit $g^k$ results from the binary addition, in the preceding gating network of the digits represented, by $R^{k-1}$, $y^{k-1}$ and $g^{k-1}$. Note that $g^0$ has permanent 0 value. |
| $y^k$ | As noted, above signifies the value of $k$th digit of the number $$Y_i + \frac{\Delta Y_i}{2}$$ Note that $y^{n+2}$ has permanent 0 value. |
| $SR^k$, $ZR^k$ | Setting and zeroing signals formed to set the $k$th digit of the new number $2R_{i+1}$ into flip-flop $R^k$. |
| $SU$, $ZU$, $SV$, $ZV$ | Setting and zeroing signals formed by network $88^{n+2}$ to store in flip-flop U and V, respectively, the sign ($\pm$) and magnitude (1 or 0) of the $\Delta Z$ output increment $\overline{\Delta Z_i}$. |
| $U_X$, $V_X$ | Signify, respectively, the sign ($\pm$) and the magnitude (1 or 0) of the applied $\Delta X$ input increment $\overline{\Delta X_i}$. |
| $F$, $T$, $Cl$ | Timing signals, as hereinbefore explained. |
| $S_R{}^k$, $\overline{S}_R{}^k$ | Define value to be initially set into flip-flop $R^k$, provided switch register is coupled to R register. |
| $Wu_R$, $Wd_R$ | Indicate whether switch register is coupled to R register. $Wu_R=0$, $Wu_R=1$ if switch register is not coupled, and have reverse values if a switch register is coupled. |

With the significance of the principal signals now defined, in Table 11, development of the logical gating equations which define the mechanization of networks $85^k$ and $88^k$ may now be begun.

*Y Gating matrix 16.*—Attention is first directed to the development of the logical equations which define the structure of networks $85^k$ in Y gating matrix 16. This will be begun with development of equations defining the signals $D^k$ and $\overline{D}^k$.

*Signals $D^k$ and $\overline{D}^k$.*—It will be remembered that signal $D^k$ is to have the value 1, if the marker signal is stored in flip-flop $Y^k$ or any preceding flip-flop and has the value $0(\overline{D}^k=1)$ if the marker signal is stored in any succeeding flip-flop. Signal $D^k$, may, therefore, be readily defined in terms of the signal $Y^k$ formed by flip-flop $Y^k$ and the signal $D^{k-1}$ formed by the preceding gating network. This is best illustrated by the following network by network development of the general equation.

for network $85^0$:
$$D^0 = Y^0 + D^{-1} \tag{58}$$

for network $85^1$:
$$D^1 = Y^1 + Y^0 + D^{-1}$$
$$= Y^1 + D^0 \tag{59}$$

for network $85^2$:
$$D^2 = Y^2 + Y^1 + Y^0 + D^{-1}$$
$$= Y^2 + D^1 \tag{60}$$

and thus in the general case for network $85^k$:
$$D^k = Y^k + D^{k-1} \tag{61}$$

The general equation for the complementary signal $\overline{D}^k$ is obtained by complementing both sides of the above equation to obtain:
$$\overline{D}^k = \overline{Y}^k \overline{D}^{k-1} \tag{62}$$

It is convenient at this time to point out that the position in the Y register of any flip-flop $Y^k$ relative to the flip-flop in which the marker signal is then stored can be readily determined in some detail by use of the signals $D^{k+1}$, $D^k$, $D^{k-1}$ and their complements, as summarized in the following table, Table 12:

TABLE 12

| Values of— | | | Position of flip-flop $Y^k$ relative to marker signal | Identification |
|---|---|---|---|---|
| $D^{k+1}$ | $D^k$ | $D^{k-1}$ | | |
| 0 | 0 | 0 | More than one below marker signal. | $\overline{D}^{k+1}\overline{D}^k=1$ |
| 1 | 0 | 0 | One below marker signal | $D^{k+1}\overline{D}^k=1$ |
| 1 | 1 | 0 | Coincidence, flip-flop $Y^k$ holds marker signal. | $D^k\overline{D}^{k-1}=1$ |
| 1 | 1 | 1 | Above marker signal | $D^kD^{k-1}=1$ |

*Formation of Signals $Y_{i+1}{}^k$ and $C^{k+1}$.*—As noted hereinbefore, signals $Y_{i+1}{}^k$ and $C^{k+1}$ represent the sum and carry digits resulting from the addition or subtraction (in accordance with the sign of $\Delta Y_i$) of the total $\Delta Y$ increment $\Delta Y_i$ to the number $Y_i$ stored in the Y register, to thereby form the new number $Y_{i+1}$. Generally, in any gating network $85^k$, signals $Y_{i+1}{}^k$ and $C^{k+1}$ represent merely the binary sum and carry digits resulting from the binary addition or subtraction of the values represented by $Y^k$ and $C^k$.

The increment $\Delta Y_i$ (represented by $Sgn$, $Cry_1$ and $Cry_2$) is summed to the number $Y_i$ by introducing $Cry_1$ as a carry (or borrow if the sign of $\Delta Y_i$ is negative) to that stage which contains the marker signal and by introducing $Cry_2$ as a carry (or borrow) to the succeeding stage which is one above the marker signal.

Since the marker signal is not a true digit of the number $Y_i$, the flip-flop which holds the marker signal is treated, for the purposes of summing $\Delta Y_i$, as though it had a 0 valued signal stored therein. Moreover, since the marker signal is to be shifted one stage right at each operation, the signal $Y_{i+1}{}^k$ of the stage which is one below the marker signal is automatically made equal to 1, so that at the completion of an operation the marker signal will automatically be stored in the corresponding flip-flop. These and other situations affecting the formation of $Y_{i+1}{}^k$ and $C^{k+1}$ are summarized in the following table, Table 13:

*Formation of signals $SY^k$ and $ZY^k$.*—As noted above, these are the zeroing and setting signals for flip-flops $Y^k$. Logical equations defining these signals are:

(for $k=0, 1 \ldots n-1$):

$$SY^k = TY_{i+1}{}^k Cl + FCl S_Y{}^k Wu_Y \quad (67a)$$

$$ZY^k = T\overline{Y}_{i+1}{}^k Cl + FCl(Wd_y + \overline{S}_Y{}^k) \quad (68a)$$

TABLE 13

| Position in Y register | Identification | Partial logical equations | Explanation |
|---|---|---|---|
| One below marker signal | $D^{k+1}\overline{D}^k$ | $Y_{i+1}{}^k = 1 = D^{k+1}\overline{D}^k$ | Marker signal will be shifted to stage below marker signal. |
| | | $C^{k+1} = Cry_1 D^{k+1}\overline{D}^k$ | Introduction of $\pm 1$ magnitude of $\Delta Y_i$ as carry (or borrow) signal. |
| At marker signal | $D^k\overline{D}^{k-1}$ | $Y_{i+1}{}^k = D^k\overline{D}^{k-1}C^k$ (Correct for $k=1 \ldots n+1$, but will be modified for $k=0$.) | Since stage containing marker signal is treated as though it stored a 0, next value of Y digit, $Y_{i+1}{}^k$ will be same as carry digit. |
| | | $C^{k+1} = D^k\overline{D}^{k-1}(\overline{Sgn}C^k + Cry_2)$ | Since true value of Y digit is 0, there can only be a carry if $Cry_2=1$ and there can only be a borrow if $\Delta Y_i$ is negative ($\overline{Sgn}$) and there is borrow from preceding stage ($C^k$). |
| Above marker signal | $D^k D^{k+1}$ | $Y_{i+1}{}^k = D^k D^{k-1}(Y^k\overline{C}^k + \overline{Y}^k C^k)$ | Ordinary binary addition of the digits represented by $Y^k$ and $C^k$. |
| | | $C^{k+1} = D^k D^{k-1}(SgnY^k C^k + \overline{Sgn}\,\overline{Y}^k C^k)$ | Ordinary formation of binary carry or borrow in accordance with the sign of $\Delta Y_i$ ($Sgn$ or $\overline{Sgn}$). |

In Table 13 are presented partial logical equations defining signals $Y_{i+1}{}^k$ and $C^{k+1}$ for each of the various situations. The complete logical equation defining signal $Y^k$ is obtained by summing the corresponding partial logical equations and reducing to obtain:

(for $k=1 \ldots n+1$):

$$Y_{i+1}{}^k = D^{k+1}\overline{D}^k + D^k\overline{D}^{k-1}C^k + D^{k-1}Y^k\overline{C}^k + D^{k-1}\overline{Y}^k C^k \quad (63a)$$

The modified form of $Y_{i+1}{}^k$ for the situation in which $k=0$ is:

(for $k=0$):

$$Y_{i+1}{}^k = D^{k+1}\overline{D}^k + D^k\overline{D}^{k-1} + D^k D^{k-1} Y^k \overline{C}^k + D^k D^{k-1} \overline{Y}^k C^k \quad (63b)$$

The change made, for network $85^0$ is that $D^k\overline{D}^{k-1}$ replaces $D^k\overline{D}^{k-1}C^k$. This signifies that when a marker signal is placed in flip-flop $Y^0$, it will not be removed during the course of an operation sequence. This feature is utilized when an initial number is inserted from a switch register into the Y register, which is not to be changed during an operation sequence. The number inserted will include a 1 valued marker signal at its lowest order digit, and this marker will be retained in flip-flop $Y_0$ throughout the operation sequence, thus preventing any erroneous identification of a higher order digit as a marker signal.

The complementary signal $\overline{Y}_{i+1}{}^k$ is defined by a simple inversion:

(for $k=0 \ldots n+1$):

$$\overline{Y}_{i+1}{}^k = \overline{[Y_{i+1}{}^k]} \quad (64)$$

The complete logical equation defining $C^{k+1}$ is similarly obtained from consideration of Table 13.

(for $k=0 \ldots n+1$):

$$C^{k+1} = D^{k+1}\overline{D}^k Cry_1 + D^k\overline{D}^{k-1}\overline{Sgn}C^k + D^k\overline{D}^{k-1}Cry_2 + D^k D^{k-1} SgnY^k C^k + D^k D^{k-1}\overline{Sgn}\overline{Y}^k C^k \quad (65)$$

$$\overline{C}^{k+1} = \overline{[C^{k+1}]} \quad (66)$$

(for $k=n, n+1$):

$$SY^k = TY_{i+1}{}^k Cl + FCl(S_Y{}^k Wu_Y + Wd_y) \quad (67b)$$

$$ZY^k = T\overline{Y}_{i+1}{}^k Cl + FCl\overline{S}_Y{}^k Wu_Y \quad (68b)$$

It is seen that for all flip-flops, the values set therein at the completion of an operation (as defined by signal T at its high level and the occurrence of a clock pulse Cl), correspond to the values formed, during the operation, of $Y_{i+1}{}^k$. In this way, at the completion of each operation, the digits of the new number $Y_{i+1}$ are stored therein.

At the completion of a time interval in which insertion of initial values is to be accomplished (indicated by FCl), the values inserted will correspond to the values of $S_Y{}^k$, provided that a switch register is connected ($Wu_Y$). However, if a switch register is not connected ($Wd_Y$), the values inserted will correspond to the insertion of the marker signal and the digits of the number zero (1.1000 ...). Thus, when $Wd_Y$ is high 1 valued
↑
signals are initially stored in flip-flop $Y^n$ and $Y^{n+1}$ 1 and 0 valued signals are stored in flip-flops $Y^0 \ldots Y^{n-1}$.

*Formation of the signals $y^k$ and $\overline{y}^k$, and $c^{k+1}$, $\overline{c}^{k+1}$.*— It will be remembered that $y^k$ and $\overline{c}^{k+1}$ represent the sum and carry (or borrow) digits resulting from the summation of $Y_i$ and $$\frac{\Delta Y_i}{2}$$

The manner in which the summation is carried out is very similar to the formation of $Y_i$ and $\Delta Y_i$. The principal difference is that since $$\frac{\Delta Y_i}{2}$$

is being added, the points of introduction of $Cry_2$ and $Cry_1$ are shifted one position over to the right, so that $Cry_1$ is introduced as initial carry (or borrow) to that stage which is one below the marker signal and $Cry_2$ is introduced as a carry to the succeeding stage containing the marker signal.

Formation of signals $y^k$ and $c^k$ are summarized, for various positions in the Y register in the following Table 14:

TABLE 14

| Position in Y register | Identification | Partial logical equations | Explanation |
|---|---|---|---|
| One below marker signal | $D^{k+1}\overline{D}^k$ | $y^k = D^{k+1}\overline{D}^k Cry_1$ | Since digit below marker signal must have 0 value, value of sum digit must be equal to $Cry_1$. |
|  |  | $c^{k+1} = (\overline{Sgn}\,Cry_1 + Cry_2)D^{k+1}\overline{D}^k$ | Since digit below marker signal has 0 value, there can only be a carry if $Cry_2=1$ and there can only be a borrow if $\underline{\Delta Y}_i = -1(\overline{Sgn}\,Cry_1)$. |
| At marker signal | $D^k\overline{D}^{k-1}$ | $y^k = D^k\overline{D}^{k-1}c^k$ | Since true value of digit at marker signal is 0, value of sum digit must be equal to carry from previous stage ($c^k$). |
|  |  | $c^{k+1} = D^k\overline{D}^{k-1}\overline{Sgn}\,c^k$ | Again, since true value of digit at marker signal is 0, there cannot be a carry, and there can be a borrow only if the sign of $\Delta Y_i$ is negative ($\overline{Sgn}$) and there is a carry ($c^k$) from the preceding stage. |
| Above marker signal | $D^k D^{k-1}$ | $y^k = D^k D^{k-1}(Y^k\overline{c}^k + \overline{Y}^k c^k)$ | Ordinary binary addition of the digits represented by $c^k$ and $y^k$. |
|  |  | $c^{k+1} = D^k D^{k-1}(Sgn\,Y^k c^k + \overline{Sgn}\,\overline{Y}^k c^k)$ | Formation of ordinary binary carry or borrow in accordance with the sign ($Sgn$ or $\overline{Sgn}$) of $\Delta Y_i$. |

The complete logical equations defining $y^k$ and $c^{k+1}$ are obtained by summing the partial equations and reducing to obtain:

$$y^k = D^{k+1}\overline{D}^k Cry_1 + D^k\overline{D}^{k-1}c^k$$
$$+ D^k D^{k-1}Y^k\overline{c}^k + D^k D^{k-1}\overline{Y}^k c^k \quad (69)$$

$$c^{k+1} = D^{k+1}\overline{D}^k \overline{Sgn}\,Cry_1 + D^{k+1}\overline{D}^k Cry_2 + D^k\overline{D}^{k-1}\overline{Sgn}\,c^k$$
$$+ D^k D^{k-1}Sgn\,Y^k c^k + D^k D^{k-1}\overline{Sgn}\,\overline{Y}^k c^k \quad (71)$$

and the corresponding complementary signals are obtained by simple inversion.

$$\overline{y}^k = \overline{[y^k]} \quad (70)$$

$$\overline{c}^{k+1} = \overline{[c^{k+1}]} \quad (72)$$

Logical equations defining each of the signals formed by networks $85^0 \ldots 85^{n+1}$ in Y gating matrix 16 have now been developed hereinabove.

*R gating matrix 14.*—Logical equations will be developed hereinbelow for each of the signals formed by networks $88^k$ in R gating matrick 14. The equations defining signals $r^k$ and $g^k$ and their corresponding complementary signals will first be considered.

*Formation of signals $r^k$, $\overline{r}^k$ and $g^k$, $\overline{g}^k$.*—It will be understood that signals $r^k$ and $g^k$ are the sum and carry digits resulting from the addition of the number $$\left(Y_i + \frac{\Delta Y_i}{2}\right)\Delta X_i$$

to the number $2R_i$ which is stored in the R register. Since $\Delta X_i$ may have the values $+1$ or $-1$ or $+0$, this is accomplished by adding $$\left(Y_i + \frac{\Delta Y_i}{2}\right)$$

to $2R_i$ if $\underline{\Delta X_i} = +1$; by subtracting $$\left(Y_i + \frac{\Delta Y_i}{2}\right)$$

from $2R_i$ if $\underline{\Delta X_i} = -1$; and by adding 0 (expressed as $01.000\ldots$) to $2R_i$ if $\Delta X_i = 0$. The digits of the number $2R_i$ are represented by the signals $R^k$, while the digits of the number $$Y_i + \frac{\Delta Y_i}{2}$$

are represented by the signals $y^k$. An initial carry $g^0 = 0$ is provided.

From a consideration of these requirements the equations defining $r^k$ may be immediately written:

(for $k = 0 \ldots n$):

$$r^k = V_X[\overline{R}^k y^k \overline{g}^k + \overline{R}^k \overline{y}^k g^k + R^k y^k g^k + R^k \overline{y}^k \overline{g}^k] + \overline{V}_X R^k \quad (73a)$$

(for $k = n+1$):

$$r^k = V_X[\overline{R}^k y^k \overline{g}^k + \overline{R}^k \overline{y}^k g^k + R^k y^k g^k + R^k \overline{y}^k \overline{g}^k] + \overline{V}_X[\overline{R}^k g^k + R^k g^k] \quad (73b)$$

(for $k = n+2$):

$$r^k = [\overline{R}^k y^k \overline{g}^k + \overline{R}^k \overline{y}^k g^k + R^k y^k g^k + R^k \overline{y}^k \overline{g}^k] \quad (73c)$$

(for all stages):

$$\overline{r}^k = \overline{[r^k]} \quad (74)$$

It it seen that for all stages, when $V_X = 1$ indicating that indicating that $\Delta X_i = \pm 1$, the value of $r^k$ is determined as the ordinary binary sum of the three digits $y^k$, $R^k$ and $g^k$. This is indicated by the first bracketed term in each of the equations.

However, when $V_X = 0(\overline{V}_X)$, indicating that $\Delta Y_i = +0$, the result varies, according to the stage involved, since the number zero which is to be added to $2R_i$ has the digits $01.000\ldots$. Thus, for stages $0 \ldots n$, since only 0 digits are added, the resultant sum digits are identical to $R^k(\overline{V}R^k)$. For the $n+1$st stage it is assumed that the digit being added is 1, so that the second bracketed term corresponds to normal binary addition of the three digits $R^k$, $y^k$ and 1, $(\overline{V}_X[\overline{R}^k g^k + R^k g^k])$.

For the $n+2$nd stage, since $y^{n+2} = 0$ is provided as a fixed input, normal binary addition of $R^k$, $y^k$ and $g^k$ accomplishes the required operation in all instances, without respect to the value of V.

In the same manner, by consideration of the above described requirement the equation defining the corresponding carry digits $g^{k+1}$ and $\overline{g}^{k+1}$ may be written.

(for $k = 0 \ldots n$ and $n+2$):

$$g^{k+1} = V_X[U_X R^k y^k + U_X R^k g^k + U_X y^k g^k + \overline{U}_X R^k y^k g^k + \overline{U}_X \overline{R}^k y^k + \overline{U}_X \overline{R}^k g^k] \quad (75a)$$

Equation 75a defines the formation of signal $g^{k+1}$ for all networks other than $88^{n+1}$. It is seen that the terms including signal $U_X$ are the normal binary "carry" terms, while the terms including signal $\overline{U}_X$ are the ordinary terms for formation of a binary "borrow," as might be expected in view of the fact that signal $U_X$ indicates whether the digits $y^k$ are to be added to or subtracted from the digits $R^k$.

Equation 75b provided hereinbelow defines the formation of signal $g^{k+1}$ in network $88^{n+1}$.

(for $k = n+1$):

$$g^{k+1} = V_X[U_X R^k y^k + U_X R^k g^k + U_X y^k g^k + \overline{U}_X R^k y^k g^k + \overline{U}_X \overline{R}^k y^k + \overline{U}_X \overline{R}^k g^k] + \overline{V}_X[R^k + g^k] \quad (75b)$$

It is seen that Equation 75b is identical to (75a) except that additional terms are provided ($\overline{V}_X[R^k + g^k]$) to take care of the situation ($\overline{V}_X$) in which $\Delta X_i = 0$. In this instance the number zero (expressed as $01.000\ldots$) is added to the digit $R^k$. The additional terms provide for the required automatic addition of a 1 valued digit at the $n+1$ stage.

The complementary signal $\overline{g}^{k+1}$ is formed by inversion.

$$\overline{g}^{k+1} = \overline{[g^{k+1}]} \quad (76)$$

*Formation of Signals SU, ZU and SV, ZV.*—These setting and zeroing signals, at the end of an operation (defined by T Cl), store the sign (+ or −) and magnitude (1 or 0) of the increment $\Delta Z_i$ in flip-flops U and V, respectively. At the end of a timing interval in which initial conditions are entered (F Cl), they zero both flip-flops.

The value of the increment $\Delta Z_i$ and the values of the corresponding setting and zeroing signals are determined from signals $r^{n+2}$, $r^{n+1}$, and $r^n$ in a manner corresponding to recognition Formulas 34, 35, 36, hereinbefore developed, making use of the fact that signals $r^{n+2}$, $r^{n+1}$, and $r^n$ represent the $n+2$nd, $n+1$st, and $n$th digits of the number $$2R_i + \left(Y_i + \frac{\Delta Y_i}{2}\right)\underline{\Delta X_i}$$

This is summarized in the following table, Table 15:

TABLE 15

| Time | Value of $Z_i$ | Values of $r^{n+2}, r^{n+1}, r^n$ | Required Values of | | | |
|------|---|---|---|---|---|---|
| | | | SU | ZU | SV | ZV |
| During operation (T Cl). | −1 | $\bar{r}^{n+2}(r^{n+1}\bar{r}^n + \bar{r}^{n+1}r^n) = 1$ | | 1 | 1 | |
| | +0 | $r^{n+1}r^n + \bar{r}^{n+1}\bar{r}^n = 1$ | 1 | | | 1 |
| | +1 | $r^{n+2}(r^{n+1}\bar{r}^n + \bar{r}^{n+1}r^n) = 1$ | 1 | | 1 | |
| During initial setting (F Cl). | | | | 1 | | 1 |

The first two columns of Table 15 correspond exactly to recognition Formulas 34, 35 and 36. The later columns present the corresponding values of the setting and zeroing signals required to store $\Delta Z_i$ in flip-flops U and V. From consideration of Table 15 the logical equations defining SU, ZU and SV, ZV may be immediately written.

$$SU = TCl[(r^{n+1}r^n + \bar{r}^{n+1}\bar{r}^n) + r^{n+2}(r^{n+1}\bar{r}^n + \bar{r}^{n+1}r^n)] \quad (77)$$

$$-ZU = TCl + \bar{r}^{n+2}(r^{n+1}\bar{r}^n + \bar{r}^{n+1}r^n) + FCl \quad (78)$$

$$SV = TCl[r^{n+1}\bar{r}^n + \bar{r}^{n+1}r^n] \quad (79)$$

$$ZV = TCl\overline{[r^{n+1}\bar{r}^n + \bar{r}^{n+1}r^n]} + FCl \quad (80)$$

*Formation of signals $SR^{k+1}$, $ZR^{k+1}$.*—These setting and zeroing signals are formed at the end of each operation (T Cl) to store the digits of the new number $2R_{i+1}$ (remembering that $$R_{i+1} = 2R_i + \left(Y_i + \frac{\Delta Y_i}{2}\right)\underline{\Delta X_i} - \Delta Z_i)$$

in the flip-flops of the R register. The values of the digits (designated digits $R_{i+1}^{k+1}$) to be stored are determined in accordance with recognition Formulas 31, 32 and $33^0$ to $33^n$ hereinbefore presented.

At the end of an initial setting interval (F Cl), the values stored will correspond to the values of $S_R^k$, $\bar{S}_R^k$, provided that a switch register is coupled to the R register (Wu), or if a switch register is not coupled, will correspond to the digits of the number zero (01.000 . . . ).

From a consideration of the above described requirements, equations defining the signal $SR^{k+1}$ and $ZR^{k+1}$ are readily written:

(for $k = n+1$):

$$SR^{k+1} = FClS_R^k Wu_R \quad (81a)$$

$$ZR^{k+1} = FCl(Wd_R + \bar{S}_R^k) + TCl \quad (82a)$$

(for $k = n$):

$$SR^{k+1} = FCl(S_R^k Wu_R + Wd_R) + TCl\bar{r}^k \quad (81b)$$

$$ZR^{k+1} = FCl\bar{S}_R^k Wu_R + TClr^k \quad (82b)$$

(for $k = 0 \ldots n-1$):

$$SR^{k+1} = FClS_R^k Wu_R + TClr^k \quad (81c)$$

$$ZR^{k+1} = FCl(Wd_R + \bar{S}_R^k) + TCl\bar{r}^k \quad (82c)$$

It is seen that at the end of an operation interval (T Cl), flip-flop $R^{n+2}$ is zeroed; flip-flop $R^{n+1}$ has stored therein the complement of the value of the digit $r^n$ (or $1-r^n$); and each of the flip-flops $R^1 \ldots R^n$ has stored therein values corresponding to the values of the digits $r_0 \ldots r^{n-1}$ respectively. Thus, formation of $2R_{i+1}$ is largely accomplished as a left shift of the digits $r^k$.

At the end of an initial setting interval (F Cl), if a switch register is coupled to the R register ($Wu_R$), the flip-flops $R^k$ are set or zeroed in accordance with the signals $S_R^k$, $\bar{S}_R^k$ as determined by the corresponding switches; while if a switch register is not coupled ($Wd_R$), flip-flop $R^{n+1}$ will be set to its 1 state and all other flip-flops will be zeroed, thus storing the number zero (01.000 . . . ) in the R register.

Logical equations defining all of the signals formed by networks $85^k$ in gating matrix 16 and networks $88^k$ in gating matrix 16 have now been developed. For purposes of convenient reference all of these hereinbefore developed equations are collected together in the following table, Table 16.

TABLE 16

Networks $85^k$ of Y gating matrix 16:

$$D^k = Y^k + D^{k-1} \quad (61)$$

$$\bar{D}^k = \bar{Y}^k \bar{D}^{k-1} \quad (62)$$

(for $k = 1 \ldots n+1$):

$$Y^k_{i+1} = D^{k+1}\bar{D}^k + D^k\bar{D}^{k-1}C^k$$
$$+ D^k D^{k-1}Y^k\bar{C}^k + D^k D^{k-1}\bar{Y}^k C^k \quad (63a)$$

(for $k = 0$):

$$Y^k_{i+1} = D^{k+1}\bar{D}^k + D^k\bar{D}^{k-1}$$
$$+ D^k D^{k-1}Y^k\bar{C}^k + D^k D^{k-1}\bar{Y}^k C^k \quad (63b)$$

(for $k = 0 \ldots n+1$):

$$Y_{i+1}^k = \overline{[Y_{i+1}^k]} \quad (64)$$

(for $k = 0 \ldots n+1$):

$$C^{k+1} = D^{k+1}\bar{D}^k Cry_1 + D^k\bar{D}^{k-1}\overline{Sgn}C^k$$
$$+ D^k\bar{D}^{k-1}Cry_2 + D^k D^{k-1}Sgn Y^k C^k$$
$$+ D^k D^{k-1}\overline{Sgn}\bar{Y}^k C^k \quad (65)$$

$$\bar{C}^{k+1} = \overline{[C^{k+1}]} \quad (66)$$

(for $k = 0, 1 \ldots N-1$):

$$SY^k = TY_{i+1}^k Cl + FClS_Y^k Wu_Y \quad (67a)$$

$$ZY^k = T\bar{Y}_{i+1}^k Cl + FCl(Wd_Y + \bar{S}_Y^k) \quad (68a)$$

(for $k = n, n+1$):

$$SY^k = TY_{i+1}^k Cl + FCl(S_Y^k Wu_Y + Wd_Y) \quad (67b)$$

$$ZY^k = T\bar{Y}_{i+1}^k Cl + FCl\bar{S}_Y^k Wu_Y \quad (68b)$$

$$y^k = D^{k+1}\bar{D}^k Cry_1 + D^k\bar{D}^{k-1}c^k$$
$$+ D^k D^{k-1}Y^k\bar{c}^k + D^k D^{k-1}\bar{Y}^k c^k \quad (69)$$

$$\bar{y}^k = \overline{[y^k]} \quad (70)$$

$$c^{k+1} = D^{k+1}\bar{D}^k \overline{Sgn}Cry_1 + D^{k+1}\bar{D}^k Cry_2$$
$$+ D^k\bar{D}^{k-1}\overline{Sgn}c^k + D^k D^{k-1}Sgn Y^k c^k$$
$$+ D^k D^{k-1}\overline{Sgn}\bar{Y}^k c^k \quad (71)$$

$$\bar{c}^{k+1} = \overline{[c^{k+1}]} \quad (72)$$

Networks $88^k$ of R gating matrix 16:

(for $k = 0 \ldots n$):

$$r^k = V_X[\bar{R}^k y^k \bar{g}^k + \bar{R}^k \bar{y}^k g^k$$
$$+ R^k y^k g^k + R^k \bar{y}^k \bar{g}^k] + \bar{V}_X R^k \quad (73a)$$

TABLE 16—Continued (for $k=n+1$):

$$r^k = V_X[\overline{R^k}y^k\overline{g^k} + \overline{R^k}\overline{y^k}g^k + R^ky^kg^k + R^k\overline{y^k}\overline{g^k}] + \overline{V}_X[\overline{R^k}\overline{g^k} + R^kg^k] \quad (73b)$$

(for $k=n+2$):

$$r^k = [\overline{R^k}y^k\overline{g^k} + \overline{R^k}\overline{y^k}g^k + R^ky^kg^k + R^k\overline{y^k}\overline{g^k}] \quad (73c)$$

(for all stages):

$$\overline{r^k} = [\overline{r^k}] \quad (74)$$

(for $k=0 \ldots n$ and $n+2$):

$$g^{k+1} = V_X[U_X R^k y^k + U_X R^k g^k + U_X y^k g^k + \overline{U}_X R^k \overline{y^k}g^k + \overline{U}_X \overline{R^k}y^k + \overline{U}_X \overline{R^k}g^k] \quad (75a)$$

(for $k=n+1$):

$$g^{k+1} = V_X[U_X R^k y^k + U_X R^k g^k + U_X y^k g^k + \overline{U}_X R^k y^k g^k + \overline{U}_X \overline{R^k}y^k + \overline{U}_X \overline{R^k}g^k] + \overline{V}_X[R^k g^k] \quad (75b)$$

$$\overline{g^{k+1}} = [\overline{g^{k+1}}] \quad (76)$$

$$SU = TCl[(r^{n+1}r^n + \overline{r^{n+1}}\overline{r^n}) + r^{n+2}(r^{n+1}\overline{r^n} + \overline{r^{n+1}}r^n)] \quad (77)$$

$$ZU = TCl\overline{r^{n+2}}(r^{n+1}\overline{r^n} + \overline{r^{n+1}}r^n) + FCl \quad (78)$$

$$SV = TCl[r^{n+1}\overline{r^n} + \overline{r^{n+1}}r^n] \quad (79)$$

$$ZV = TCl[r^{n+1}\overline{r^n} + \overline{r^{n+1}}r^n] + FCl \quad (80)$$

(for $k=n+1$):

$$SR^{k+1} = FClS_R^k Wu_R \quad (81a)$$

$$ZR^{k+1} = FCl(Wd_R + \overline{S_R^k}) + TCl \quad (82a)$$

(for $k=n$):

$$SR^{k+1} = FCl(S_R^k Wu_R + Wd_R) + TCl\overline{r^k} \quad (81b)$$

$$ZR^{k+1} = FCl\overline{S_R^k}Wu_R + TClr^k \quad (82b)$$

(for $k=0 \ldots n-1$):

$$SR^{k+1} = FClS_R^k Wu_R + TClr^k \quad (81c)$$

$$ZR^{k+1} = FCl(Wd_R + \overline{S_R^k}) + TCl\overline{r^k} \quad (82c)$$

As hereinbefore explained, each of the gating networks $85^k$ and $88^k$ is mechanized in a manner well known to the art in direct accordance with the corresponding above-provided logical gating equations, as exemplified for purposes of example by networks $85^1$ and $88^1$ which are shown in detail.

It is seen, referring to network $85^1$, that it is mechanized in direct accordance with Equations 61, 62, 63a, 64, 65, 66, 67a, 68a, 69, 70 and 71, 72. Each "and" term in these equations is mechanized by a corresponding "and" gate, the inputs to each "and" gate corresponding to the signals which comprise the "and" term. Similarly, each "or" combination of signals in these logical gating equations is mechanized by a corresponding "or" gate whose inputs correspond to the signals comprising the "or" combination. Inversions are accomplished by corresponding inverting amplifiers. Gating network $88^1$ is seen to be similarly mechanized in direct accordance with Equations 73a, 74, 75a, 76 and 81c, 82c. Each of the other gating networks $85^k$ and $88^k$ are similarly constructed in direct accordance with their corresponding logical gating equations, as set forth in Table 16.

Detailed Sequencing of Computing Blocks 10

Discussion of the structure of computing block 10 has now been completed. With the understanding which has now been gained as to the manner in which computing blocks 10 respond to timing signals F, T and Cl, detailed consideration may now be given to the various modes of sequencing the assemblages of computing blocks shown in FIGS. 2 and 3, as accomplished under the control of timing signals F, T and Cl provided by source 30.

Considering first the sequencing of the assemblage of computing blocks 10-0 through 10-$j+1$ shown in FIG. 2, and assuming again (for purposes of example) that $j=5$, there is provided in FIGS. 7a-7j a waveform chart illustrating the appearance of signal Cl, signal F and signals $T_0$, $T_1$ . . . $T_6$, as these signals would be provided by source 30, to control the parallel sequencing of blocks 10-0 . . . 10-6 in the manner hereinbefore described in connection with Table 4. It is also assumed, as was done in connection with Table 4 that for each computing block a complete sequence of operations comprises six successive operations ($i=1, 2 \ldots 6$). Included in the waveform chart is an illustration, provided in FIG. 7d, of the manner in which the successive output increments $\Delta(A_0)_i$ formed by computing block 10-0 are represented by corresponding output signals U and V formed by the computing block. It is additionally assumed that the number $A_0 = +\frac{1}{4}$ is initially stored as $R_1$ in computing block 10-0 so that the sequence of increments $\Delta(A_0)_i$ formed by block 10-0 will represent $+\frac{1}{4}$.

It is seen, referring to FIGS. 7a and 7b, that signal F goes to its high level every thirteen timing intervals causing initial $Y_1$ and $R_1$ values to then be set into the Y and R registers of each of the computing blocks 10-0 through 10-6. Immediately after each high level of signal F, signal $T_0$ goes to its high level and remains high for six computational operations. After each operation, as shown in FIG. 7d, new values of signals U and V are formed to represent the six successive output increments $\Delta(A_0)_i = +\frac{1}{2}, -\frac{1}{4}, +0, +0, +0, +0$. As shown in FIG. 7, signal T goes to its high level one timing interval after signal $T_0$ and remains high for six timing intervals during which block 10-1 is caused to perform its sequence of six computational operations, utilizing at each operation $i$ the corresponding increment $\Delta(A_0)_i$ which is supplied to it by computing block 10-0 (as shown in FIG. 7d) to form a corresponding output increment $\Delta(A_0 A_1 + B_1)_i$. Each of the remaining signals $T_2 \ldots T_6$ similarly sequences the corresponding computing blocks 10-2 through 10-6 in their formation of output increments, as hereinbefore summarized in Table 4.

Considering now serial sequencing (as described in connection with Table 6) of the assemblage of computing blocks 10-0 through 10-6, there is provided in FIGS. 8a . . . 8j a similar waveform chart showing signals, F, Cl and $T_0$ . . . $T_6$ as they would be provided to control the described type of serial sequencing.

It is seen, referring to FIGS. 8a and 8b, that signal F goes to its high level every 43 timing intervals to reset initial conditions after the performance of a sequence of computational operations. Immediately after reset, signal $T_0$ (see FIG. 8c) goes to its high level for one timing interval, causing block 10-0 to perform its first operation ($i=1$) and to form the corresponding output increment $\Delta(A_0)_i = +\frac{1}{2}$. In successive timing intervals signals $T_1 \ldots T_6$ each go to their high levels, causing the blocks 10-1 through 10-6 to sequentially perform their first operations. In this way each of the computing blocks sequentially operates upon the highest order digit of the problem to form the highest order digit of the resultant answer. In continued operation, each successive digit ($i=2, 3 \ldots 6$) is serially processed in the same manner.

Considering now in detail the sequencing of the assemblage of computing blocks 10-0, 10-0', 10-1 and 10-2, shown in FIG. 3, it will be appreciated that signals Cl, F and $T_0$, $T_1$, $T_2$, produced in the pattern shown in FIGS. 7a, 7b, 7c, 7e and 7f, may be utilized to control parallel sequencing of these computing blocks. Similarly, the same signals patterned as shown in FIGS. 8a, 8b, 8c, 8e and 8f may be utilized to control serial sequencing of these computing blocks. In such operation it is clear that the assemblage of computing blocks, shown in FIG. 3, would form six significant digits of the required answer, in each sequence of (six) computational operations.

There would also be some waiting time in which no useful operations are performed, corresponding to the excess time allowed for signals $T_3 \ldots T_6$.

Patterns of timing signals, which are more optimal for control of the assemblage of computing blocks shown in FIG. 3, are shown in waveform charts in FIGS. 9a–9e and 10a–10e, respectively. The pattern of timing signals shown in FIGS. 9a–9e corresponds to parallel sequencing of the assemblage of computing blocks shown in FIG. 3, while the pattern of timing signals shown in FIGS. 10a–10e corresponds to serial sequencing. Waiting time has been substantially eliminated. It is seen that in the parallel mode of sequencing, a complete 6 digit computation (multiplication of the numbers $A_0$ and $B_0$) will be performed every 9 timing intervals, while in the serial mode of sequencing a complete computation will be performed every 19 timing intervals.

Discussion has now been completed of the structure and operation of the specific embodiment of the invention hereinabove described. It will be appreciated, however, by those skilled in the computer art, that may modified and varied forms of the invention may be constructed in accordance with the teachings of the present invention.

For example, although as hereindescribed, the Y and R storage registers of each computing block have been provided as pluralities of flip-flops, it will be apparent that these computing block registers may readily be provided as corresponding groups of storage cells in a magnetic drum memory, or other serial storage device, with a single gating circuit being time shared by all computing blocks for the accomplishment of their described operations. Communication of increments between computing blocks could then be accomplished by storing each ΔZ output increment in a common ΔZ register buffer memory from which such increments could be decoded as required by the various computing blocks. It will also be appreciated that an elemental computing block is not restricted to the use of two permanently paired numbers, but may include three or more permanently grouped numbers. For example, a three register embodiment in which two Y registers feed into a common R register under the control of separate ΔX streams would offer some advantages in that a complete multiplication of two streams of increments (as shown here in FIG. 3) could then be accomplished by a single computing block, the stream of ΔZ increments which represents the product being issued from the common R register. It will also be appreciated that the mechanical (switch) storage registers used in source 31 of setting signals could readily be replaced by flip-flop registers or other types of electronic or magnetic storage to permit rapid changing of the input numbers represented by the setting signals. Similarly, source 32 of stream signals could readily be mechanized with many different types of storage devices (stepping registers, for example) for serially presenting the digits of a stored number as corresponding output increments.

It will also be readily understood that since scaling of ΔX and ΔZ increments is affected by changing the relative scale of the Y and R numbers, it may as well be accomplished by decreasing the Y numbers as by increasing the R numbers. Moreover, if required by the numbering system used (as for example in a 1, 2, 2, 4, 8 code) changing of scale may be suspended (or even reversed) during any operaiton interval by stopping (or even reversing) the relative change of size between the Y and R numbers.

What is claimed as new is:

1. Incremental multiplying apparatus comprising: first means operable during time successive operation intervals $i$, where $i$ has the successive values $1, 2, 3 \ldots n$, for serially producing a 1st sequence of signals representing corresponding decreasingly scaled increments $\Delta A_i$ whose summation is equal to a number A; second means operable during the successive operation intervals $i$ for serially producing a 2nd sequence of signals representing corresponding successive decreasingly scaled increments $\Delta B_i$ whose summation is equal to a number B; 3rd means receiving said 1st and 2nd sequences of signals and responsive thereto for serially producing a third sequence of signals representing in successive operation intervals $i$ corresponding successive decreasingly scaled increments $\Delta(AB)_i$ whose summation is substantially equal to the product AB.

2. The multiplying apparatus defined by claim 1 wherein said 3rd means comprises apparatus responsive in successive time intervals $i$ to said 1st sequence of signals representing successive increments $\Delta A_i$ and to said 2nd sequence of signals representing successive increments $\Delta B_i$ for serially producing said 3rd sequence of signals representing successive increments $\Delta(AB)_i$ in accordance with the relationship $$\Delta(AB)_i = A_i \Delta B_i + B_i \Delta A_i + \Delta A_i \Delta B_i$$

where $$A_i = \sum_i \Delta A_i \text{ and } B_i = \sum_i \Delta B_i$$

3. Incremental multiplying apparatus comprising: first means operable during successive operation intervals $i$, where $i$ has the successive values $1, 2, 3 \ldots n$, for producing a 1st sequence of signals representing corresponding decreasingly scaled increments $\Delta A_i$ whose summation is equal to a number A; second means operable during the successive operation intervals $i$ for producing a 2nd sequence of signals representing corresponding successive decreasingly scaled increments $\Delta B_i$ whose summation is equal to a number B; and 3rd means receiving said 1st and 2nd sequences of signals and responsive thereto for producing a third sequence of signals representing in successive operation intervals $i$ corresponding successive decreasingly scaled increments $\Delta(AB)_i$ whose summation is substantially equal to the product AB, said 3rd means including a 1st register for storing a plurality of 1st digit signals representing a 1st stored number; a 2nd register for storing a plurality of 2nd digit signals representing a 2nd stored number; 1st apparatus responsive to said 1st sequence of signals representing successive increments $\Delta A_i$ for modifying said 1st digit signals in each cycle of operation $i$ to represent the sum of said 1st number and the corresponding $\Delta A_i$ increment; 2nd apparatus responsive to said 2nd sequence of signals representing successive increments $\Delta B_i$ for modifying said 2nd digit signals in each cycle of operation $i$ to represent the sum of said 2nd number and the corresponding increment $\Delta B_i$; and 3rd apparatus responsive to said plurality of 1st digit signals and said plurality of 2nd digit signals and to said 1st and 2nd sequences of signals for forming said 3rd sequence of signals.

4. The multiplying apparatus defined by claim 3 wherein said 3rd apparatus includes a 3rd register for storing a plurality of 3rd digit signals representing a third stored number and further includes a 1st gating circuit receiving said plurality of 1st digit signals, said plurality of 3rd digit signals and said 2nd sequence of signals for modifying said 3rd digit signals in each cycle of operation $i$ to represent the sum of the 3rd number and the product of the corresponding increment $\Delta B_i$ and a predetermined function of the first number.

5. The multiplying apparatus defined by claim 4 wherein said 3rd apparatus further includes a 4th register for storing a plurality of 4th digit signals representing a fourth stored number and further includes a 2nd gating circuit receiving said plurality of 2nd digit signals, said plurality of 4th digit signals, and said 1st sequence of signals for modifying said 4th digit signals in each cycle of operation $i$ to represent the sum of the 4th number and the product of the corresponding increment $\Delta A_i$ and a predetermined function of the second number.

6. Multiplying apparatus comprising: first means operable during successive operation intervals of time $i$, where $i$ has the successive values $1, 2, 3 \ldots n$, for serially producing a 1st sequence of signals representing corresponding successive decreasingly scaled digits $\Delta A_i$ of a number A; second means operable during the successive operation intervals of time $i$ for serially producing a 2nd sequence of signals representing corresponding successive decreasingly scaled digits $\Delta B_i$ of a number B; and 3rd means responsive to said 1st and 2nd sequences of signals for serially producing a third sequence of signals representing in successive operation intervals of time $i$ corresponding successive decreasingly scaled digits $\Delta(AB)_i$ of the product AB.

7. Cyclically operable incremental multiplying apparatus for multiplying 1st and 2nd numbers, said multiplying apparatus comprising: 1st, 2nd and 3rd storage registers, each having a plurality of successive $n$th, $n-1$st, $n-2$nd, etc. storage elements for storing a corresponding plurality respectively of successive digit signals representing respectively successive decreasingly scaled digits of an associated stored number; 1st means operable for initially storing in said 2nd and 3rd storage registers digit signals representing the number zero and for storing in said 1st storage register digit signals representing the 1st number; 2nd means for producing an input sequence of signals representing in successive cycles of operation corresponding successive decreasingly scaled digits of the 2nd number; gating means intercoupling said 1st and 2nd registers and responsive to their stored digit signals and to the input sequence of signals for forming an output sequence of signals representing in each successive cycle of operation corresponding successive decreasing scaled digits of the product of said 1st and 2nd numbers, said gating means further including apparatus responsive to the stored digit signals of said 1st and second registers for modifying the digit signals of said second register in each cycle of operation; and 3rd means operable in successive operation intervals for applying the output sequence of signals to successive storage elements respectively of said 3rd register, said 3rd means further including a gating circuit responsive to the applied sequence of output signals and to the digit signals of said 3rd register for modifying the digit signals of said 3rd register in each cycle of operation to represent the sum of the number previously stored in said 3rd register and the digit represented by the sequence of output signals.

8. Incremental computing apparatus operable in time successive cycles of operation $i$ (where $i$ has the successive values 1, 2, 3 . . . etc.), said computing apparatus comprising: a signal generator for producing an input signal train sequentially representing in each successive cycle of operation $i$ corresponding successive decreasingly scaled digits of an input number $A_0$; a plurality of interconnected 1st, 2nd . . . $j$th computing blocks containing a corresponding plurality of 1st, 2nd . . . $j$th groups of digit signals representing a corresponding plurality of input numbers $A_1, A_2 \ldots A_j$, respectively, said plurality of interconnected computing blocks being responsive to said input signal train and to said plurality of groups of digit signals for producing a resultant signal train sequentially representing in each successive cycle of operation $i$ corresponding successive sequentially lower order digits of the product $A_0A_1A_2 \ldots A_j$.

9. Incremental computing apparatus operable in successive cycles of operation $i$ (where $i$ has the successive values 1, 2, 3 . . . etc.), said computing apparatus comprising: a signal generator for producing an input signal train sequentially representing in each successive cycle of operation $i$ corresponding successive decreasingly scaled digits of an input number $A_0$; a plurality of interconnected 1st, 2nd . . . $j$th computing blocks containing a corresponding plurality respectively of pairs of Y and R storage registers for storing a corresponding plurality respectively of pairs of groups of digit signals representing a corresponding plurality of pairs of input numbers $A_1$ and $B_1, A_2$ and $B_2, \ldots A_j$ and $B_j$ respectively, said plurality of interconnected computing blocks being responsive to said input signal train and to said plurality of groups of digit signals for producing a resultant signal train sequentially representing in each successive cycle of operation $i$ corresponding successive sequentially lower order digits respectively of the quantity $$[\cdots[(A_0A_1+B_1)A_2+B_2]\cdots]A_j+B_j$$

10. The computing apparatus defined by claim 9 which further includes gating apparatus operable during each successive cycle of operation $i$ for modifying the groups of digit signals in each of the R registers in accordance with the digit signals contained in the corresponding paired Y registers respectively.

11. The computing apparatus defined by claim 9 which further includes means for storing in each of the R registers of the plurality of interconnected computing blocks signals representing the numbers $B_1=0, B_2=0, \ldots B_j=0$ respectively, whereby said resultant signal train represents successive sequentially lower order digits of the product $A_0A_1A_2 \ldots A_j$.

12. Incremental computing apparatus operable during at least 1st and 2nd sequential cycles of operation said computing apparatus comprising: a signal generator for producing an input signal train sequentially representing the highest order digit in said 1st cycle of operation and second highest order digit of an input number in said 2nd cycle of operation, said 2nd cycle commencing after the termination of said 1st cycle; and means responsive to said input signal train for producing a resultant signal train representing in said 1st cycle of operation the highest order digit and in said 2nd cycle of operation second highest order digit of the numerical result of a predetermined mathematical operation upon the input number.

13. The computing apparatus defined by claim 12 wherein said input signal train sequentially represents the highest order digit and second highest order digit of an input number A and which includes an additional signal generator for producing an additional input signal train representing in said 1st and 2nd cycles of operation the highest order digit and second highest order digit respectively of an additional input number B, said means including computing circuits responsive to said first named input signal train and to said additional input signal train for producing said resultant signal train representing in said 1st and 2nd cycles of operation the highest order and second highest order digits respectively of the product AB of the input numbers.

14. The computing apparatus defined by claim 12 wherein said input signal train sequentially represents the highest order digit and second highest order digit of an input number $A_0$ and wherein said means includes a plurality of 1st, 2nd . . . $j$th storage registers for storing a corresponding plurality respectively of 1st, 2nd . . . $j$th groups of digit signals representing a corresponding plurality of input numbers $A_1, A_2 \ldots A_j$ respectively, said means including computing circuits responsive to said input signal train and to said plurality of groups of digit signals for producing a resultant signal train representing in said 1st and 2nd cycles of operation the highest order and second highest order digits respectively of the product $A_0A_1A_2 \ldots A_j$ of the input numbers.

15. Incremental computing apparatus operable during at least 1st and 2nd sequential cycles of operation said computing apparatus comprising: a signal generator for producing an input signal train sequentially representing the highest order digit and second highest order digit of an input number during said 1st and 2nd cycles of operation respectively; and means responsive to said input signal train for producing a resultant signal train representing during said 1st and 2nd cycles of operation the highest order digit and second highest order digit respectively of a result of a predetermined mathematical operation upon the input number; said input signal train sequentially representing the highest order digit $\Delta(A_0)_1$ and second highest order digit $\Delta(A_0)_2$ of an input number $A_0$ and said means including a computing block having a first storage register for storing a 1st group of digit signals representing a number $Y_i = A_1$ and a second storage register for storing a 2nd group of digit signals initially representing a number $2R_1 = 0$, said computing circuit further including a gating matrix receiving the 1st and 2nd group of digit signals and responsive to said input signal train for producing an output signal train representing during said 1st and 2nd cycles of operation the highest order digits $\Delta(A_0A_1)_1$ and $\Delta(A_0A_1)_2$ of the product $A_0A_1$, said matrix including gating circuits operable during said 1st cycle of operation for modifying said 2nd group of digit signals to represent the quantity $$2R_2 = 2[R_1 + Y_1\underline{\Delta(A_0)_1} - \underline{\Delta(A_0A_1)_1}]$$

and operable during said 2nd cycle of operation for modifying said 2nd group of digit signals to represent the quantity $$2R_3 = 2[2R_2 + Y_1\underline{\Delta(A_0)_2} - \underline{\Delta(A_0A_1)_2}]$$

where $\underline{\Delta(A_0)_1}$, $\underline{\Delta(A_0)_2}$, $\underline{\Delta(A_0A_1)_1}$, and $\underline{\Delta(A_0A_1)_2}$ are the unscaled magnitudes of the corresponding digits.

16. Incremental computing apparatus operable during time successive cycles of operation $i$ (where $i$ is an integer having successive values 1, 2, 3 . . . etc.) said computing apparatus comprising a plurality of signal generators for producing a corresponding plurality of input signal trains representing a corresponding plurality of input numbers respectively, each input signal train sequentially representing during successive cycles of operation $i$ corresponding successive sequentially lower order digits of the corresponding input number; and means for combining said plurality of input signal trains to form a resultant signal train representing in each successive cycle of operation $i$ corresponding successive sequentially lower order digits of the result of a predetermined mathematical operation upon the input numbers.

17. The computing apparatus defined by claim 16 wherein said plurality of signal generators comprises a 1st signal generator for producing a 1st input signal train representing during successive cycles of operation $i$ corresponding successive sequentially lower order digits of an input number A and a 2nd signal generator for producing a 2nd input signal train representing during successive cycles of operation $i$ corresponding successive sequentially lower order digits of an input number B, said means including computing circuits for combining said 1st and 2nd input signal trains to form a resultant signal train representing in each successive cycle of operation $i$ corresponding successive sequentially lower order digits of the product AB.

18. Incremental computing apparatus operable during successive cycles of operation $i$ (where $i$ is an integer having successive values 1, 2, 3 . . . etc.), said computing apparatus comprising a plurality of signal generators for producing a corresponding plurality of input signal trains representing a corresponding plurality of input numbers respectively, said plurality of signal generators including a 1st signal generator for producing a 1st input signal train representing during successive cycles of operation $i$ corresponding successive sequentially lower order digits of an input number A and a 2nd signal generator for producing a 2nd input signal train representing during successive cycles of operation $i$ corresponding successive sequentially lower order digits of an input number B; and means for combining said plurality of input signal trains to form a resultant signal train representing in each successive cycle of operation $i$ corresponding successive sequentially lower order digits of the result of a predetermined mathematical operation upon the input numbers, said means including computing circuits for combining said 1st and 2nd input signal trains to form a resultant signal train representing in each successive cycle of operation $i$ corresponding successive sequentially lower order digits of the product AB, said computing circuits including 1st and 2nd storage registers; a first computing device coupled to said 1st storage register and responsive to said 1st signal train for storing in said 1st storage register at each successive cycle of operation a group of 1st digit signals representing the summation of all previously represented digits of the number A; a second computing device coupled to said 2nd storage register and responsive to said 2nd signal train for storing in said 2nd storage register at each successive cycle of operation a group of 2nd digit signals representing the summation of all previously represented digits of the input number B; and a 3rd computing device receiving said group of 1st digit signals and said group of 2nd digit signals and responsive to said 1st and 2nd input signal trains for producing said resultant signal train.

19. The computing apparatus defined by claim 18 which further includes an additional storage register and a 4th computing device coupled to said additional storage register and responsive to said resultant signal train representing the successive digits of the product AB for storing in said additional storage register at each successive cycle of operation $i$ a group of additional digit signals representing the summation of all previously represented digits of the product AB.

20. Incremental computing apparatus comprising: a signal generator for sequentially producing 1st, 2nd . . . $n$th input pairs of bivalued signals representing respectively 1st, 2nd . . . $n$th sequentially lower order digits of an input number; computing means responsive to said 1st input pair of bivalued signals for producing a 1st resultant pair of bivalued signals entirely representing the highest order digit of the result of a predetermined mathematical operation upon the input number, said computing means being similarly responsive to said 2nd . . . $n$th input pairs of bivalued signals for producing 2nd . . . $n$th resultant pairs of bivalued signals entirely representing sequentially lower order digits respectively of said result.

21. The computing apparatus defined by claim 20 wherein said computing means includes a plurality of interconnected computing blocks, each computing block containing a Y storage register and an R storage register for storing respectively a 1st group of digit signals representing a stored Y number and a 2nd group of digit signals representing a stored R number, said plurality of interconnected computing blocks including 1st means responsive to said 1st input pair of signals for modifying each of said 2nd groups of digit signals in accordance with the corresponding 1st group of digit signals to represent a new R number and for forming a 1st output pair of signals for each computing block representing a quantized value of the sum of the R number and a function of the Y number, said 1st means being similarly responsive to each of said 2nd . . . $n$th input pairs of bivalued signals for similarly modifying each of said 2nd groups of digit signals and for similarly forming corresponding 2nd . . . $n$th output pairs of signals for each computing block.

22. Incremental computing apparatus operable during time successive cycles of operation $i$ (where $i$ is an integer having successive values 1, 2, 3 . . . etc.), said computing apparatus comprising: at least one signal generator for producing an input signal train sequentially representing during successive cycles of operation $i$ corresponding successive sequentially lower order digits respectively of an input number; and means responsive to said input signal train for producing a resultant signal train representing in each time successive cycle of operation $i$ corresponding successive sequentially lower order digits respectively of the result of a predetermined mathematical operation upon the input number.

23. A cyclically operable incremental digital computing block for operating upon a 1st applied train of digital signals representing in each successive cycle of operation $i$ (where $i$ is an integer having the successive values 1, 2, 3 . . . etc.) corresponding successive decreasingly scaled increments $\Delta Y_i$ and for operating upon a 2nd applied train of digital signals representing in each successive cycle of operation $i$ corresponding successive decreasingly scaled increments $\Delta X_i$, said computing block comprising: 1st means, including a 1st storage register for storing a 1st plurality of digit signals representing a stored number $Y_i$ and responsive to the stored digit signals and to the applied 1st train for modifying the stored digit signals in each cycle of operation $i$ to represent the sum of the previously stored number and the corresponding increment $\Delta Y_i$; and 2nd means responsive to the stored digit signals and to the 2nd applied train of signals for forming a 3rd train of digital signals representing in each successive cycle of operation $i$ corresponding successive decreasingly scaled increments $\Delta Z_i$ whose summation is proportional to the summation $\sum_1 g(Y_i)\Delta X_i$, $g(Y_i)$ being a predetermined mathematical function of the numbers $Y_i$.

24. The computing block defined by claim 23 wherein said increments $\Delta X_i$ and $\Delta Y_i$ are successively halved in scale, said 2nd means including a 2nd storage register for storing a 2nd plurality of digit signals representing a stored number $2R_i$ and further including a gating matrix responsive to said 1st and 2nd pluralities of digit signals and to said 2nd applied train of digital signals for forming said 3rd train of digital signals representing in each successive cycle of operation $i$ a quantized increment $\Delta Z_i$ corresponding in magnitude and sign to the sum $2R_i + g(Y_i)\Delta X_i$, said matrix further including apparatus for modifying said plurality of stored digit signals in each cycle of operation $i$ to represent twice the algebraic difference of said sum and the unscaled magnitude of the corresponding increment $\Delta X_i$, whereby the successive increments $\Delta Z_i$ are correspondingly halved in scale at each successive cycle of operation.

25. The computing block defined by claim 24 wherein said function $g(Y_i)$ equals $$Y_i + \frac{\Delta Y_i}{2}$$

said gating matrix including computing networks responsive to said 1st and 2nd pluralities of digit signals and to said 1st and 2nd applied trains of digital signals for forming said 3rd train of digital signals representing in each successive cycle of operation $i$ the quantized increment $\Delta Z_i$ corresponding in sign and magnitude to the sum $$2R_i + \left(Y_i + \frac{\Delta Y_i}{2}\right)\Delta X_i$$

26. The computing block defined by claim 22 wherein said 1st storage register comprises a plurality of successive $n$th, $n-1$st, $n-2$nd . . . etc. storage positions for storing digit signals representing a corresponding plurality of successive decreasingly scaled digits respectively of the stored number $Y_i$, said 1st means including apparatus operable in successive cycles of operation $i$ for sequentially applying said 1st train of digital signals to corresponding successive selected $n$th, $n-1$st, $n-2$nd . . . etc. storage positions respectively and further including adding circuits for modifying the digit signals in said 1st storage register in each cycle of operation $i$ to represent the sum of the number $Y_i$ and the magnitude of the corresponding increment $\Delta Y_i$ scaled in accordance with the scale associated with the selected storage position.

27. The computing block defined by claim 24 wherein said apparatus includes marking means for initially storing a marker signal in a predetermined one of said storage positions and for transferring said marker signal to the immediately succeeding storage position at each successive cycle of operation.

28. Cyclically operable incremental multiplying apparatus for multiplying 1st and 2nd numbers, said multiplying apparatus comprising: 1st, 2nd and 3rd storage registers, each having a plurality of successive $n$th, $n-1$st, $n-2$nd, etc. storage elements for storing a corresponding plurality respectively of successive digit signals representing respectively successive decreasingly scaled digits of an associated stored number; 1st means for initially storing in said 2nd and 3rd storage registers digit signals representing predetermined numbers and for storing in said 1st storage register digit signals representing the 1st number; 2nd means for producing an input sequence of signals representing in successive cycles of operation, corresponding, successive, decreasingly scaled digits of the 2nd number; gating means intercoupling said 1st and 2nd registers and responsive to their stored digit signals and to the input sequence of signals for forming an output sequence of signals representing, in each successive cycle of operation, corresponding numbers, said gating means further including apparatus responsive to the stored digit signals of said 1st and 2nd registers for modifying the digit signals of said 2nd register in each cycle of operation; and 3rd means operable in successive operation intervals for applying the output sequence of signals to successive storage elements respectively of said 3rd register, said 3rd means further including a gating circuit responsive to the applied sequence of output signals and to the digit signals of said 3rd register for modifying the digit signals of said 3rd register in each cycle of operation to represent the sum of the number previously stored in said 3rd register and the digit represented by the sequence of output signals.

29. Apparatus comprising: a first storage register for storing a first plurality of signals representing a first number; a second storage register for storing a second plurality of signals representing a second number; signal generating means for producing in time sequence first and second input signals, respectively, representing relatively high and low order digits of a third number; and computing means, responsive to said first and second input signals, for combining said first and second pluralities of signals to produce in time sequence respective first and second output signals representing relatively high and low order digits, respectively; each said first and second output signal representing a predetermined function of the first number, the second number and the digit represented by the signal from said signal generating means.

30. Multiplying apparatus comprising: first means for producing in time sequence a first plurality of input signals representing decreasingly scaled digits of a number A; second means for producing in time sequence a second plurality of input signals representing decreasingly scaled digits of a number B; and third means, coupled to said first and second means and receiving said first and second pluralities of input signals, for producing in time sequence a plurality of output signals representing decreasingly scaled digits of the product AB, said third means including signal generating means producing at least the first of said output signals prior to reception by said third means of the input signals representing the least significant digits of numbers A and B.

31. The multiplying apparatus defined in claim 30, wherein said third means further includes first and second storage registers for respectively storing first and second pluralities of signals representing first and second numbers, respectively, and control means, responsive to said first and second pluralities of input signals, for changing the signals stored in said first and second storage registers, respectively.

32. The multiplying apparatus defined in claim 31, wherein said signal generating means is coupled to said first and second storage registers.

33. Incremental computing apparatus for operating upon at least first and second sequential input signals respectively representing relatively high and relatively low order digits of a first number, said computing apparatus comprising: a first computing block, for receiving the first and second input signals, and for producing corresponding first and second sequential output signals, respectively, representing relatively high and relatively low order digits of a second number; and a second computing block for receiving said first and second output signals and for producing corresponding third and fourth sequential output signals respectively representing relatively high and relatively low order digits of a third number; each of said first and second computing blocks including signal generating means for generating each output signal as a function of the corresponding received signal and independent of subsequent received signals.

34. The incremental computing apparatus defined in claim 33, wherein each of said computing blocks further includes first and second storage registers for storing first and second number signals, respectively; and said signal generating means includes first means for producing the first output signal of the block in accordance with the magnitude of the summation of the number stored in said first storage register plus a function of the number stored in said second storage register and the first received signal, and second means for producing the second output signal of the block in accordance with the magnitude of the summation of a multiple of the difference between the first-named summation and the number represented by the first output signal, plus a function of the number stored in said second storage register and the second received signal.

35. Incremental computing apparatus operable during at least first and second sequential cycles of operation, said computing apparatus comprising a signal generator for producing an input signal train for sequentially representing the digits of an input number, said signal train containing "$m$" bivalued signals in said first cycle of operation entirely representing the highest order digit of said input number and containing "$m$" bivalued signals in said second cycle of operation entirely representing the second highest order digit of said input number; and means responsive to said input signal train for producing an output signal train representing the result of a predetermined mathematical operation upon the input number, said resultant signal train containing "$m$" bivalued signals in said first cycle of operation entirely representing the highest order digit of the result and containing "$m$" bivalued signals in said second cycle of operation entirely representing the second highest order digit of the result; where "$m$" is a predetermined integer.

36. The computing apparatus of claim 35 wherein said input signal train sequentially represents the digits of a first input number A and which includes an additional signal generator for producing an additional input signal train sequentially representing the digits of a second input number B, said additional input signal train containing "$m$" bivalued signals in said first cycle of operation representing the highest order digit of said number B, and containing "$m$" bivalued signals in said second cycle of operation representing the second highest order digit of said number B; said means including computing circuits responsive to both said input signal trains for producing an output signal train substantially representing the product AB of the input numbers, said output signal train containing "$m$" bivalued signals in said first cycle of operation representing the highest order digit of said product AB and containing "$m$" bivalued signals in said second cycle of operation representing the second highest order digit of said product AB.

37. Incremental multiplying apparatus operable during successive operation intervals of time $i$, where $i$ has the successive values $1, 2, 3 \ldots n$, said apparatus comprising: first means for serially producing a first sequence of "$n$" groups of bivalued signals, each group of signals being produced in a different time interval $i$ and representing a corresponding decreasingly scaled increment $\Delta A_i$, the summation of all increments $\Delta A_i$ being equal to a number A; second means for serially producing a second sequence of "$n$" groups of bivalued signals each group of signals being produced in a different time interval $i$, and representing a corresponding decreasingly scaled increment $\Delta B_i$, the summation of all increments $\Delta B_i$ being equal to a number B; and third means receiving said first and second sequences of signals and responsive thereto for serially producing a third sequence of groups of bivalued signals each group of signals being produced in a different time interval $i$ and representing a corresponding decreasingly scaled increment $\Delta(AB)_i$, the summation of all increments $\Delta(AB)_i$ being substantially equal to the product AB of the input numbers A and B.

38. The multiplying apparatus of claim 37 wherein each group of signals produced by said first means contains "$m$" bivalued signals fully representing each said increment $\Delta A_i$, each group of signals produced by said second means contains "$m$" bivalued signals fully representing each said increment $\Delta B_i$, and each group of signals produced by said third means contains "$m$" bivalued signals fully representing each said increment $\Delta(AB)_i$, "$m$" being a predetermined integer.

References Cited in the file of this patent

UNITED STATES PATENTS

| | | |
|---|---|---|
| 2,811,713 | Spencer | Oct. 29, 1957 |
| 2,823,855 | Nelson | Feb. 18, 1958 |
| 2,863,604 | Le Clerc et al. | Dec. 9, 1958 |
| 2,898,042 | Womersley et al. | Aug. 4, 1959 |
| 2,913,179 | Gordon | Nov. 17, 1959 |

OTHER REFERENCES

Meyer et al.: An Operational-Digital Feedback Divider, Transactions of the IRE, Electronic Computers, March 1954, pages 17 to 20.

Meyer: Digital Techniques in Analog Systems, Transactions of the IRE, Electronic Computers, June 1954, pages 23 to 29.